(12) United States Patent
Polk et al.

(10) Patent No.: US 8,386,385 B2
(45) Date of Patent: Feb. 26, 2013

(54) APPARATUS AND METHODS FOR PROVIDING A PAYMENT SYSTEM OVER A NETWORK

(75) Inventors: John D. Polk, McLean, VA (US); James K. Selway, Austin, TX (US); Jeffrey F. Kach, Ardsley, NY (US)

(73) Assignee: ACS State & Local Solutions, Inc., Washington, DC (US)

( * ) Notice: Subject to any disclaimer, the term of this patent is extended or adjusted under 35 U.S.C. 154(b) by 0 days.

(21) Appl. No.: 13/192,194

(22) Filed: Jul. 27, 2011

(65) Prior Publication Data

US 2011/0282786 A1    Nov. 17, 2011

Related U.S. Application Data

(62) Division of application No. 12/774,460, filed on May 5, 2010, now Pat. No. 8,015,111, which is a division of application No. 10/043,493, filed on Jan. 14, 2002, now Pat. No. 7,739,195.

(60) Provisional application No. 60/260,896, filed on Jan. 12, 2001.

(51) Int. Cl.
*G06Q 90/00* (2006.01)

(52) U.S. Cl. ........................................ 705/44

(58) Field of Classification Search .................. None
See application file for complete search history.

(56) References Cited

U.S. PATENT DOCUMENTS

| | | | |
|---|---|---|---|
| 4,820,167 A | 4/1989 | Nobles et al. | |
| 4,823,264 A | 4/1989 | Deming | |
| 5,054,112 A | 10/1991 | Ike | |
| 5,220,501 A | 6/1993 | Lawlor et al. | |
| 5,231,569 A | 7/1993 | Myatt et al. | |
| 5,235,507 A | 8/1993 | Sackler et al. | |
| 5,245,368 A | 9/1993 | Farrell et al. | |
| 5,265,007 A | 11/1993 | Barnhard, Jr. et al. | |
| 5,283,829 A | 2/1994 | Anderson | |
| 5,317,732 A | 5/1994 | Gerlach, Jr. et al. | |
| 5,369,699 A | 11/1994 | Page et al. | |
| 5,383,113 A | 1/1995 | Kight et al. | |
| 5,465,206 A | 11/1995 | Hilt et al. | |
| 5,490,243 A | 2/1996 | Millman et al. | |
| 5,576,951 A | 11/1996 | Lockwood | |
| 5,590,360 A | 12/1996 | Edwards | |
| 5,600,554 A | 2/1997 | Williams | |
| 5,649,117 A | 7/1997 | Landry | |
| 5,652,786 A | 7/1997 | Rogers | |
| 5,666,645 A | 9/1997 | Thomas et al. | |

(Continued)

FOREIGN PATENT DOCUMENTS

| | | |
|---|---|---|
| WO | WO 97/17678 | 5/1997 |
| WO | WO 99/03243 | 1/1999 |

(Continued)

OTHER PUBLICATIONS

521 Income or Asset Offset, 521B026, May 15, 1997, (pp. 1-46).

(Continued)

*Primary Examiner* — Mary Cheung
(74) *Attorney, Agent, or Firm* — Finnegan, Henderson, Farabow, Garrett & Dunner, LLP

(57) ABSTRACT

Apparatus and methods provide an accumulator that processes electronic payments from an employer to a recipient via a network. The payments processed may be, for example, child support payments collected from an employee by the employer. The employer may submit one transaction made up of payments collected from multiple employees bound for multiple recipients and the accumulator may receive, translate, batch, and deliver the payments to the multiple recipients. The accumulator, employers, and recipients may communicate via a network such as the Internet.

32 Claims, 70 Drawing Sheets

U.S. PATENT DOCUMENTS

| | | | |
|---|---|---|---|
| 5,699,528 | A | 12/1997 | Hogan |
| 5,704,029 | A | 12/1997 | Wright, Jr. |
| 5,761,647 | A | 6/1998 | Boushy |
| 5,806,842 | A | 9/1998 | Steinhilber et al. |
| 5,878,405 | A | 3/1999 | Grant et al. |
| 5,884,283 | A | 3/1999 | Manos |
| 5,892,900 | A | 4/1999 | Ginter et al. |
| 5,893,080 | A | 4/1999 | McGurl et al. |
| 5,900,801 | A | 5/1999 | Heagle et al. |
| 5,917,965 | A | 6/1999 | Cahill et al. |
| 5,946,669 | A | 8/1999 | Polk |
| 6,034,605 | A | 3/2000 | March |
| 6,052,674 | A | 4/2000 | Zervides et al. |
| 6,070,150 | A | 5/2000 | Remington et al. |
| 6,119,107 | A | 9/2000 | Polk |
| 6,183,140 | B1 | 2/2001 | Singer et al. |
| 6,223,168 | B1 | 4/2001 | McGurl et al. |
| 6,233,428 | B1 | 5/2001 | Fryer |
| 6,270,351 | B1 | 8/2001 | Roper |
| 6,311,170 | B1 | 10/2001 | Embrey |
| 6,347,304 | B1 | 2/2002 | Taricani, Jr. |
| 6,347,305 | B1 | 2/2002 | Watkins |
| 6,381,594 | B1 * | 4/2002 | Eichstaedt et al. ............... 1/1 |
| 6,401,079 | B1 | 6/2002 | Kahn et al. |
| 6,567,821 | B1 | 5/2003 | Polk |
| 6,615,190 | B1 | 9/2003 | Slater |
| 6,647,272 | B1 * | 11/2003 | Asikainen ................. 455/466 |
| 6,829,588 | B1 | 12/2004 | Stoutenburg et al. |
| 7,072,909 | B2 | 7/2006 | Polk |
| 7,165,049 | B2 | 1/2007 | Slater |
| 7,174,315 | B2 | 2/2007 | Phillips et al. |
| 7,225,155 | B1 | 5/2007 | Polk |
| 7,317,823 | B1 | 1/2008 | Price et al. |
| 2001/0044756 | A1 | 11/2001 | Watkins et al. |
| 2002/0032651 | A1 | 3/2002 | Embery |
| 2002/0038289 | A1 | 3/2002 | Lawlor et al. |
| 2002/0046074 | A1 | 4/2002 | Barton |

FOREIGN PATENT DOCUMENTS

| | | |
|---|---|---|
| WO | WO 00/46732 | 8/2000 |

OTHER PUBLICATIONS

"1996 ACH Rules", published by National Automated Clearing House Association, Corporate Edition.
ACS State & Local Solutions, Inc.'S Opposition to the Motion to Dismiss of Pay Child Support Online Inc and Daniel J. King, Civil Action No. 02-CV-1321 DWF/SRN, United States District Court for the District of Minnesota, Oct. 7, 2002 (76 pages) (Attachment D).
"ADP PC/Payroll for Windows", published by Automatic Data Processing, Inc. (10 pages), 1997.
Amorette N. Bryant, Draft of Article for American Payroll Association, *First Hand Experience—Implementing Direct Deposit of Child Support Payments*, undated (6 pages).
Amy Hendershott, Child Support Enforcement in West Virginia, West Virginia University, Department of Sociology and Anthropology, (Dec. 2000), (66 pp.).
"ANSI X12 Standards for EDI", Website at http://www.gap.net/ansix12htm, Jan. 16, 1998.
"Automatic Data Processing Inc.", Website at www.adp.com, printed Mar. 8, 2002, (8 pages).
Basics of EDI, Chapter 3, Website at http://pages.prodigy.com/edibooks/edich31.html (May 30, 1997), David Robert Lambert 1994-96, 2 pages.
Board of Governors of the Federal Reserve System/Washington, D.C., Website at http://www.bog.frb.fed.us/ (May 29, 1997), 10 pages.
Bryant, Amy, *An Employer's View Point on What is Happening with Direct Deposit of Child Support*, NCSEA News, Summer 1997 (3 pages).
Bryant, Amy, Memo to Alicia Key and Cecelia Burke, Office of the Attorney General of Texas, Feb. 27, 1997 (9 pages).
Bryant, Amy, EFT/EDI Deductions for Child Support, City of Houston, Mar. 30, 1997 (65 pages).

"Business Bulletin, A Special Background Report On Trends in Industry And Finance," *Wall Street Journal*, Eastern Edition, Thursday, Jul. 18, 1996, Princeton, New Jersey (1 p.).
Camp, Dave, Letter to James Owen, Meijer, Inc., Jun. 17, 1996 (1 page).
Cason, Katherine L., Electronic Benefits Transfer: New Strategies for Improving Public Assistance Programs, Southern Rural Development Center Information Brief, No. 6, Dec. 1998, (6 pp.); http://srdc.msstate.edu/publications/brief6.pdf.
Chapman, Irene, Speech for ERICSA (Eastern Region Interstate Child Support Association), New Orleans, Jun. 7, 1994 (13 pages).
Chapman, Irene, Summary of Jun. 8 Teleconference of the APA ACH Committee, Jun. 10, 1994 (2 pages).
Chapman, Irene, Child Support & Withholding and Price Costco and the Family Perspective, *The Corporate Connection*, May 1996 (4 pages).
"Child Support Agency Doesn't Kid Around with Standardized Form", PaytecH, Mar./Apr. 1998 (p. 11).
"Child Support Application Banking Convention: A Guide for Child Support Enforcement Entities & Their Financial Institutions," Bankers EDI Council, (Mar. 28, 1997), (25 pp.).
"Child Support Applications Banking Convention: A Guide for Employers and Their Financial Institutions," published by Bankers EDI Council, (1966), (21 pp.).
"Child Support Applications Banking Convention: A Guide for Employers and Their Financial Institutions," published by Bankers EDI Council, (1996), (22 pp.).
*Child Support Application Banking Convention*, The National Automated Clearing House Association, 1993, Herndon, VA (11 pages).
CMi&s U.S. Electronic Commerce, Website at http://www.credit-worthy.com/us/providers/electronic.html (Jun. 6, 1997), 2 pages.
Colorado Child Support Enforcement "Building a Child's Future", Employer's Guide, dated Jun. 6, 1997, (2 pages).
Colorado Child Support Enforcement, Website at http://www.state.co.us/gov_dir/human_services_dir/CSE/cseemp.htm (Jul. 6, 1997), 2 pages.
Complaint for Declaratory Judgment and Patent Infringement, *JPMorgan Chase & Co.* et al. v. *Affiliated Computer Services, Inc.* et al.; (U.S.D.C. Del., Apr. 2008) (33 pages).
Complaint Seeking Declaratory Judgement Under Title 35 of US Code, Civil Action No. 02-CV-1321 DWF/SRN, United States District Court for the District of Minnesota, Jun. 21, 2002 (27 pages) (Attachment A).
Defendant and Counter-Plaintiff ACS State & Local Solutions, Inc.'s Answer and Counterclaim, Civil Action No. 02-CV-1321 DWF/SRN, United States District Court for the District of Minnesota, Jul. 31, 2002 (112 pages) (Attachment B).
Defense Finance and Accounting Service (www.dfas.mil), A Quick Guide to Working with the Military as an Employer, (15 pp.).
Defense Finance and Accounting Service (www.dfas.mil), Child Support and Alimony, (Apr. 11, 2003), (5 pp.).
Defense Finance and Accounting Service (www.dfas.mil), Commercial Debt Garnishment from Federal Civilian Employees, (Apr. 11, 2003), (6 pp.).
Defense Finance and Accounting Service (www.dfas.mil), Electronic Commerce, (Feb. 27, 2003), (4 pp.).
Defense Finance and Accounting Service (www.dfas.mil), Garnishment (Apr. 15, 2003), (4 pp.).
Defense Finance and Accounting Service (www.dfas.mil), Involuntary Allotment from Military Personnel for Commercial Debt, (Apr. 11, 2003), (5 pp.).
Direct Payment Market Analysis, Website at http://www.nacha.org/marketinq/dpma.htm (May 29, 1997), 4 pages.
EC/EDI: The Basics, Website at http://www.sbaonline.sba.gov/gopher/Ecedi/Info/eced5.txt (Jun. 6, 1997), 1 page.
EDI Architecture and Document Flow:, Website at http://www.acq.osd.mil/ec/edu/edu_03.html, Jan. 16, 1998.
EDI Top Twenty "Questions and Answers about Electronic Data Interchange" pamphlet published by Automated Clearing House Association, no date (6 pages).
"EFT Child Support", Website at www.eftchildsupoort.com, undated, (45 pages).

Electronic Commerce and Electronic Data Interchange Handbook, Website at http://www.acq.osd.mil/newhandbook/preface/preface.htm, Jan. 16, 1998.

Electronic Commerce Jumpstation, "Electronic Commerce Resource Guide", dated May 30, 1997 (3 pages).

Electronic Commerce Resource Guide, Website at http://www.premenos.com/Resources/Organization (May 30, 1997), 3 pages.

Electronic Funds Transfer, "Cmi&s U.S. Electronic Commerce", Checks by Tel/Fax (EDI, EFT) dated Jun. 6, 1997, (2 pages).

"Electronic Funds Transfer/ Electronic Data Interchange," [Retrieved on Jun. 9, 2002], retrieved from the Internet at http://www.acf.dhhs.gov/programs/cse/pol/dc19328.htm, (Jun. 15, 1993), (7 p.).

"Electronic transfer of funds and data [online]," [Retrieved on Jun. 9, 2002], retrieved from the Internet at http://www.acf.dhhs.gov/programs/cse/pol/dc19013.htm, (May 24, 1990), (2 p.).

"Electronic Funds Transfer Project: Final Report," Washington State Department of Social and Health Services, Oct. 1994.

Federal Deposit Insurance Corporation—General Counsel's Opinion No. 8; Stored Value Cards and Other Electronic Payment Systems, 61 Federal Register 150, Aug. 2, 1996, pp. 40490-40494, (6 pp.).

Federal Deposit Insurance Corporation—Insurability of Funds Underlying Stored Value Cards and Other Nontraditional Access Mechanisms, 73 Federal Register 220, Nov. 13, 2008, pp. 67155-67157, (3 pp.).

Garber, T., "EDI: A Weapon in the War Against Delinquent Child Support", Today: The Journal Work Process Improvement, Oct. 1997, (pp. 18-19).

Graham et al.: "The Employer Direct Deposit Pilot of the Iowa/ Nebraska EFT Project," Colo., Policy Studies Inc., Jun. 1992, 156 pages containing printed subject matter.

Graham et al., "The Employer Direct Deposit Pilot of the Iowa/ Nebraska EFT Project," Colo., Policy Studies Inc., (Jun. 1992), (175 pp.).

Graham, N.L. & Levy, M.A., "Implementing a Child Support Payment Center," Colo., Policy Studies Inc., (Jan. 1991), (58 pp.).

Jessica Pearson, Ph.D., Evaluation of Colorado's Credit Bureau Reporting Initiative, (Apr. 25, 1997), (29 pp.).

John D. Polk, Central Payment Processing: a Sure Bet, NCSEA Conference Notebook, Louisville, Kentucky, Aug. 1996 (4 pages).

Knudson et al.: "Business-to-business payments and the role of financial electronic data interchange"; Federal Reserve Bulletin, Apr. 1994, vol. 80 No. 4, pp. 269-278.

Kroener III, William F., Stored Value Cards and Other Electronic Payment Systems, FIL-59-96, Aug. 6, 1996, letter to Chief Executive Officer, (1 p.).

Lambert, David R., 1994-96 "basics of EDI", Chapter 3, dated May 30, 1997 (2 pages).

Lang, Scott, letter regarding *Child Support Application Banking Convention: A Guide for Employers & Their Financial Institutions*, Apr. 12, 1996 (4 pages).

Letter by Pat Hagen, OCSE, Apr. 26, 1994 (2 pages).

Letter to DiNuzzo, Joseph A., Insurance Coverage of Deposits for Which Insured Institution Acts as Fiscal Agent for Department of Treasury in Disbursing Social Security and Other Income to Recipients, FDIC-93-35, Jun. 28, 1993, (2 pp.); www.fdic.gov/regulations/laws/rules/4000-8240.html#tail.

"Lockheed Martin IMS & Bottomline Technologies Providing Employers with Electronic System for Garnishing Paychecks of Parents Owing Child Support," Jul. 9, 1996 (3 pp.).

Memorandum Opinion and Order, Civil Action No. 02-CV-1321 DWF/SRN, United States District Court for the District of Minnesota, Dec. 2, 2002 (8 pages) (Attachment E).

Memorandum in Support of Plaintiff and Counter-Defendant's Motion to Dismiss, Civil Action No. 02-CV-1321 DWF/SRN, United States District Court for the District of Minnesota, Sep. 16, 2002 (27 pages) (Attachment C).

National Child Support Enforcement Association, NCSEA News, Summer 1997 Conference Edition, vol. XXVII, No. 3 (4 pages).

National Child Support Enforcement Association, "State Legislatures Address PRWORA'S Child Support Requirements," NCSEA News, Summer 1997, vol. 27, No. 3 (44 pages).

NCSEA 45th Conference Notebook, "Putting Children in the Winners Circle," Louisville, Kentucky, Aug. 1996 (434 pages).

"New Hire Reporting", published by Automatic Data Processing, Inc., 1997, (2 pages).

Nickerson, J.M. & Haby, E.M., "EFT Pilot Project Design for Iowa: The Iowa-Nebraska Electronic Funds Transfer Project," (Sep. 1988), (53 pp.).

Nickerson, J.M. & Haby, E.M., "EFT Pilot Project Design for Nebraska: The Iowa-Nebraska Electronic Funds Transfer Project," (Sep. 1988), (40 pp.).

Office of Child Support Enforcement web page, Dec. 20, 1994 (12 pages).

Oracle EDI Gateway, User's Guide, Oracle®, Release 11, (Mar. 1998), (246 pp.).

Oracle Human Resources, North American User's Guide, Oracle®, Release 11, vol. 1, (Mar. 1998), (908 pp.).

Oracle Payroll, User's Guide, Oracle® , Release 11, vol. 1, (Mar. 1998), (934 pp.).

"Pay Child Support Online", Website at www.paychildsupportonline.com, printed Mar. 8, 2002, (10 pages).

Polk, John D., Centralized Collection/Disbursement, NCSEA Conference Notebook, Aug. 1997 (18 pages).

*Program Eases Child Support Payments for Colorado*, Aug. 15, 1996 (1 page).

Public Law 104-193-Aug. 22, 1996, 110 STAT. 2105, 104th Congress, (251 pp.).

Public Law 100-485, 102 STAT. 2343, 100th Congress, (Oct. 13, 1988), (87 pp.).

Screen prints from City of Houston Payroll System, Jan. 23, 1996 (14 pages).

SIDAC, Spring 1997 Newsletter, Website at http://www.sidac.wpafb.af.mil/newsletter/spr97.html, Jan. 16, 1998.

"Standards Governing EC/EDI", Chapter 6, Website at http://net.gap.net/ch6.htm, Jan. 16, 1998.

"Standing Tall for Children", Conference Notebook, NCSEA 46$^{th}$ Annual Conference & Exposition, Phoenix, Arizona, Aug. 1997 (453 pages).

Summary of Apr. 14 APA ACH Committee, Apr. 19, 1994 (22 pages).

*The Guide to Successful Direct Deposit*, 13$^{th}$ Ed., American Payroll Association, Mar. 1, 2000 (301 pages).

The National Automated Clearing House Association, Website at http://www.nacha.org/nacha/nacha.htm (May 29, 1997), 2 pages.

U.S. District Court, District of Minnesota, Civ. Action No. 02-CV-1321 DWF/SRN: *Pay Child Support Online Inc. v. ACS State & Local Solutions, Inc.*, Memorandum in Support of Plaintiff and Counter-Defendant's Motion to Dismiss, (Sep. 16, 2002), (26 pp.).

U.S. District Court, District of Minnesota, Civ. Action No. 02-CV-1321 DWF/SRN: *Pay Child Support Online Inc. v. ACS State & Local Solutions, Inc.*, ACS State & Local Solutions, Inc.'s Opposition to the Motion to Dismiss of Pay Child Support Online Inc. and Daniel J. King, (Oct. 7, 2002), (28 pp.).

U.S. District Court, District of Minnesota, Civ. Action No. 02-CV-1321 DWF/SRN: *Pay Child Support Online Inc. v. ACS State & Local Solutions, Inc.*, Memorandum Opinion and Order, (Dec. 2, 2002), (8 pp.).

U.S. District Court, District of Minnesota Civ. Action No. 02-CV-1321 DWF/JSM: *Pay Child Support Online Inc. v. ACS State & Local Solutions, Inc.*, ACS's Memorandum of Law in Support of Its Motion for Summary Judgment of Validity and Literal Infringement, 29 pages, Sep. 16, 2003 (Exhibit A).

U.S. District Court, District of Minnesota Civ. Action No. 02-CV-1321 DWF/JSM: *Pay Child Support Online Inc. v. ACS State & Local Solutions, Inc.*, PCSO, PSI and Hill's Memorandum of Law Opposing Motion for Summary Judgment, 31 pages, Oct. 21, 2003 (Exhibit B).

U.S. District Court, District of Minnesota Civ. Action No. 02-CV-1321 DWF/JSM: *Pay Child Support Online Inc. v. ACS State & Local Solutions, Inc.*, ACS' Reply Memorandum in Support of its Motion for Summary Judgment of Validity and Literal Infringement, 22 pages, Oct. 28, 2003 (Exhibit C).

U.S. District Court, District of Minnesota Civ. Action No. 02-CV-1321 DWF/JSM: *Pay Child Support Online Inc. v. ACS State & Local Solutions, Inc.*, Order, 2 pages, Dec. 12, 2003 (Exhibit D).

U.S. District Court, District of Minnesota Civ. Action No. 02-CV-1321 DWF/JSM: *Pay Child Support Online Inc.* v. *ACS State & Local Solutions, Inc.*, ACS's Supplemental Brief on Obviousness in Support of ACS' Motion for Summary Judgment, 14 pages, Jan. 12, 2004 (Exhibit E).
U.S. District Court, District of Minnesota Civ. Action No. 02-CV-1321 DWF/JSM: *Pay Child Support Online Inc.* v. *ACS State & Local Solutions, Inc.*, PCSO, PSI and Hill's Brief Regarding Obviousness, 10 pages, Jan. 12, 2004 (Exhibit F).
U.S. District Court, District of Minnesota Civ. Action No. 02-CV-1321 DWF/JSM: *Pay Child Support Online Inc.* v. *ACS State & Local Solutions, Inc.*, ACS's Response to the New Issues Raised in Pcso's Supplemental Brief on Obviousness, 8 pages, Jan. 23, 2004 (Exhibit G).
U.S. District Court, District of Minnesota Civ. Action No. 02-CV-1321 DWF/JSM: *Pay Child Support Online Inc.* v. *ACS State & Local Solutions, Inc.*, PCSO, PSI and Hill's Response to New Issued Raised by ACS, 3 pages, Jan. 29, 2004 (Exhibit H).
U.S. District Court, District of Minnesota Civ. Action No. 02-CV-1321 DWF/JSM: *Pay Child Support Online Inc.* v. *ACS State & Local Solutions, Inc.*, Memorandum Opinion and Order, 22 pages, Apr. 5, 2004 (Exhibit I).
U.S. District Court, District of Minnesota Civ. Action No. 02-CV-1321 DWF/JSM: *Pay Child Support Online Inc.* v. *ACS State & Local Solutions, Inc.*, Joint Motion for Entry of Order of Judgment, 6 pages, Jul. 22, 2004 (Exhibit J).
U.S. District Court, District of Minnesota Civ. Action No. 02-CV-1321 DWF/JSM: *Pay Child Support Online Inc.* v. *ACS State & Local Solutions, Inc.*, Order of Judgment, 3 pages, Jul. 28, 2004 (Exhibit K).
U.S. District Court, District of Minnesota Civ. Action No. 02-CV-1321 DWF/JSM: *Pay Child Support Online Inc.* v. *ACS State & Local Solutions, Inc.*, Judgment in a Civil Case, 2 pages, Jul. 29, 2004 (Exhibit L).
U.S. District Court, District of Delaware, Civ. Action No. 08-189-SLR: *J.P. Morgan Chase* v. *ACS Inc. and ACS State & Local Solutions, Inc.*, Answer to J.P. Morgan Chase's Complaint for Declaratory Judgment and Patent Infringement, (May 23, 2008), (26 pp.).
U.S. District Court of Delaware Civ. Action No. 08-189-SLR: *JPMorgan Chase* v. *Affiliated Computer Services*, Plaintiff's Objections and Responses to Defendants' First Set of Interrogatories, (Aug. 4, 2008), (27 pp.).
United States District Court for the District of Delaware, Civil Action No. 08-189-SLR (*JPMorgan Chase & Co.* et al. v. *Affiliated Computer Services, Inc. and ACS State & Local Solutions, Inc.*), Joint Claim Construction Statement, dated Sep. 18, 2009 (35 pp.).
United States District Court for the District of Delaware, Civil Action No. 08-189-SLR (*JPMorgan Chase & Co.* et al. v. *Affiliated Computer Services, Inc. and ACS State & Local Solutions, Inc.*), Plaintiff's Unopposed Motion for Leave to File Its Third Amended and Supplemental Complaint, dated Oct. 8, 2009 (71 pp.).
United States District Court for the District of Delaware, Civil Action No. 08-189-SLR (*JPMorgan Chase & Co.* et al. v. *Affiliated Computer Services, Inc. and ACS State & Local Solutions, Inc.*), Public Version of vol. 1 of Exhibits to Third Amended and Supplemental Complaint for Declaratory Judgment and Patent Infringement, Exhibits A-F, dated Oct. 14, 2009 (273 pp.).
United States District Court for the District of Delaware, Civil Action No. 08-189-SLR (*JPMorgan Chase & Co.* et al. v. *Affiliated Computer Services, Inc. and ACS State & Local Solutions, Inc.*), Public Version of vol. 2 of Exhibits to Third Amended and Supplemental Complaint—Exhibits G-N, dated Oct. 14, 2009 (122 pp.).
United States District Court for the District of Delaware, Civil Action No. 08-189-SLR (*JPMorgan Chase & Co.* et al. v. *Affiliated Computer Services, Inc. and ACS State & Local Solutions, Inc.*), Public Version of vol. 3 of Exhibits to Third Amended and Supplemental Complaint—Exhibits O-W, dated Oct. 14, 2009 (353 pp.).
United States District Court for the District of Delaware, Civil Action No. 08-189-SLR (*JPMorgan Chase & Co.* et al. v. *Affiliated Computer Services, Inc. and ACS State & Local Solutions, Inc.*), Public Version of vol. 4 of Exhibits to Third Amended and Supplemental Complaint—Exhibits X-PP, dated Oct. 14, 2009 (209 pp.).
United States District Court for the District of Delaware, Civil Action No. 08-189-SLR (*JPMorgan Chase & Co.* et al. v. *Affiliated Computer Services, Inc. and ACS State & Local Solutions, Inc.*), ACS's Second Supplemental Objections and Responses to Plaintiff's First Amended and Consolidated Interrogatory 13 to Defendants Affiliated Computer Services, Inc. and ACS State & Local Solutions, Inc., dated Oct. 19, 2009 (74 pp.).
United States District Court for the District of Delaware, Civil Action No. 08-189-SLR (*JPMorgan Chase & Co.* et al. v. *Affiliated Computer Services, Inc. and ACS State & Local Solutions, Inc.*), ACS's Objections and Responses to Plaintiffs' Supplemental Fifth Set of Interrogatories to Defendants Affiliated Computer Services, Inc. and ACS State & Local Solutions, Inc., dated Oct. 19, 2009 (17 pp.).
United States District Court for the District of Delaware, Civil Action No. 08-189-SLR (*JPMorgan Chase & Co.* et al. v. *Affiliated Computer Services, Inc. and ACS State & Local Solutions, Inc.*), Public Version of Third Amended and Supplemental Complaint for Declaratory Judgment and Patent Infringement, dated Oct. 21, 2009 (63 pp.).
United States District Court for the District of Delaware, Civil Action No. 08-189-SLR (*JPMorgan Chase & Co.* et al. v. *Affiliated Computer Services, Inc. and ACS State & Local Solutions, Inc.*), Public Version of vol. 1 of Exhibits to Third Amended and Supplemental Complaint—Exhibits A-F, dated Oct. 21, 2009 (273 pp.).
United States District Court for the District of Delaware, Civil Action No. 08-189-SLR (*JPMorgan Chase & Co.* et al. v. *Affiliated Computer Services, Inc. and ACS State & Local Solutions, Inc.*), Public Version of vol. 2 of Exhibits to Third Amended and Supplemental Complaint—Exhibits G-N, dated Oct. 21, 2009 (122 pp.).
United States District Court for the District of Delaware, Civil Action No. 08-189-SLR (*JPMorgan Chase & Co.* et al. v. *Affiliated Computer Services, Inc. and ACS State & Local Solutions, Inc.*), Public Version of vol. 3 of Exhibits to Third Amended and Supplemental Complaint—Exhibits O-W, dated Oct. 21, 2009 (353 pp.).
United States District Court for the District of Delaware, Civil Action No. 08-189-SLR (*JPMorgan Chase & Co.* et al. v. *Affiliated Computer Services, Inc. and ACS State & Local Solutions, Inc.*), Public Version of vol. 4 of Exhibits to Third Amended and Supplemental Complaint—Exhibits X-PP, dated Oct. 21, 2009 (209 pp.).
United States District Court for the District of Delaware, Civil Action No. 08-189-SLR (*JPMorgan Chase & Co.* et al. v. *Affiliated Computer Services, Inc. and ACS State & Local Solutions, Inc.*), ACS's Fifth Supplemental Objections and Responses to Plaintiff's First Amended and Consolidated Set of Interrogatories to Defendants Affiliated Computer Services, Inc. and ACS State & Local Solutions, Inc., dated Oct. 29, 2009 (42 pp.).
United States District Court for the District of Delaware, Civil Action No. 08-189-SLR (*JPMorgan Chase & Co.* et al. v. *Affiliated Computer Services, Inc. and ACS State & Local Solutions, Inc.*), Answer and Counterclaim to JPMorgan Chase's Third Amended and Supplemental Complaint for Declaratory Judgment and Patent Infringement, dated Oct. 30, 2009 (56 pp.).
United States District Court for the District of Delaware, Civil Action No. 08-189-SLR (*JPMorgan Chase & Co.* et al. v. *Affiliated Computer Services, Inc. and ACS State & Local Solutions, Inc.*), JPMorgan's Opening Claim Construction Brief, dated Nov. 6, 2009 (46 pp.).
United States District Court for the District of Delaware, Civil Action No. 08-189-SLR (*JPMorgan Chase & Co.* et al. v. *Affiliated Computer Services, Inc. and ACS State & Local Solutions, Inc.*), Defendant ACS's Opening Brief on Claim Construction, dated Nov. 6, 2009 (67 pp.).
United States District Court for the District of Delaware, Civil Action No. 08-189-SLR (*JPMorgan Chase & Co.* et al. v. *Affiliated Computer Services, Inc. and ACS State & Local Solutions, Inc.*), ACS's First Supplemental Objections and Responses to Plaintiff's Fourth Set of Interrogatories to Defendants Affiliated Computer Services, Inc. and ACS State & Local Solutions, Inc. (No. 41), dated Nov. 18, 2009 (12 pp.).
United States District Court for the District of Delaware, Civil Action No. 08-189-SLR (*JPMorgan Chase & Co.* et al. v. *Affiliated Computer Services, Inc. and ACS State & Local Solutions, Inc.*), ACS's Sixth Supplemental Objections and Responses to Plaintiff's First Amended and Consolidated Set of Interrogatories to Defendants Affiliated Computer Services, Inc. and ACS State & Local Solutions, Inc., dated Nov. 18, 2009 (139 pp.).

United States District Court for the District of Delaware, Civil Action No. 08-189-SLR (*JPMorgan Chase & Co.* et al. v. *Affiliated Computer Services, Inc. and ACS State & Local Solutions, Inc.*), ACS's First Supplemental Objections and Responses to Plaintiff's Third Set of Interrogatories to Defendants Affiliated Computer Services, Inc. and ACS State & Local Solutions, Inc. (Nos. 27-40), dated Nov. 18, 2009 (61 pp.).

United States District Court for the District of Delaware, Civil Action No. 08-189-SLR (*JPMorgan Chase & Co.* et al. v. *Affiliated Computer Services, Inc. and ACS State & Local Solutions, Inc.*), ACS's Fifth Supplemental Objections and Responses to Plaintiff's Second Set of Interrogatories to Defendants Affiliated Computer Services, Inc. and ACS State & Local Solutions, Inc., dated Nov. 18, 2009 (89 pp.).

United States District Court for the District of Delaware, Civil Action No. 08-189-SLR (*JPMorgan Chase & Co.* et al. v. *Affiliated Computer Services, Inc. and ACS State & Local Solutions, Inc.*), "Stipulation of Partial Dismissal Pursuant to Fed. R. Civ. P. 41(a)(1)(A)(ii) Based on Covenant and Agreement Not to Sue," dated Jul. 27, 2009 (5 pp.).

United States District Court for the District of Delaware, Civil Action No. 08-189-SLR (*JPMorgan Chase & Co.* et al. v. *Affiliated Computer Services, Inc., and ACS State & Local Solutions, Inc.*), "Stipulation of Partial Dismissal Pursuant to Fed. R. Civ. P. 41(a)(1)(A)(ii) Based on Covenant and Agreement Not to Sue," dated Nov. 17, 2009 (7 pp.).

U.S. District Court of Delaware Civil Action No. 08cv00189-UNA; *JPMorgan Chase & Co.*, et al. v. *Affiliated Computer Services, Inc.*, et al.—Complaint for Declaratory Judgment and Patent Infringement, (Apr. 4, 2008), (33 pp.).

U.S. District Court of Delaware Civil Action No. 08cv00189-UNA; *JPMorgan Chase & Co.*, et al. v. *Affiliated Computer Services, Inc.*, et al.—Letter dated Nov. 7, 2007 from ACS State and Local Solutions, Inc. to JPMorgan Chase & Co. regarding payment processing patents held by ACS State & Local Solutions, Inc., (1 p.), (Exhibit I).

U.S. District Court of Delaware Civil Action No. 08cv00189-UNA; *JPMorgan Chase & Co.*, et al. v. *Affiliated Computer Services, Inc.*, et al.—Letter dated Nov. 19, 2007 from JPMorgan Chase & Co., to ACS State and Local Solutions, Inc. regarding payment processing patents held by ACS State & Local Solutions, Inc. and Federal Express Receipt Tracking No. 790385857370, (2 pp.), (Exhibit J).

U.S. District Court of Delaware Civil Action No. 08cv00189-UNA; *JPMorgan Chase & Co.*, et al. v. *Affiliated Computer Services, Inc.*, et al.—Payment Processing Patents—Lotus Notes, Nov. 21, 2007, (1 p.), (Exhibit K).

U.S. District Court of Delaware Civil Action No. 08cv00189-UNA; *JPMorgan Chase & Co.*, et al. v. *Affiliated Computer Services, Inc.*, et al.—EPPICard—the safe and secure way to access your payments!, www.eppicard.com; (Apr. 3, 2008) (1 p.); Civil Cover Sheet (2 pp.); Civil Action No. 08-189, Acknowledgement of Receipt for AO Form 85, Notice of Availability of a United States Magistrate Judge to Exercise Jurisdiction, (1 p.), (Exhibit L).

U.S. District Court of Delaware Civil Action No. 08cv00189-SLR; *JPMorgan Chase & Co.*, et al. v. *Affiliated Computer Services, Inc.*, et al.—Answer to JPMorgan Chase's Complaint for Declaratory Judgment and Patent Infringement, (May 23, 2008), (26 pp.).

U.S. District Court of Delaware Civil Action No. 08cv00189-SLR; *JPMorgan Chase & Co.*, et al. v. *Affiliated Computer Services, Inc.*, et al.—Answer to Counterclaims for Declaratory Judgment, (Jun. 2, 2008), (6 pp.).

U.S. District Court of Delaware Civil Action No. 08cv00189-SLR; *JPMorgan Chase & Co.*, et al. v. *Affiliated Computer Services, Inc.*, et al.—Defendant ACS's Unopposed Motion for Leave to Amend Answer and Counterclaims, (Aug. 4, 2008), (4 pp.).

U.S. District Court of Delaware Civil Action No. 08cv00189-SLR; *JPMorgan Chase & Co.*, et al. v. *Affiliated Computer Services, Inc.*, et al.—First Amended Answer and Counterclaims to JPMorgan Chase's Complaint for Declaratory Judgment and Patent Infringement, (Aug. 8, 2008), (28 pp.); Certificate of Service, (Aug. 8, 2008), (1 p.).

U.S. District Court of Delaware Civil Action No. 08cv00189-SLR; *JPMorgan Chase & Co.*, et al. v. *Affiliated Computer Services, Inc.*, et al.—Answer to Amended Counterclaims for Declaratory Judgment and Patent Infringement, (Aug. 22, 2008), (11 pp.).

U.S. District Court of Delaware Civil Action No. 08cv00189-SLR; *JPMorgan Chase & Co.*, et al. v. *Affiliated Computer Services, Inc.*, et al.—Plaintiff's Motion for Leave to File Amended and Supplemental Complaint, (Aug. 28, 2008), (3 pp.).

U.S. District Court of Delaware Civil Action No. 08cv00189-SLR; *JPMorgan Chase & Co.*, et al. v. *Affiliated Computer Services, Inc.*, et al.—First Amended and Supplemental Complaint for Declaratory Judgment and Patent Infringement, (Aug. 28, 2008), (42 pp.).

U.S. District Court of Delaware Civil Action No. 08cv00189-SLR; *JPMorgan Chase & Co.*, et al. v. *Affiliated Computer Services, Inc.*, et al.—First Amended and Supplemental Complaint for Declaratory Judgment and Patent Infringement, (Aug. 28, 2008), (47 pp.), (Exhibit 2).

U.S. District Court of Delaware Civil Action No. 08cv00189-SLR; *JPMorgan Chase & Co.*, et al. v. *Affiliated Computer Services, Inc.*, et al.—[Proposed] Order, (__/__/08), (2 pp.); Rule 7.1.1 Statement, (Aug. 28, 2008), (2 pp.), (Exhibit 3).

U.S. District Court of Delaware Civil Action No. 08cv00189-SLR; *JPMorgan Chase & Co.*, et al. v. *Affiliated Computer Services, Inc.*, et al.—Exhibits to First Amended and Supplemental Complaint for Declaratory Judgment and Patent Infringement—vol. 1—Exhibits A-F, (Aug. 28, 2008), (2 pp.).

U.S. District Court of Delaware Civil Action No. 08cv00189-SLR; *JPMorgan Chase & Co.*, et al. v. *Affiliated Computer Services, Inc.*, et al.—Exhibits to First Amended and Supplemental Complaint for Declaratory Judgment and Patent Infringement—vol. 2—Exhibits G-N, (Aug. 28, 2008), (2 pp.).

U.S. District Court of Delaware Civil Action No. 08cv00189-SLR; *JPMorgan Chase & Co.*, et al. v. *Affiliated Computer Services, Inc.*, et al.—Exhibits to First Amended and Supplemental Complaint for Declaratory Judgment and Patent Infringement—vol. 3—Exhibits O-P, (Aug. 28, 2008), (2 pp.).

U.S. District Court of Delaware Civil Action No. 08cv00189-SLR; *JPMorgan Chase & Co.*, et al. v. *Affiliated Computer Services, Inc.*, et al.—Letter dated Mar. 11, 2008 from ACS State and Local Solutions, Inc. to Lona S. Gros, CPPB regarding ACS Response to RFP for File No. O 51500 CP, Solicitation # 2223009 Centralized Collection Unit for the Department of Social Services, Office of Family Support, Support Enforcement Services, (filed Aug. 28, 2008), (325 pp.), (Exhibit O—Exhibit 1-11).

U.S. District Court of Delaware Civil Action No. 08cv00189-SLR; *JPMorgan Chase & Co.*, et al. v. *Affiliated Computer Services, Inc.*, et al.—States, Counties Automate Child Support Processing, 2008 Factiva, Inc., (Aug. 1, 1996), (filed Aug. 28, 2008), (4 pp.), (Exhibit P).

U.S. District Court of Delaware Civil Action No. 08cv00189-SLR; *JPMorgan Chase & Co.*, et al. v. *Affiliated Computer Services, Inc.*, et al.—Plaintiffs' Opening Brief in Support of Their Motion for Leave to File Amended and Supplemental Complaint, (Aug. 28, 2008), (10 pp.).

U.S. District Court of Delaware Civil Action No. 08cv00189-SLR; *JPMorgan Chase & Co.*, et al. v. *Affiliated Computer Services, Inc.*, et al.—Affiliated Computer Services, Inc. and ACS State & Local Solutions, Inc. Answer and Counterclaims to JPMorgan Chase's First Amended and Supplemental Complaint for Declaratory Judgment and Patent Infringement, (Sep. 22, 2008), (34 pp.).

U.S. District Court of Delaware Civil Action No. 08cv00189-SLR; *JPMorgan Chase & Co.*, et al. v. *Affiliated Computer Services, Inc.*, et al.—Answer to ACS's Counterclaims to JPMorgan's First Amended and Supplemental Complaint for Declaratory Judgment and Patent Infringement, (Oct. 9, 2008), (12 pp.).

U.S. District Court of Delaware Civil Action No. 08cv00189-SLR; *JPMorgan Chase & Co.*, et al. v. *Affiliated Computer Services, Inc.*, et al.—Defendant ACS's Motion for Leave to File First Amended Answer and Counterclaims to JPMorgan's First Amended and Supplemental Complaint, (Dec. 10, 2008), (3 pp.).

U.S. District Court of Delaware Civil Action No. 08cv00189-SLR; *JPMorgan Chase & Co.*, et al. v. *Affiliated Computer Services, Inc.*, et al.—First Amended Answer and Counterclaims to JPMorgan Chase's First Amended and Supplemental Complaint for Declaratory Judgment and Patent Infringement, (Dec. 10, 2008), (39 pp.).

U.S. District Court of Delaware Civil Action No. 08cv00189-SLR; *JPMorgan Chase & Co.*, et al. v. *Affiliated Computer Services, Inc.*, et al.—Defendant ACS's Objections and Responses to Plaintiffs' First Set of Requests for Production of Documents to Defendants Affiliated Computer Services, Inc. and ACS State & Local Solutions Inc., (Jul. 17, 2008), (77 pp.).

U.S. District Court of Delaware Civil Action No. 08cv00189-SLR; *JPMorgan Chase & Co.*, et al. v. *Affiliated Computer Services, Inc.*, et al.—Defendant ACS's Objections and Responses to Plaintiffs' Second Set of Requests for Production of Documents to Defendants Affiliated Computer Services, Inc. and ACS State & Local Solutions Inc., (Nov. 7, 2008), (74 pp.).

U.S. District Court of Delaware Civil Action No. 08cv00189-SLR; *JPMorgan Chase & Co.*, et al. v. *Affiliated Computer Services, Inc.*, et al.—ACS's Objections and Responses to Plaintiffs' First Set of Interrogatories to Defendants Affiliated Computer Services, Inc. and ACS State & Local Solutions, Inc., (Jul. 17, 2008), (37 pp.).

U.S. District Court of Delaware Civil Action No. 08cv00189-SLR; *JPMorgan Chase & Co.*, et al. v. *Affiliated Computer Services, Inc.*, et al.—ACS's Objections and Responses to Plaintiffs' First Amended and Consolidated Set of Interrogatories to Defendants Affiliated Computer Services, Inc. and ACS State & Local Solutions, Inc., (Nov. 7, 2008), (36 pp.).

U.S. District Court of Delaware Civil Action No. 08cv00189-SLR; *JPMorgan Chase & Co.*, et al. v. *Affiliated Computer Services, Inc.*, et al.—ACS's Objections and Responses to Plaintiffs' Second Set of Interrogatories to Defendants Affiliated Computer Services, Inc. and ACS State & Local Solutions, Inc., (Nov. 7, 2008), (17 pp.).

U.S. District Court of Delaware Civil Action No. 08cv00189-SLR; *JPMorgan Chase & Co.*, et al. v. *Affiliated Computer Services, Inc.*, et al.—Affiliated Computer Services, Inc. and ACS State & Local Solutions, Inc.'s Initial Disclosures, (Aug. 1, 2008), (17 pp.).

U.S. District Court of Delaware Civil Action No. 08cv00189-SLR; *JPMorgan Chase & Co.*, et al. v. *Affiliated Computer Services, Inc.*, et al.—Affiliated Computer Services, Inc. and ACS State & Local Solutions, Inc.'s First Supplemental Initial Disclosures, (Jan. 12, 2009), (14 pp.).

U.S. District Court of Delaware Civil Action No. 08cv00189-SLR; *JPMorgan Chase & Co.*, et al. v. *Affiliated Computer Services, Inc.*, et al.—Defendant ACS's Objections and Response to Plaintiffs' Third Set of Requests for Production of Documents to Defendants Affiliated Computer Services,, Inc. and ACS State & Local Solutions Inc., (Mar. 9, 2009). (52 pp.).

U.S. District Court of Delaware Civil Action No. 08cv00189-SLR; *JPMorgan Chase & Co.*, et al. v. *Affiliated Computer Services, Inc.*, et al.—Defendants Affiliated Computer Services, Inc., and ACS State & Local Solutions, Inc.'s Objections and Responses to Plaintiffs' Third Set of Interrogatories (Nos. 27-40), (Apr. 29, 2009), (44 pp.).

U.S. District Court of Delaware Civil Action No. 08cv00189-SLR; *JPMorgan Chase & Co.*, et al. v. *Affiliated Computer Services, Inc.*, et al.—Affiliated Computer Services, Inc. and ACS State & Local Solutions, Inc.'s Second Supplemental Initial Disclosures, (Apr. 21, 2009), (13 pp).

U.S. District Court of Delaware Civil Action No. 08cv00189-SLR; *JPMorgan Chase & Co.*, et al. v. *Affiliated Computer Services, Inc.*, et al.—Plaintiff's' Fourth Supplemental Objections and Responses to Defendants' Amended First Set of Interrogatories (Nos. 1-6), (Apr. 24, 2009), (21 pp).

U.S. District Court of Delaware Civil Action No. 08cv00189-SLR; *JPMorgan Chase & Co.*, et al. v. *Affiliated Computer Services, Inc.*, et al.—Answer to ACS's First Amended Counterclaims, (Mar. 18, 2009), (16 pp).

U.S. District Court of Delaware Civil Action No. 08cv00189-SLR; *JPMorgan Chase & Co.*, et al. v. *Affiliated Computer Services, Inc.*, et al.—Second Amended Answer and Counterclaims to JPMorgan Chase's First Amended and Supplemental Complaint for Declaratory Judgment and Patent Infringement (Redacted public version), (Apr. 3, 2009), (46 pp).

U.S. District Court of Delaware Civil Action No. 08cv00189-SLR; *JPMorgan Chase & Co.*, et al. v. *Affiliated Computer Services, Inc.*, et al.—Second Amended Answer and Counterclaims to JPMorgan Chase's First Amended and Supplemental Complaint for Declaratory Judgment and Patent Infringement (Redacted public version), (Apr. 3, 2009), (49 pp.).

U.S. District Court of Delaware Civil Action No. 08cv00189-SLR; *JPMorgan Chase & Co.*, et al. v. *Affiliated Computer Services, Inc.*, et al.—Second Amended and Supplemental Complaint for Declaratory Judgment and Patent Infringement, (Apr. 2, 2009), (45 pp.).

U.S. District Court of Delaware Civil Action No. 08cv00189-SLR; *JPMorgan Chase & Co.*, et al. v. *Affiliated Computer Services, Inc.*, et al.—Exhibits to Second Amended and Supplemental Complaint for Declaratory Judgment and Patent Infringement (vol. 3—Exhibits O-W, (Apr. 2, 2009), (2 pp.).

U.S. District Court of Delaware Civil Action No. 08cv00189-SLR; *JPMorgan Chase & Co.*, et al. v. *Affiliated Computer Services, Inc.*, et al.—Harry W. Wiggins, Prepared Statement of Harry W. Wiggins, Vice President, Child Support Services, Lockheed Martin IMS Children and Family Services Before the House Government Reform and Oversight Committee Human Resources Subcommittee—"Social Service Privatization: The Benefits and Challenges to Child Support Enforcement Programs", Federal Information Systems Corporation Federal News Service, Section: In the News (Nov. 4, 1997), (8 pp.), (Exhibit P).

U.S. District Court of Delaware Civil Action No. 08cv00189-SLR; *JPMorgan Chase & Co.*, et al. v. *Affiliated Computer Services, Inc.*, et al.—Steven Marjanovic, Bottomline Taps Lockheed to Market Software That Deducts Child Support, American Banker, Inc., The American Banker, Section: Technology/Operations; p. 15 (Jul. 12, 1996), (2 pp.), (Exhibit Q).

U.S. District Court of Delaware Civil Action No. 08cv00189-SLR; *JPMorgan Chase & Co.*, et al. v. *Affiliated Computer Services, Inc.*, et al.—PMR news briefs, IOMA Payroll Manager's Report, Section: p. 13 (Sep. 4, 1997), (3 pp.), (Exhibit R).

U.S. District Court of Delaware Civil Action No. 08cv00189-SLR; *JPMorgan Chase & Co.*, et al. v. *Affiliated Computer Services, Inc.*, et al.—States, Counties Automate Child Support Processing, 2008 Factiva, Inc., (Aug. 1, 1996), (3 pp.), (Exhibit S).

U.S. District Court of Delaware Civil Action No. 08cv00189-SLR; *JPMorgan Chase & Co.*, et al. v. *Affiliated Computer Services, Inc.*, et al.—Metropolitan Digest/Los Angeles County News In Brief: Los Angeles County; New Computer Keeps Track of Child Support Payments, The Times Mirror Company; Los Angeles Times, Section: Metro; Part B; p. 2; Metro Desk (Mar. 9, 1995), (2 pp.), (Exhibit T).

U.S. District Court of Delaware Civil Action No. 08cv00189-SLR; *JPMorgan Chase & Co.*, et al. v. *Affiliated Computer Services, Inc.*, et al.—Carla Rivera, Electronic Child Support System Unveiled; Government Critics Say New Computer System Is Plagued With Problems and May Be Inadequate. A Few Bugs Just Need To Be Worked Out, District Attorney Responds, The Times Mirror Company; Los Angeles Times, Section: Metro; Part B; p. 1; Metro Desk (Mar. 10, 1995), (3 pp.), (Exhibit U).

U.S. District Court of Delaware Civil Action No. 08cv00189-SLR; *JPMorgan Chase & Co.*, et al. v. *Affiliated Computer Services, Inc.*, et al.—Dan Morain, State to Stay With Child-Support Computer Setup; Technology: Tracking System Is Incomplete And Consultant Lists 1,400 Problems, But Official Defends Project, Times Mirror Company; Los Angeles Times, Section: Part A; p. 3; Metro Desk (May 2, 1997), (3 pp.), (Exhibit V).

U.S. District Court of Delaware Civil Action No. 08cv00189-SLR; *JPMorgan Chase & Co.*, et al. v. *Affiliated Computer Services, Inc.*, et al.—Lockheed Martin IMS Retains Landmark Child Support Payment processing Contract in Los Angeles County; Awarded three-year, $24 million contract Processes more than $350 million annually for Los Angeles County Is nation's oldest, privatized child support payment processing operation, PR Newswire Association, Inc., PR Newswire, Section: State and Regional News (Dec. 4, 2000), (3 pp.), (Exhibit W).

U.S. District Court of Delaware Civil Action No. 08cv00189-SLR; *JPMorgan Chase & Co.*, et al. v. *Affiliated Computer Services, Inc.*, et al.—Attachment A1, U.S. Patent No. 7,317,823 Claim Chart (ACS's Identification of Prior Art, '823 Patent), (23 pp.).

U.S. District Court of Delaware Civil Action No. 08cv00189-SLR; *JPMorgan Chase & Co.*, et al. v. *Affiliated Computer Services, Inc.*, et al.—Attachment A2, U.S. Patent No. 5,917,965 Claim Chart (ACS's Identification of Prior Art, '965 Patent), (60 pp.).
U.S. District Court of Delaware Civil Action No. 08cv00189-SLR; *JPMorgan Chase & Co.*, et al. v. *Affiliated Computer Services, Inc.*, et al.—Attachment A3, Access Card '190 (51 pp.).
U.S. District Court of Delaware Civil Action No. 08cv00189-SLR; *JPMorgan Chase & Co.*, et al. v. *Affiliated Computer Services, Inc.*, et al.—Attachment A4, Access Card '049 (36 pp.).
U.S. District Court of Delaware Civil Action No. 08cv00189-SLR; *JPMorgan Chase & Co.*, et al. v. *Affiliated Computer Services, Inc.*, et al.—Attachment A5, Access Card '315 (36 pp.).
U.S. District Court of Delaware Civil Action No. 08cv00189-SLR; *JPMorgan Chase & Co.*, et al. v. *Affiliated Computer Services, Inc.*, et al.—Attachment A6,DPC '190 (58 pp.).
U.S. District Court of Delaware Civil Action No. 08cv00189-SLR; *JPMorgan Chase & Co.*, et al. v. *Affiliated Computer Services, Inc.*, et al.—Attachment A7,DPC '049 (39 pp.).
U.S. District Court of Delaware Civil Action No. 08cv00189-SLR; *JPMorgan Chase & Co.*, et al. v. *Affiliated Computer Services, Inc.*, et al.—Attachment A8,DPC '315 (33 pp.).
U.S. District Court of Delaware Civil Action No. 08cv00189-SLR; *JPMorgan Chase & Co.*, et al. v. *Affiliated Computer Services, Inc.*, et al.—Attachment A9,SAS '190 (68 pp.).
U.S. District Court of Delaware Civil Action No. 08cv00189-SLR; *JPMorgan Chase & Co.*, et al. v. *Affiliated Computer Services, Inc.*, et al.—Attachment A10,SAS '049 (43 pp.).
U.S. District Court of Delaware Civil Action No. 08cv00189-UNA; *JPMorgan Chase & Co.*, et al. v. *Affiliated Computer Services, Inc.*, et al.—Jeffrey Norwine's Objections and Responses to Defendant's Second amended Notice of Rule 30(b)(1) Deposition and Subpoena Duces Tecum of Jeffrey Norwine, dated Jun. 16, 2009 (13 pp.).
U.S. District Court of Delaware Civil Action No. 08cv00189-UNA; *JPMorgan Chase & Co.*, et al. v. *Affiliated Computer Services, Inc.*, et al.—Penny Joines's Objections and Responses to Defendant's Second amended Notice of Rule 30(b)(1) Deposition and Subpoena Duces Tecum of Penny Joines, dated Jun. 16, 2009 (13 pp.).
U.S. District Court of Delaware Civil Action No. 08cv00189-UNA; *JPMorgan Chase & Co.*, et al. v. *Affiliated Computer Services, Inc.*, et al.—Gregory Phillips's Objections and Responses to Defendant's Second amended Notice of Rule 30(b)(1) Deposition and Subpoena Duces Tecum of Gregory Phillips, dated Jun. 16, 2009 (13 pp.).
U.S. District Court of Delaware Civil Action No. 08cv00189-UNA; *JPMorgan Chase & Co.*, et al. v. *Affiliated Computer Services, Inc.*, et al.—Rebecca Deporte's Objections and Responses to Defendant's Second amended Notice of Rule 30(b)(1) Deposition and Subpoena Duces Tecum of Rebecca Deporte, dated Jun. 16, 2009 (13 pp.).
U.S. District Court of Delaware Civil Action No. 08cv00189-UNA; *JPMorgan Chase & Co.*, et al. v. *Affiliated Computer Services, Inc.*, et al.—ACS's Objections and Responses to Plaintiff's Notice to Take Deposition of Affiliated Computer Services, Inc. and ACS State and Local Solutions, Inc., dated May 26, 2009 (36 pp.).
U.S. District Court of Delaware Civil Action No. 08cv00189-UNA; *JPMorgan Chase & Co.*, et al. v. *Affiliated Computer Services, Inc.*, et al.—Stephen T. Schreiner's Objections and Responses to Defendant's Notice of Rule 30(b)(1) Deposition and Subpoena Duces Tecum of Stephen T. Schreiner, dated May 26, 2009 (7 pp.).
U.S. District Court of Delaware Civil Action No. 08cv00189-UNA; *JPMorgan Chase & Co.*, et al. v. *Affiliated Computer Services, Inc.*, et al.—Thomas Bradshaw's Objections and Responses to Defendant's Notice of Rule 30(b)(1) Deposition and Subpoena Duces Tecum of Thomas Bradshaw, dated May 26, 2009 (7 pp.).
U.S. District Court of Delaware Civil Action No. 08cv00189-UNA; *JPMorgan Chase & Co.*, et al. v. *Affiliated Computer Services, Inc.*, et al.—Kim Slater's Objections and Responses to Defendant's Notice of Rule 30(b)(1) Deposition and Subpoena Duces Tecum of Kim Slater, dated May 18, 2009 (12 pp.).
U.S. District Court of Delaware Civil Action No. 08cv00189-UNA; *JPMorgan Chase & Co.*, et al. v. *Affiliated Computer Services, Inc.*, et al.—Plaintiff's Objections to Defendant's Second Notice of Rule 30(b)(6) Deposition of Plaintiff JPMorgan, dated May 15, 2009 (19 pp.).

U.S. District Court of Delaware Civil Action No. 08cv00189-UNA; *JPMorgan Chase & Co.*, et al. v. *Affiliated Computer Services, Inc.*, et al.—Plaintiff's Objections to Defendant's First Notice of Rule 30(b)(6) Deposition of Plaintiff JPMorgan, dated May 15, 2009 (19 pp).
U.S. District Court of Delaware Civil Action No. 08cv00189-UNA; *JPMorgan Chase & Co.*, et al. v. *Affiliated Computer Services, Inc.*, et al.—Plaintiff's Answer to ACS's Third Amended Counterclaims, dated May 15, 2009 (18 pp.).
U.S. District Court of Delaware Civil Action No. 08cv00189-UNA; *JPMorgan Chase & Co.*, et al. v. *Affiliated Computer Services, Inc.*, et al.—Redacted Version of Defendant's Answer and Counterclaims to JPMorgan Chase's Second Amended Complaint for Declaratory Judgment and Patent Infringement, dated May 8, 2009 (49 pp.).
U.S. District Court of Delaware Civil Action No. 08cv00189-UNA; *JPMorgan Chase & Co.*, et al. v. *Affiliated Computer Services, Inc.*, et al.—Plaintiff's First Supplemental Objections and Responses to Defendant's Fifth Set of Interrogatories, dated Jun. 5, 2009, (19 pp).
U.S. District Court of Delaware Civil Action No. 08cv00189-UNA; *JPMorgan Chase & Co.*, et al. v. *Affiliated Computer Services, Inc.*, et al.—Defendant's Objections to Plaintiff's Third Notice of Deposition of Defendants, dated Jun. 2, 2009, (24 pp).
U.S. District Court of Delaware Civil Action No. 08cv00189-SLR; *JPMorgan Chase & Co.*, et al. v. *Affiliated Computer Services, Inc.*, et al.—First Amended Answer and Counterclaims to JPMorgan Chase's First Amended and Supplemental Complaint for Declaratory Judgment and Patent Infringement, (Dec. 10, 2008), (44 pp.), (Exhibit 2).
U.S. District Court of Delaware Civil Action No. 08cv00189-SLR; *JPMorgan Chase & Co.*, et al. v. *Affiliated Computer Services, Inc.*, et al.—[Proposed] Order and Rule 7.1.1 Statement, (Dec. 10, 2008), (5 pp.), (Exhibit 3).
U.S. District Court of Delaware Civil Action No. 08cv00189-SLR; *JPMorgan Chase & Co.*, et al. v. *Affiliated Computer Services, Inc.*, et al.—Defendant ACS's Opening Brief in Support of Motion for Leave to File First Amended Answer and Counterclaims, (Dec. 10, 2008), (12 pp.).
U.S. District Court of Delaware Civil Action No. 08cv00189-SLR; *JPMorgan Chase & Co.*, et al. v. *Affiliated Computer Services, Inc.*, et al.—Plaintiff JPMorgan's Answering Brief in Opposition to Defendant ACS's Motion for Leave to File a First Amended Answer and Counterclaims, (Jan. 9, 2009), (37 pp.).
U.S. District Court of Delaware Civil Action No. 08cv00189-SLR; *JPMorgan Chase & Co.*, et al. v. *Affiliated Computer Services, Inc.*, et al.—Declaration of Stephen T. Schreiner, Esq., in Support of Plaintiff JPMorgan's Answering Brief in Opposition to Defendant ACS's Motion for Leave to File a First Amended Answer and Counterclaims, (Jan. 9, 2009), (4 pp.).
U.S. District Court of Delaware Civil Action No. 08cv00189-SLR; *JPMorgan Chase & Co.*, et al. v. *Affiliated Computer Services, Inc.*, et al.—Direct Express® Debit MasterCard®, Financial Management Service, www.fms.treas.gov/directexpresscard/index.html, (Nov. 12, 2008), filed Jan. 9, 2009, (3 pp.), (Exhibit A).
U.S. District Court of Delaware Civil Action No. 08cv00189-SLR; *JPMorgan Chase & Co.*, et al. v. *Affiliated Computer Services, Inc.*, et al.—Treasury Announces Direct Express® Debit Card for SSA and SSI Recipients, Financial Management Service, www.fms.treas.gov/afc/jan_article3.html, (Feb. 21, 2008), filed Jan. 9, 2009, (3 pp.), (Exhibit B).
U.S. District Court of Delaware Civil Action No. 08cv00189-SLR; *JPMorgan Chase & Co.*, et al. v. *Affiliated Computer Services, Inc.*, et al.—Direct Express®, Debit Card Services for Federal Benefit Recipients, Financial Agency Agreement Between The Financial Management Service U.S. Department of the Treasury and Comerica Bank, Effective Date: Jan. 3, 2008, (44 pp.), (Exhibit C).
U.S. District Court of Delaware Civil Action No. 08cv00189-SLR; *JPMorgan Chase & Co.*, et al. v. *Affiliated Computer Services, Inc.*, et al.—eVerge Group—www.eVergeGroup.com—"eVerge Group Case Study—Affiliated Computer Services," (Jan. 9, 2009), (2 pp.), (Exhibit D).

U.S. District Court of Delaware Civil Action No. 08cv00189-SLR; *JPMorgan Chase & Co.*, et al. v. *Affiliated Computer Services, Inc.*, et al.—Supplemental Information Disclosure Statement and Substitute for Form 1449A PTO, (Dec. 30, 2004), (filed Jan. 9, 2009), (14 pp.), (Exhibit E).

U.S. District Court of Delaware Civil Action No. 08cv00189-SLR; *JPMorgan Chase & Co.*, et al. v. *Affiliated Computer Services, Inc.*, et al.—Electronic Information Disclosure Statement, (Jan. 9, 2009), (3 pp.), (Exhibit F).

U.S. District Court of Delaware Civil Action No. 08cv00189-SLR; *JPMorgan Chase & Co.*, et al. v. *Affiliated Computer Services, Inc.*, et al.—Plaintiffs' Objections and Responses to Defendants' First Set of Requests for Production, (Jul. 16, 2008), (48 pp.).

U.S. District Court of Delaware Civil Action No. 08cv00189-SLR; *JPMorgan Chase & Co.*, et al. v. *Affiliated Computer Services, Inc.*, et al.—Plaintiffs' Objections and Responses to Defendants' First Amended Set of Requests for Production, (Nov. 24, 2008), (46 pp.).

U.S. District Court of Delaware Civil Action No. 08cv00189-SLR; *JPMorgan Chase & Co.*, et al. v. *Affiliated Computer Services, Inc.*, et al.—Plaintiffs' Objections and Responses to Defendants' Second Set of Requests for Production, (Nov. 24, 2008), (55 pp.).

U.S. District Court of Delaware Civil Action No. 08cv00189-SLR; *JPMorgan Chase & Co.*, et al. v. *Affiliated Computer Services, Inc.*, et al.—Plaintiffs' Objections and Responses to Defendants' Third Set of Requests for Production, (Jan. 9, 2009), (18 pp.).

U.S. District Court of Delaware Civil Action No. 08cv00189-SLR; *JPMorgan Chase & Co.*, et al. v. *Affiliated Computer Services, Inc.*, et al.—Plaintiffs' Objections and Responses to Defendants' First Set of Interrogatories, (Aug. 4, 2008), (30 pp.).

U.S. District Court of Delaware Civil Action No. 08cv00189-SLR; *JPMorgan Chase & Co.*, et al. v. *Affiliated Computer Services, Inc.*, et al.—Plaintiffs' Supplemental Objections and Responses to Defendants' Amended First Set of Interrogatories, (Nov. 3, 2008), (24 pp.).

U.S. District Court of Delaware Civil Action No. 08cv00189-SLR; *JPMorgan Chase & Co.*, et al. v. *Affiliated Computer Services, Inc.*, et al.—Plaintiffs' Objections and Responses to Defendants' Second Set of Interrogatories, (Sep. 15, 2008), (19 pp.).

U.S. District Court of Delaware Civil Action No. 08cv00189-SLR; *JPMorgan Chase & Co.*, et al. v. *Affiliated Computer Services, Inc.*, et al.—Plaintiffs' Supplemental Objections and Responses to Defendants' Amended Second Set of Interrogatories, (Nov. 3, 2008), (17 pp.).

U.S. District Court of Delaware Civil Action No. 08cv00189-SLR; *JPMorgan Chase & Co.*, et al. v. *Affiliated Computer Services, Inc.*, et al.—Plaintiffs' Objections and Responses to Defendants' Third Set of Interrogatories, (Nov. 24, 2008), (17 pp.).

U.S. District Court of Delaware Civil Action No. 08cv00189-SLR; *JPMorgan Chase & Co.*, et al. v. *Affiliated Computer Services, Inc.*, et al.—Plaintiffs' Initial Disclosures Pursuant to Fed. R. Civ. P. 26(a)(1), (Aug. 1, 2008), (15 pp.).

"Vans Valued-Added Networks" paper, no date, (6 pages).

Vans (Value-Added Networks), Website at http://ganges.cs.tcd.ie/4ba2/edi/www_vans.html (May 30, 1997), 7 pages.

"Wage Garnishment Processing Service", published by Automatic Data Processing, Inc., 1996, (2 pages).

Wilcox, "The Evolution of Human Resources Technology," Jun. 1997, Management Accounting A New Era in Human Resources/Payroll Supplement, pp. 3-5.

Workshop Materials Houston Chapter of the American Payroll Association, Jul. 21, 1995 (63 pages).

Zeidner, Rita, Comments, American Payroll Association, Mar. 22, 1996 (6 pages).

\* cited by examiner

| Global Navigation |

Register with Web-Chek
The registration process consists of two easy steps. Step 1 requires completing the online form with your company information. For Step 2, you will need to print your registration information and mail it with a bank authorization to transfer money from your account to the State Disbursement Unit.

18B22

| Step: 1 - 2 |

Required fields are marked with a red asterisk (*).

Company Information

- * FEIN [9 Digit Federal Employee ID Number] — 18B02
- * Company Name [ ] — 18B04
- * Address [ ]
- [ ] — 18B06
- * City [ ]
- * State [Select a State ▼] — 18B08
- * Zip [ ] — 18B10

Primary User
The Primary User is the person in your organization who determines whether other employees may have access to your data at this Web site. The Primary User also assigns privileges (view data only or update data) to those employees.

- * Primary User Name [First] [Last] — 18B12
- * Phone ( [ ] ) [ ] - [ ] Ext. [ ] — 18B14
- * User ID [At least 8 characters] — 18B16
- * Email [ ] — 18B18

18B24

( Clear Form ) ( Cancel Registration ) ( Continue ) — 18B20

18B26

| Global Footer |

Fig. 18B

Global Navigation

Register with Web-Chek
Please verify your registration Information. Once you have confirmed all of the information, click the Save button.

18C06 — Step: 1 - 2

Company Information

| | |
|---:|:---|
| FEIN | NNNNNNNNN |
| Company Name | CompanyName |
| Address | NNN Company Address |
| City | CityName |
| State | StateName |
| Zip | NNNNN-NNNN |

Primary User

| | |
|---:|:---|
| Primary User Name | FirstName LastName |
| Phone | (NNN) NNN-NNNN  Ext. NNNN |
| User ID | UserID |
| Email | xxx@xxx.xx |

18C02

18C08 — ( Make Changes )   ( Continue ) — 18C04

Global Footer

| Signed-In Web-chek Account Identifier Header |
| Global Navigation |
| Level 2 Signed In Navigation |
| Level 3 Your Account Navigation |

Add Bank Account InformationYour Current Web-Chek Account — 18H02
Add your bank account information. This bank account(s) will be used to make payments to the SDU. You may add multiple banks. — 18H04

Required fields are marked with a red asterisk (*).

* Routing Transit Number [        ] — 18H06
* Account Number [        ] — 18H08
Account Type [Checking ▼]
* Maximum Daily Withdrawl $ [        ] — 18H10
Default Account? ☐

18H12 — (Continue) (Cancel) — 18H14

| Global Footer |

Fig. 18H

Signed-In Web-chek Account Identifier Header

Global Navigation

Level 2 Signed In Navigation

Level 3 Your Account Navigation

User List

Below is a list of your Web-Chek account users. You may view and edit the details of a user by selecting the User ID.

( Add User )    ( Delete Selected Users )

| User ID | Name | Status | | Check box for deletion |
|---|---|---|---|---|
| UserID | LastName, FirstName | Active | ( Reset Password ) | ☐ |
| UserID | LastName, FirstName | Active | ( Reset Password ) | ☐ |
| UserID | LastName, FirstName | Active | ( Reset Password ) | ☐ |
| UserID | LastName, FirstName | Inactive | | ☐ |
| UserID | LastName, FirstName | Active | ( Reset Password ) | ☐ |

Global Footer

```
Global Navigation
Level 2 Signed In Navigation

Payment Verification
Please review the payment information for accuracy. You can change any of the payment
information by clicking the Make Changes button.

Profile Name    ProfileName
18P10
                Effective Date  MM/DD/YYYY
                                Note: SDU will receive funds on MM/DD/YYYY         18P04
                Bank Account    BankAccountName
                                Account Type:    Checking
                                Account #:       123
                                Routing #:       123456789
                Number of Employees  NNN,NNN                                        18P08
                Total Payment Amount  $ NNN,NNN,NNN.NN                              18P09

( Cancel )  ( Make Changes )  ( Save Payment )  ( Submit Payment )
                                                                                    18P16
18P12

<<Employee Records that do not pass Case Validation>>
            Columns: State, Case #, EmployeeName, SSN, Amount
                                                                                    18P14
18P18
Global Footer
```

Global Navigation

Level 2 Signed In Navigation

Thank You for using Web-Chek!
Please print this page for your records. Should you have any questions regarding this payment or other Web-Chek transactions, you can contact the State Disbursement Unit from the <u>Contact Web-chek Customer Service</u> page in Your Account. — 18Q04

18Q02 — You can also review detailed payment transaction information from the <u>Reports</u> menu in Your Account. It provides a complete payment transaction record including

- All transactions submitted with Web-Chek
- Individual Payment Profile history
- Individual Employee payment history

---

Your withholding payment was entered on MM/DD/YYYY — 18Q06

| | |
|---|---|
| Profile Name | ProfileName |
| Effective Date | MM/DD/YYYY |
| | Note: SDU will receive funds on MM/DD/YYYY |
| Bank Account | BankAccountName |
| | Account Type: Checking |
| | Account #: 123 |
| | Routing #: 123456789 |
| Number of Employees | NNN,NNN |
| Total Payment Amount | $ NNN,NNN,NNN.NN |

— 18Q08

[ Return to Create Payment Home ] — 18Q10

Global Footer

Fig. 18Q

Global Navigation

Level 2 Signed In Navigation

Payment Profile List
Below is a list of your withholding payment profiles. Payment profiles are used to create and submit withholding payments on a regular basis. You may view and edit the details of a profile by selecting a Profile Name.

18R02
18R06

Add Profile     Delete Selected Profiles

18R04

| Profile Name | Number of Employees | Bank Account | Check box for deletion |
|---|---|---|---|
| Profile Name | NNN,NNN | Bank Account Name | ☐ |
| Profile Name | NNN,NNN | Bank Account Name | ☐ |
| Profile Name | NNN,NNN | Bank Account Name | ☐ |
| Profile Name | NNN,NNN | Bank Account Name | ☐ |
| Profile Name | NNN,NNN | Bank Account Name | ☐ |
| Profile Name | NNN,NNN | Bank Account Name | ☐ |
| Profile Name | NNN,NNN | Bank Account Name | ☐ |
| Profile Name | NNN,NNN | Bank Account Name | ☐ |
| Profile Name | NNN,NNN | Bank Account Name | ☐ |
| Profile Name | NNN,NNN | Bank Account Name | ☐ |

18R12
18R08
18R10
18R16

Display 10 at a time    <<Previous  Next>>

18R14
18R18

Global Footer

Fig. 18R

Global Navigation

Level 2 Signed In Navigation

Profile Detail
You may enter and edit payment profile information as needed. If a new Default Bank Account is selected, the Account Type, Number and Routing Number will not update until the Save and Update button is selected.

Payment Profile Name: [ ]

Default Bank Account: Select Bank
Account Type: Checking
Account #: 123
Routing #: 123456789

Total Payment Amount $ NNN,NNN,NNN.NN ( Cancel ) ( Save and Update )

Employee List
You may add, edit, and delete employee information as needed. To view and edit Employee Detail, select an Employee Name.

( Add Employee )                                    ( Delete Selected Employees )

| Employee Name | SSN | State | Case | Payment Amount | Check box for deletion |
|---|---|---|---|---|---|
| LastName, FirstName | 333-22-4444 | MI | 999999999 AA | $ NNN,NNN.NN | ☐ |
| LastName, FirstName | 333-22-4444 | TX | 999999999 AA | $ NNN,NNN.NN | ☐ |
| LastName, FirstName | 333-22-4444 | LA | 999999999 AA | $ NNN,NNN.NN | ☐ |
| LastName, FirstName | 333-22-4444 | FL | 999999999 AA | $ NNN,NNN.NN | ☐ |
| LastName, FirstName | 333-22-4444 | MI | 999999999 AA | $ NNN,NNN.NN | ☐ |
| LastName, FirstName | 333-22-4444 | MI | 999999999 AA | $ NNN,NNN.NN | ☐ |
| LastName, FirstName | 333-22-4444 | MI | 999999999 AA | $ NNN,NNN.NN | ☐ |
| LastName, FirstName | 333-22-4444 | TX | 999999999 AA | $ NNN,NNN.NN | ☐ |
| LastName, FirstName | 333-22-4444 | FL | 999999999 AA | $ NNN,NNN.NN | ☐ |
| LastName, FirstName | 333-22-4444 | TX | 999999999 AA | $ NNN,NNN.NN | ☐ |

Display 10 at a time    <<Previous  Next>>

Global Footer

Fig. 18S

Global Navigation

Level 2 Signed In Navigation

Employee Detail
You may enter and edit Employee information as needed. After you save the Employee information, you will be returned to the Payment Profile screen.

Required fields are marked with a red asterisk (*).

- * Name — First / Last — 18T02, 18T04
- * SSN — 9-Digit Social Security Number — 18T06
- * State — State where payment is sent — Select State — 18T09
- * Case # — Case identification number — 18T08
- * FIPS — Standardized county code — (FIPS Lookup) — 18T12, 18T10
- * Withholding Amount $ 1.00 — 18T14
- * Includes Medical ⦿ No  ○ Yes — 18T15
- Employment ☐ Check here if employee is no longer employed — 18T16

(Cancel) (Save) (Accept) — 18T18, 18T20

Global Footer

Fig. 18T

Web-Chek Mast Header

Payment Transaction Report
From MM/DD/YYYY To MM/DD/YYYY

Payment Profile Name: ProfileName
Bank: BankName
Routing Number: 999999999
Date Transfer Initiated: MM/DD/YYYY
Date SDU Received Funds: MM/DD/YYYY

| SSN | Name | Case ID | FIPS | Amount |
|---|---|---|---|---|
| 333-22-4444 | LastName, FirstName | 999999999AA | 333 | $ NNN,NNN.NN |
| 333-22-4444 | LastName, FirstName | 999999999AA | 333 | $ NNN,NNN.NN |
| 333-22-4444 | LastName, FirstName | 999999999AA | 333 | $ NNN,NNN.NN |
| 333-22-4444 | LastName, FirstName | 999999999AA | 333 | $ NNN,NNN.NN |
| 333-22-4444 | LastName, FirstName | 999999999AA | 333 | $ NNN,NNN.NN |

Number of Employees: NNN,NNN   Total Payment Amount: $NNN,NNN,NNN.NN

---

Payment Profile Name: ProfileName
Bank: BankName
Routing Number: 999999999
Date Transfer Initiated: MM/DD/YYYY
Date SDU Received Funds: MM/DD/YYYY

| SSN | Name | Case ID | FIPS | Amount |
|---|---|---|---|---|
| 333-22-4444 | LastName, FirstName | 999999999AA | 333 | $ NNN,NNN.NN |
| 333-22-4444 | LastName, FirstName | 999999999AA | 333 | $ NNN,NNN.NN |
| 333-22-4444 | LastName, FirstName | 999999999AA | 333 | $ NNN,NNN.NN |
| 333-22-4444 | LastName, FirstName | 999999999AA | 333 | $ NNN,NNN.NN |
| 333-22-4444 | LastName, FirstName | 999999999AA | 333 | $ NNN,NNN.NN |

Number of Employees: NNN,NNN   Total Payment Amount: $NNN,NNN,NNN.NN

Fig. 18W

Web-Chek Mast Header

Payment Profile Report

Payment Profile Name: ProfileName
Bank: BankName
Account Number: 999999999

| SSN | Name | Case ID | FIPS | Amount |
|---|---|---|---|---|
| 333-22-4444 | LastName, FirstName | 999999999AA | 333 | $ NNN,NNN.NN |
| 333-22-4444 | LastName, FirstName | 999999999AA | 333 | $ NNN,NNN.NN |
| 333-22-4444 | LastName, FirstName | 999999999AA | 333 | $ NNN,NNN.NN |
| 333-22-4444 | LastName, FirstName | 999999999AA | 333 | $ NNN,NNN.NN |
| 333-22-4444 | LastName, FirstName | 999999999AA | 333 | $ NNN,NNN.NN |

Number of Employees: NNN,NNN     Total Payment Amount: $NNN,NNN,NNN.NN

18X02

Payment Profile Name: ProfileName
Bank: BankName
Account Number: 999999999

| SSN | Name | Case ID | FIPS | Amount |
|---|---|---|---|---|
| 333-22-4444 | LastName, FirstName | 999999999AA | 333 | $ NNN,NNN.NN |
| 333-22-4444 | LastName, FirstName | 999999999AA | 333 | $ NNN,NNN.NN |
| 333-22-4444 | LastName, FirstName | 999999999AA | 333 | $ NNN,NNN.NN |
| 333-22-4444 | LastName, FirstName | 999999999AA | 333 | $ NNN,NNN.NN |
| 333-22-4444 | LastName, FirstName | 999999999AA | 333 | $ NNN,NNN.NN |

Number of Employees: NNN,NNN     Total Payment Amount: $NNN,NNN,NNN.NN

Fig. 18X

Web-Chek Mast Header

Employee Payment History Report
18Y02 — LastName, FirstName
SSN: 333-22-4444

Initiate Transfer Date Range: MM/DD/YYYY to MM/DD/YYYY — 18Y04

| Status | Profile Name | Entry Date | Initiate Date | Case ID | FIPS | Amount |
|---|---|---|---|---|---|---|
| Paid | ProfileName | MM/DD/YYYY | MM/DD/YYYY | 999999999AA | 333 | $ NNN,NNN.NN |
| In Progress | ProfileName | MM/DD/YYYY | MM/DD/YYYY | 999999999AA | 333 | $ NNN,NNN.NN |
| New | ProfileName | MM/DD/YYYY | MM/DD/YYYY | 999999999AA | 333 | $ NNN,NNN.NN |
| Paid | ProfileName | MM/DD/YYYY | MM/DD/YYYY | 999999999AA | 333 | $ NNN,NNN.NN |
| New | ProfileName | MM/DD/YYYY | MM/DD/YYYY | 999999999AA | 333 | $ NNN,NNN.NN |

Number of Payments: NNN,NNN      Total Payment Amount: $NNN,NNN,NNN.NN

Fig. 18Y

Global Navigation

Level 2 Signed In Navigation

Company List

To view a company detail, please select its FEIN.

Delete Selected Companies

| Account # | FEIN | Company Name | Status | Check box for deletion |
|---|---|---|---|---|
| 093272 | NNNNNNNNN | CompanyName | Active | ☐ |
| 323756 | NNNNNNNNN | CompanyName | New | ☐ |
| 213223 | NNNNNNNNN | CompanyName | NSF | ☐ |
| 321333 | NNNNNNNNN | CompanyName | Inactive | ☐ |
| 733565 | NNNNNNNNN | CompanyName | New | ☐ |
| 145243 | NNNNNNNNN | CompanyName | Inactive | ☐ |
| 9653343 | NNNNNNNNN | CompanyName | Active | ☐ |
| 105364 | NNNNNNNNN | CompanyName | Active | ☐ |
| 437743 | NNNNNNNNN | CompanyName | Active | ☐ |
| 043828 | NNNNNNNNN | CompanyName | Active | ☐ |

Display 10 at a time ▼    <<Previous    Next>>

| Global Navigation |
| --- |
| Level 2 Signed In Navigation |
| Level 3 Web-Chek Account Navigation |

Payment Submittal Summary Report

State: M  Submittal Start Date: 9/1/01  Submittal End Date: 10/15/01  Employer: ABC Co

| Employer Submittal Date | Requested Effective Date | Actual Effective Date | Employer Name | Bank Account Status | # of Employee records | $ of Emplyr Pmt. | Batch Status |
| --- | --- | --- | --- | --- | --- | --- | --- |
| 09/04/01 | 09/07/01 | 09/07/01 | ABC Co. | New | 5 | $980.00 | Credit Submitted |
| 09/18/01 | 09/21/01 | 09/21/01 | ABC Co. | Established | 5 | $1,010.00 | Credit Submitted |
| 09/25/01 | 09/28/01 | 09/28/01 | ABC Co. | Established | 5 | $1,010.00 | Credit Submitted |
| 10/02/01 | 10/05/01 | 10/05/01 | ABC Co. | Established | 6 | $1,265.00 | Credit Submitted |
| 10/09/01 | 10/12/01 | 10/12/01 | ABC Co. | Established | 6 | $1,265.00 | Established Debit Submitted |
| | | | | | Total: | $5,530.00 | |

- Date originally submitted by an Employer
- Effective date submitted by Employer
- Effective date actually used by Web-Chek to process the debit and credit files.
- PRINT — To print the report to the user's printer
- The full list of bank account status's will be identified in the system design, but will basically identify if the account is "new", "established", "suspended", "inactive", etc.
- Number of employee records associated with a specific payment
- Total amount of individual payment submitted by employer
- Displays the status of a particular payment in relation to the standard payment lifecycle. Actual status's will be identified in the Web-Chek design/data model

Fig. 26N

| Global Navigation |
|---|
| Level 2 Signed In Navigation |
| Level 3 Web-Chek Account Navigation |

SDU Credit Submittal Summary Report
*Date Credit Submitted to SDU*

*State - MI*  *Starting Submittal Date: 10/10/2001*
*Report date: 10/16/2001*  *Ending Submittal Date: 10/15/2001*

| Date Submitted to SDU | # of Employer records | # of Employee Records | Credit Value |
|---|---|---|---|
| 10/10/2001 | 21 | 57 | $4,989.00 |
| 10/11/2001 | 14 | 33 | $2,700.00 |
| 10/12/2001 | 3 | 9 | $675.00 |
| 10/15/2001 | 9 | 24 | $1,923.00 |
| 10/16/2001 | 30 | 60 | $5,678.00 |

PRINT

Fig. 26O

Global Navigation

Level 2 Signed In Navigation

Level 3 Web-Chek Account Navigation

Employer Payment Returns Report
Ordered by: Employer Name
Report run date and time: 10/15/2001 9:26AM    State: Michigan    Return Date Range: 9/1/01 to 10/15/2001

| Employer Name | WC Employer ID | WC Batch Number | Return Date | Pre Credit Return Amt | Post Credit Return Amt | Return Reason | Contact Name | Phone Number | Extension |
|---|---|---|---|---|---|---|---|---|---|
| ABC Co | ????? | ??????? | 7/15/2001 | $456.22 | | NSF | Kobie Bryant | 999-999-9999 | x ##### |
| BCD Co | ????? | ??????? | 7/28/2001 | $2,345.00 | | NSF | Shaquille O'neil | 999-999-9999 | x ##### |
| CDF Co | ????? | ??????? | 8/9/2001 | | $155.00 | Account Closed | Roger Clemens | 999-999-9999 | x ##### |
| DEF Co | ????? | ??????? | 8/11/2001 | $989.00 | | Invalid Account # | David Cone | 999-999-9999 | x ##### |
| EFH Co | ????? | ??????? | 9/3/2001 | | $225.00 | NSF | Derik Jeeter | 999-999-9999 | x ##### |
| | | | Totals | $3,790.22 | $380.00 | | | | |

PRINT

This is the unique ID assigned to employers by Web-Chek.

This is the batch number that the employer payment is associated with.

The date that an payment was returned from the Employers bank.

The amount of return received before the corresponding credit was sent to SDU account. This is not a loss to Web-Chek.

The amount of return received after the corresponding credit was sent to any associated SDU account. This is a loss to Web-Chek.

The Return Reason is derived from the list of return codes and reasons supplied by the ACH and NACHA Rules.

The employer primary contact, phone number and phone extension.

Fig. 26P

APPARATUS AND METHODS FOR PROVIDING A PAYMENT SYSTEM OVER A NETWORK

RELATED APPLICATIONS

This application is a divisional of application Ser. No. 12/774,460, filed May 5, 2010 now U.S. Pat. No. 8,015,111, titled Apparatus and Methods for Providing a Payment System Over a Network, which is a divisional of application Ser. No. 10/043,493, filed Jan. 14, 2002 now U.S. Pat. No. 7,739,195, and which claims the benefit of U.S. Provisional Application No. 60/260,896, titled Method and Apparatus for Payment Processing Using Debit-Based Electronic Funds Transfer and Disbursement Processing Using Addendum-Based Electronic Data Interchange Over a Network, filed Jan. 12, 2001, all of which are incorporated herein by reference.

FIELD OF THE INVENTION

The present invention relates to apparatus and methods for providing a payment system over a network. In particular, the present invention relates to apparatus and methods for providing a payment system over a network for multiple employers to make multiple payments to multiple recipients.

BACKGROUND OF THE INVENTION

Electronic payments are faster, less expensive, more secure, and more efficient than check-based payments. For example, the direct deposit arrangement between employers and banks provides a fast and secure electronic alternative to traditional paper paychecks for the payment of employees. Under the direct deposit arrangement, an employee's paycheck is electronically deposited from the employer's account to the employee's account, thus saving time and expense while providing a transaction that is convenient for the employer and the employee.

Employers may fulfill payment obligations on behalf of their employees by collecting funds, such as taxes or child support payments, and remitting the funds to appropriate recipients. In the case of tax payments, the recipient may be, for example, a federal or state entity. In the case of child support payments, the recipient may be, for example, an intermediary such as a state agency charged with distributing child support payments. Often, the recipient may differ from employee to employee. For example, an employer, such as a national corporation, may collect child support payments from employees that reside and owe child support in different states. The employer must therefore process payments for many different recipients, a confusing and time-consuming process.

To ease the submission of payments collected by an employer, there is a need for a system to collect and process payments from multiple employees for multiple recipients in an electronic manner. However, many obstacles prohibit electronic payment processing on a state or national basis. First, a single employer may collect payments, such as child support payments, for recipients in several different states. Second, in the context of child support payments, each state may have different rules that govern the information employers must provide with payments. State agencies that oversee the payment process require processing information that may differ from state to state. Third, electronic payment processing requires new technology. Many employers are unable to afford purchasing or developing new technology for electronic payment processing.

Despite these obstacles, there is a need for an electronic payment processing system that accommodates the requirements of multiple employees for multiple recipients and that does not require an investment in new technology and/or equipment. Furthermore, there is a need for an electronic payment system whereby the employer may initiate transactions over a network, such as the Internet, with a single processing entity rather than submitting payments directly to multiple recipients.

SUMMARY OF THE INVENTION

A system consistent with the present invention may be accessed by an employer over a network such as the Internet. The employer may use such a system to submit payments collected from employees to a recipient, such as a state agency responsible for delivering a child support payment. Consistent with the present invention, the recipient may or may not be a government entity. For example, a state may hire a private company to collect and disburse payments such as child support payments.

Consistent with the present invention, an employer may interact with an accumulator via the network to create an employee withholding profile for each employee for which the employer withholds a payment, such as a child support payment. Employers may use the system for any type of employee, such as employees paid monthly, weekly, or bi-weekly. To submit a payment, an employer may provide data regarding the employee and the payment to the accumulator via the Internet. The data may include information such as the employee's name, social security number, case number or account number with the payment recipient, the amount withheld, the date of the withholding, and whether the employee has medical insurance. The data provided may vary from recipient to recipient. For example, an agency in one state may require child support payers to carry medical insurance while an agency in another state may not.

When the accumulator collects information from an employer for employees with different recipients, the accumulator may filter and/or format the data according to each recipient's requirements. In this way, the employer may submit one set of data that is customized for multiple recipients by the accumulator. This greatly simplifies the task of an employer with employees in multiple states.

To process a payment, the accumulator may receive a payment from an employer and pass the payment to an Automated Clearinghouse (ACH) or other electronic payment processor. The ACH may pass the payment to the employer's bank as a debit, where the money is taken electronically from an account of the employer. When the money is collected from the employer's bank, the ACH may pass a corresponding credit back to the accumulator, which the accumulator may then submit to the recipient. The payment may be processed using, for example, addendum-based electronic data interchange.

Consistent with the present invention, an employer may submit one transaction made up of payments collected from multiple employees bound for multiple recipients and the accumulator may process a single transaction to the employer's bank. The accumulator may then break up the single transaction, grouping the payments by recipient. The data about a payment may be filtered and/or formatted according to its recipient, and the data and a credit may be sent to the appropriate recipient. In this way, apparatus and methods consistent with the present invention advantageously enable an employer to submit payments for multiple employees and/or multiple recipients to a single accumulator via a network.

The accumulator receives the payments, groups and translates them by recipient, and delivers them to ensure accurate and efficient distribution of all payments.

Additional advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

In the drawings:

FIG. 18B is a sample employer registration interface, consistent with one embodiment of the present invention;

FIG. 18C is a sample registration verification interface, consistent with one embodiment of the present invention;

FIG. 18G is a sample add bank account detail interface, consistent with one embodiment of the present invention;

FIG. 18H is a sample bank account detail interface, consistent with one embodiment of the present invention;

FIG. 18J is a sample user list interface, consistent with one embodiment of the present invention;

FIG. 18P is a sample payment verification interface, consistent with one embodiment of the present invention;

FIG. 18Q is a sample payment confirmation interface, consistent with one embodiment of the present invention;

FIG. 18R is a sample payment profile list interface, consistent with one embodiment of the present invention;

FIG. 18S is a sample payment profile detail interface, consistent with one embodiment of the present invention;

FIG. 18T is a sample employee detail interface, consistent with one embodiment of the present invention;

FIG. 18W is a sample payment transaction report, consistent with one embodiment of the present invention;

FIG. 18X is a sample payment profile report, consistent with one embodiment of the present invention;

FIG. 18Y is a sample employee payment history report, consistent with one embodiment of the present invention;

FIG. 26A is a sample company list interface, consistent with one embodiment of the present invention;

FIG. 26C is a sample company detail interface, consistent with one embodiment of the present invention;

FIG. 26M is a sample batch summary report, consistent with one embodiment of the present invention;

FIG. 26N is a sample payment submittal summary report, consistent with one embodiment of the present invention;

FIG. 26O is a sample SDU credit submittal summary report, consistent with one embodiment of the present invention;

FIG. 26P is a sample employer payment returns report, consistent with one embodiment of the present invention;

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

Figure 1:
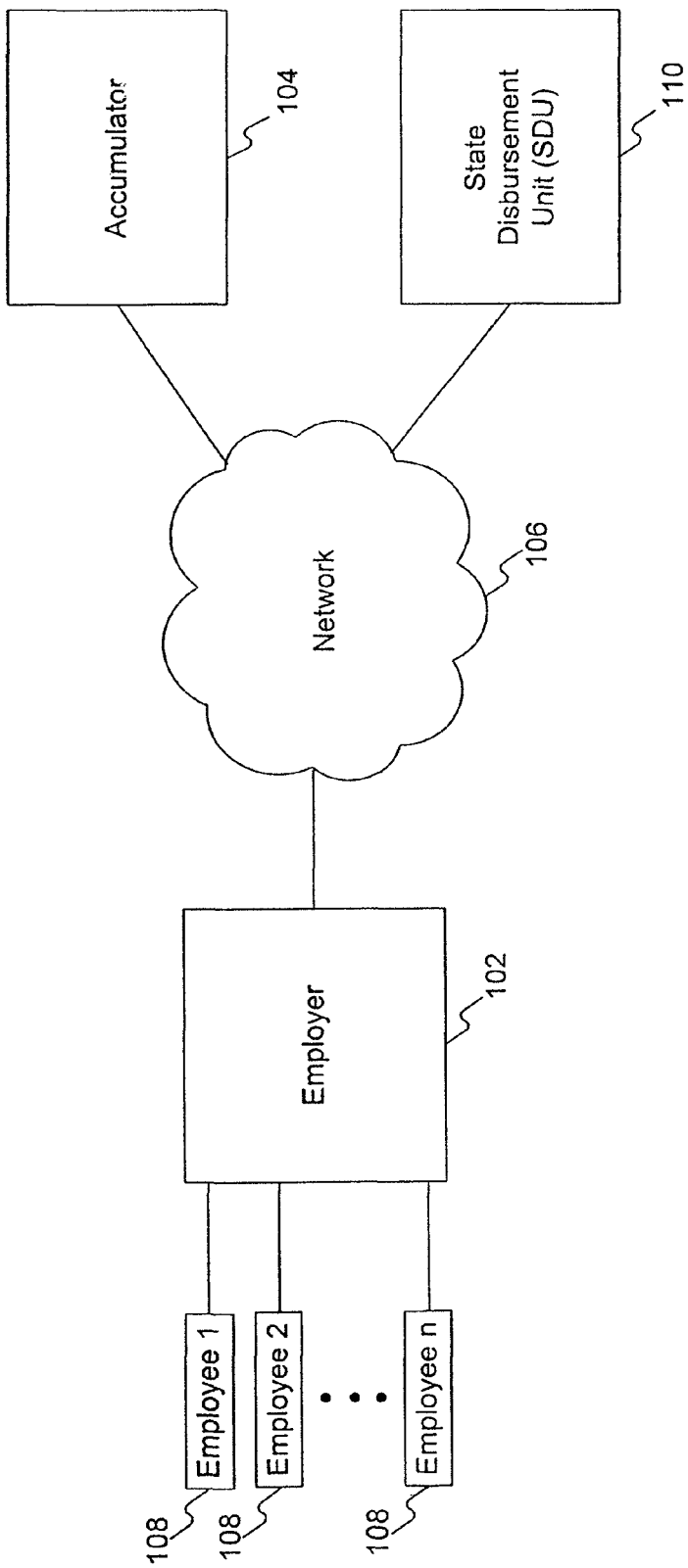
FIG. 1 is a block diagram of a system, consistent with one embodiment of the present invention.

FIG. 1 is a block diagram of a system, consistent with one embodiment of the present invention. An employer 102 may access an accumulator 104 via a network 106, such as the Internet. To do so, employer 102 may use, for example, an Internet browser such Microsoft Internet Explorer™ or Netscape Navigator™. Employer 102 collects payments from one or more employees 108, for example, by withholding an amount from an employee's paycheck. This withholding could be carried out, for example, pursuant to a court-issued child support order. Using methods and apparatus consistent with the present invention, accumulator 104 processes the payments collected by employer 102 and delivers them to a recipient 110. In the child support context, recipient 110 may be a state disbursement unit (SDU) or other agency responsible for processing child support payments. Recipient 110 may be a governmental entity or a nongovernmental entity, e.g., a commercial entity. In one embodiment (not shown) accumulator 104 and recipient 110 may be combined into one entity, accumulator/recipient 112. It should be noted that other embodiments are possible, consistent with the present invention.

Figure 2:
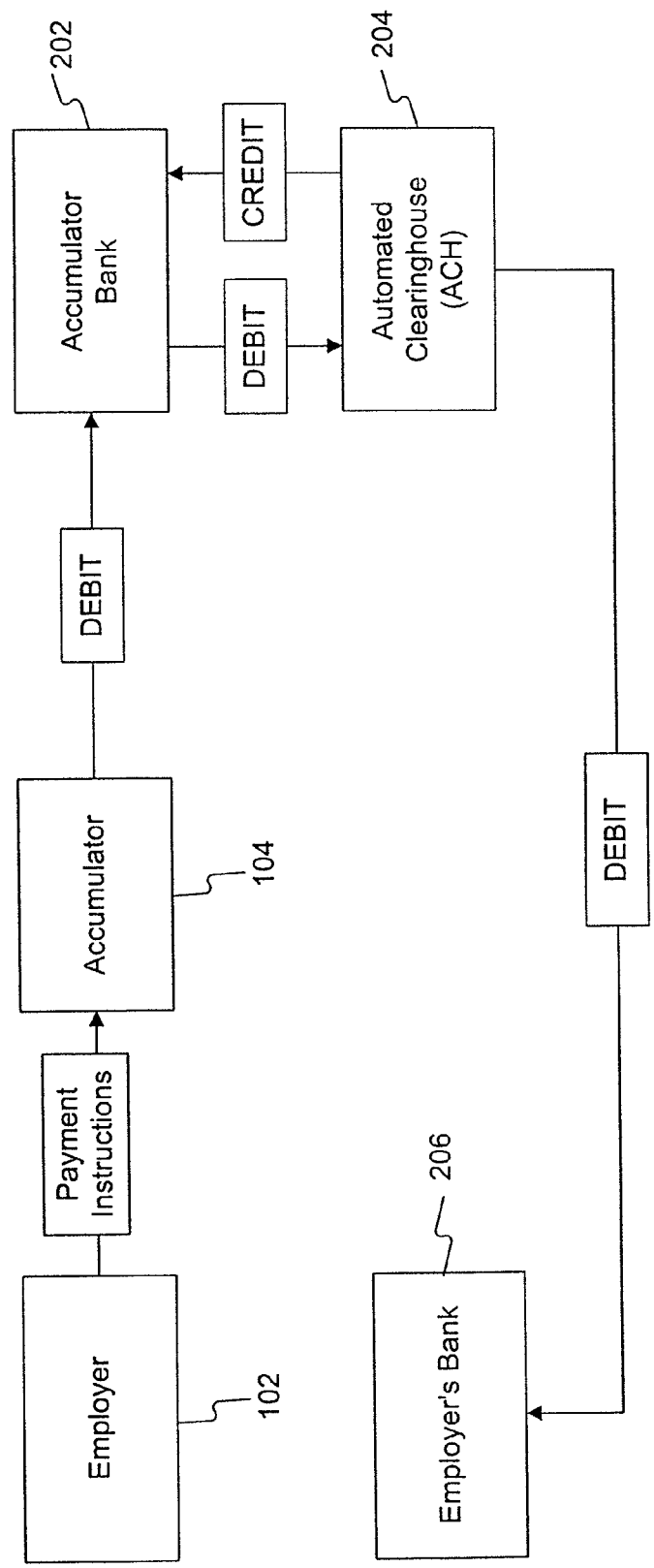
FIG. 2 is another block diagram of a system, consistent with one embodiment of the present invention.

FIG. 2 is another block diagram of a system, consistent with one embodiment of the present invention. As shown in FIG. 2, employer 102 passes payment instructions to accumulator 104. The payment instructions may indicate, for example, that employer 102 has collected a payment from an employee or a plurality of employees. Accumulator 104 generates a debit and sends it to an accumulator bank 202. Accumulator bank 202 may pass the debit to an Automated Clearinghouse (ACH) 204. ACH 204 may be, for example, a known clearinghouse for processing electronic payments. ACH 204 then issues the debit against an employer's bank 206 to withdraw the money for the payment. ACH 204 may also return an offsetting credit to accumulator bank 202 for the benefit of accumulator 104. The credit may then be delivered by accumulator 104 to a recipient, such as recipient 110 (not shown). It should be noted that other embodiments are possible, consistent with the present invention.

Figure 3:
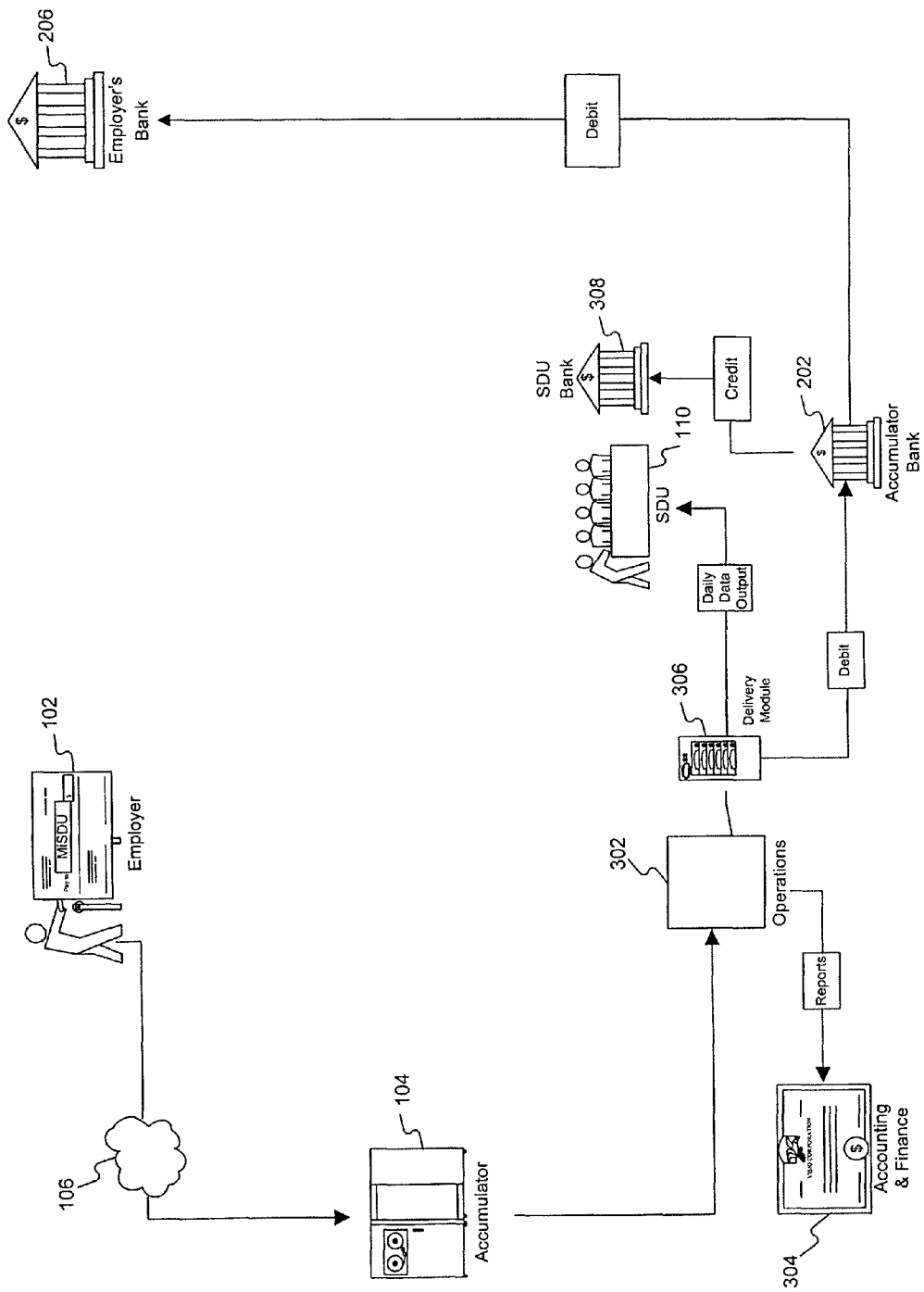
FIG. 3 is a more detailed block diagram of a system, consistent with one embodiment of the present invention.

FIG. 3 is a more detailed block diagram of a system, consistent with one embodiment of the present invention. In particular, FIG. 3 depicts employer 102 using network 106 to access accumulator 104. In this embodiment, accumulator 104 includes an operations desk 302 to generate reports, for example, reports used by an accounting and finance desk 304. Accumulator 104 may also include a delivery module 306 for delivering, for example, data output and debit processing. For example, delivery module 306 may be used by accumulator 104 to transmit data to SDU 110 and to send a debit to accumulator bank 202. It should be noted that other embodiments are possible, consistent with the present invention.

Accumulator bank 202 may pass the debit to employer's bank 206. As described above, accumulator bank 202 and employer's bank 206 may use ACH 204 (not shown) as a trusted third party processor. Accumulator bank 202 may then pass an offsetting credit to SDU bank 308, also via SDU 110. Although accumulator 104, operations desk 302, accounting and finance desk 304, and delivery module 306 are depicted as separate in FIG. 3, one skilled in the art will recognize that these elements may all be combined in accumulator 104. It should be noted that other embodiments are possible, consistent with the present invention.

Figure 4:
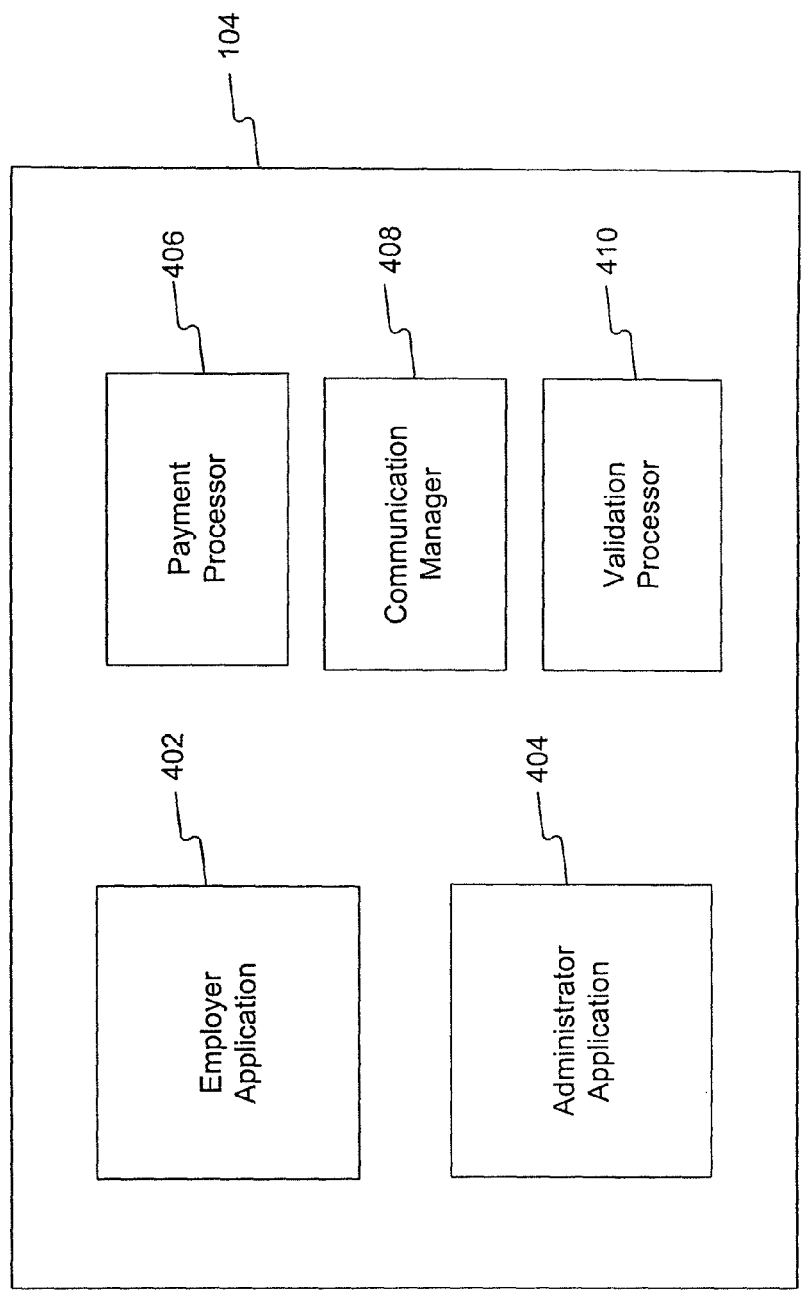
FIG. 4 is a block diagram of an accumulator, consistent with one embodiment of the present invention.

FIG. 4 is a block diagram of accumulator 104, consistent with one embodiment of the present invention. Accumulator 104 includes employer application 402, administrator application 404, payment processor 406, communication manager 408, and validation processor 410. Employer application 402 may facilitate interaction with employer 102 to implement apparatus and methods consistent with the present invention. Employer application 402 is described in greater detail below with reference to FIGS. 7-18. Administrator application 404 may enable an administrator at accumulator 104 to administer and maintain employer application 402, payment processor 406, communications manager 408, and validation processor 410. Administrator application 404 is described in greater detail below with reference to FIGS. 19-26.

Payment processor 406 may process debits and credits for accumulator 104. Communication manager 408 may manage communications between accumulator 104 and, for example, employer 102, recipient 110, and any other entities available via network 106. Validation processor 410 may be used to validate instructions and information received from employer 102 and a recipient 110. It should be noted that other embodiments are possible, consistent with the present invention.

Figure 5:
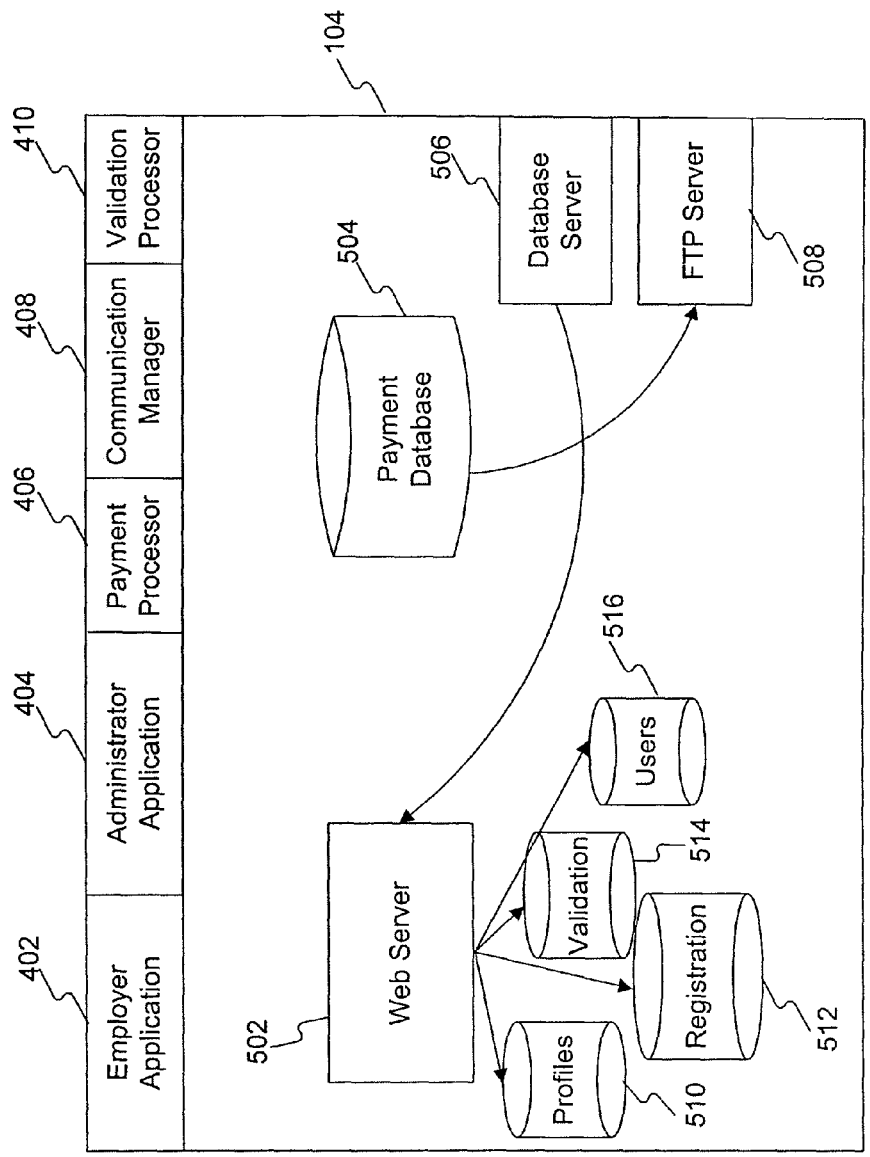
FIG. 5 is a block diagram of accumulator in greater detail, consistent with one embodiment of the present invention.

FIG. 5 is a block diagram of accumulator 104 in greater detail, consistent with one embodiment of the present invention. As shown in FIG. 5, employer application 402, administrator application 404, payment processor 406, communication manager 408, and validation processor 410 all have access to a web server 502 and a payment database 504. Web server 502 may include graphic user interfaces displayed via employer application 402 and administrator application 404 to provide a web-based accumulator. Accumulator 104 may also include a database server 506 and an FTP server 508. Database server 506 may maintain many databases, for example payment database 504, profiles database 510, registration database 512, validation database 514, and users database 516. Although FIG. 5 depicts several separate databases, one skilled in the art will recognize that a single accumulator database may be used. FTP server 508 may utilize file transfer protocol (FTP), for example, to assist communication manager 408 in managing communications for accumulator 104. It should be noted that other embodiments are possible, consistent with the present invention.

Figure 6:
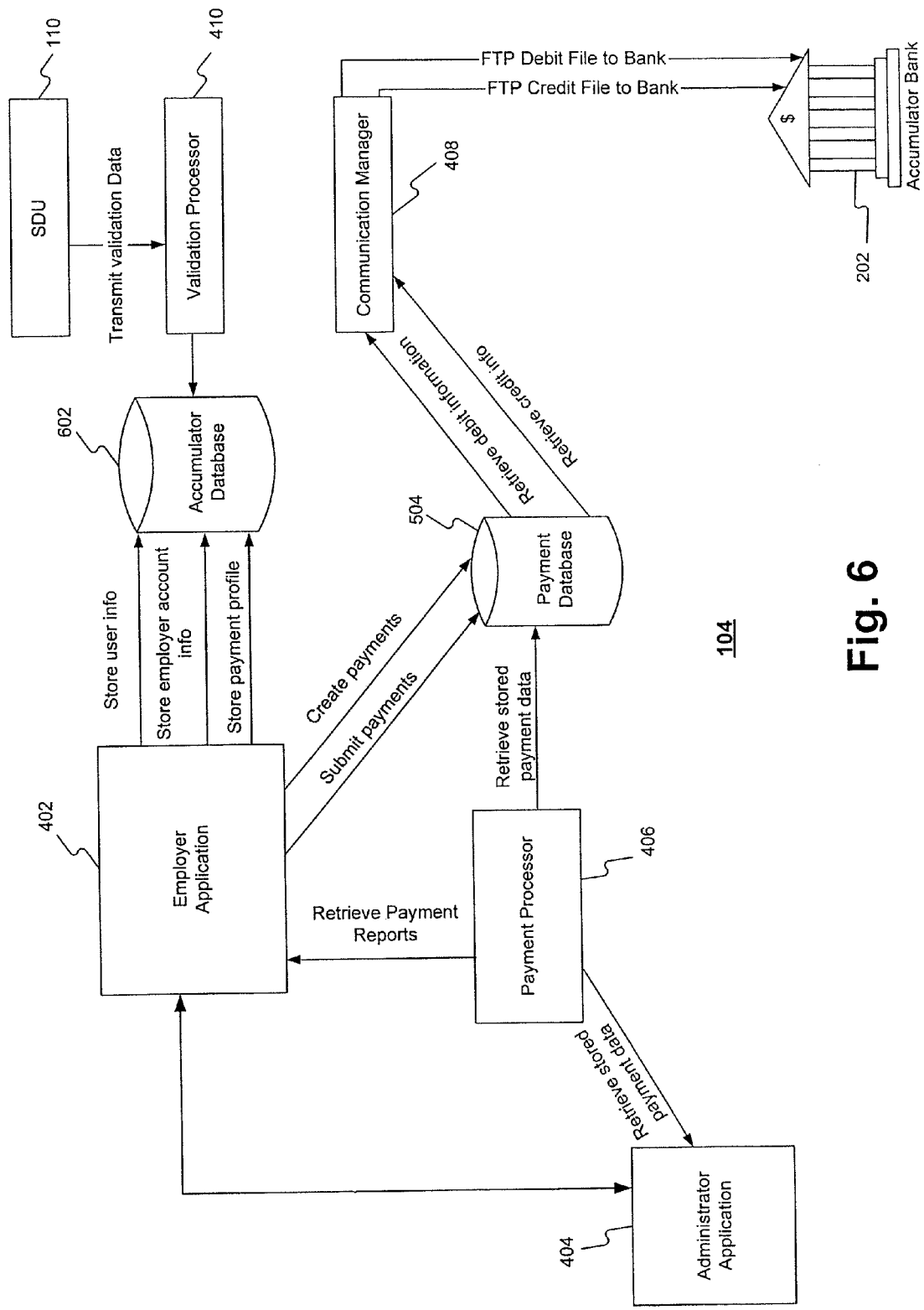
FIG. 6 is a block diagram of accumulator agency in greater detail, consistent with one embodiment of the present invention.

FIG. 6 is a block diagram of accumulator agency 104 in greater detail, consistent with one embodiment of the present invention. Employer application 402 stores user information, employer account information, payment profiles, and other data in accumulator database 602. Accumulator database 602 may include, for example, profiles database 510, registration database 512, validation database 514, and users database 516. Although accumulator database 602 and payment database 504 are depicted as separate in FIG. 6, one skilled in the art will recognize that they could be combined into a single database. User information may be stored, for example, in user database 516. Employer account information may be stored, for example, in registration database 512. Payment profile information may be stored, for example, in profile database 510.

Validation processor 410 may receive validation information from SDU 110 to enable accumulator 104 to verify information received from employer 102. For example, validation processor 410 may verify that an employee of employer 102 is in fact liable for the payment submitted by employer 102. Validation processor 410 may store validation information, for example, in validation database 514, which may be located in accumulator database 602.

Administrator application 404 enables an administrator to interact with accumulator 104. For example, administration application 404 may enable a user to retrieve stored payment data from payment processor 406 to initiate a manual or automatic reconciliation process. Administrator application 404 may also receive messages, such as error messages or service requests, from employer application 402. Payment processor 406 may retrieve payment information stored by employer application 402 in payment database 504. Payment database 504 may be used by employer application 402 to create payments and submit payments.

Communication manager 408 may access payment database 504, for example, to retrieve debit or credit information and deliver it to accumulator bank 202. Communication manager 408 may deliver the debit and/or credit information to accumulator bank 202 using, for example, file transfer protocol (FTP). It should be noted that other embodiments are possible, consistent with the present invention.

Figure 7:
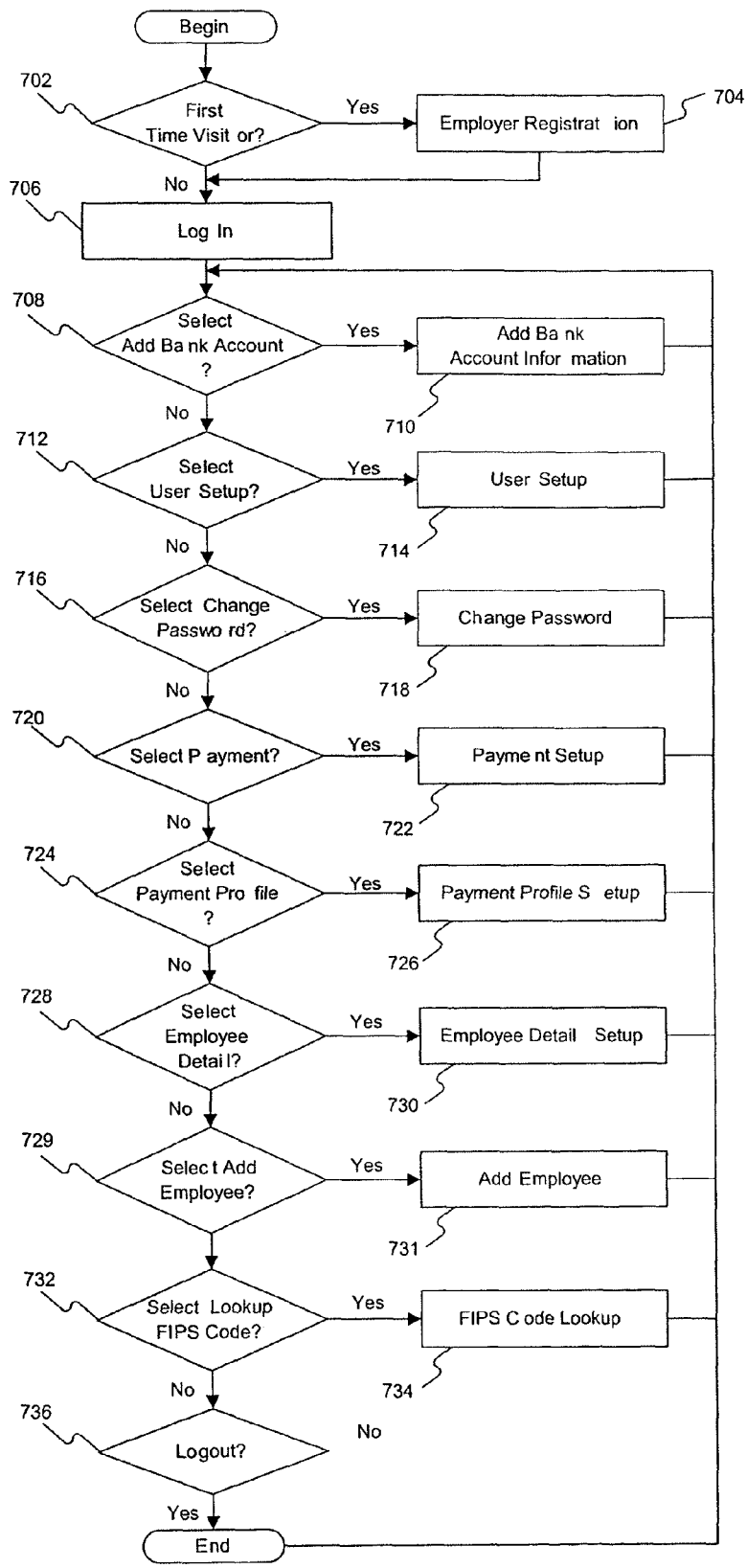
FIG. 7 is a flowchart of processing performed by an employer application, consistent with one embodiment of the present invention.

FIG. 7 is a flowchart of processing performed by employer application 402, consistent with one embodiment of the present invention. To carry out the steps shown in FIG. 7, employer application 402 may present a series of graphical user interfaces to the employer using web server 502. In this way, employers can interact with a website to communicate with accumulator 104. As shown in FIG. 7, the first time an employer visits the accumulator website (step 702), the employer is prompted to register (step 704). An embodiment of the employer registration process is described below with reference to FIG. 8. If the employer has already been to the accumulator website, the employer is prompted to log in (step 706). An embodiment of the log in process is described below with reference to FIG. 9.

Once logged in, the employer can make several different selections for communicating with accumulator 104. These choices may be presented to the employer, for example, as a series of links on a web page. If the employer selects add bank account (step 708), then employer application 402 implements an add bank account information procedure (step 710). An embodiment of the add bank account information procedure is described below with reference to FIG. 10.

If the employer selects user set up (step 712), then employer application 402 follows a user set up procedure (step 714). An embodiment of the user set up procedure is described below with reference to FIG. 11. If the employer selects change password (step 716), then employer application 402 implements a change password procedure (step 718). An embodiment of the change password procedure is described below with reference to FIG. 12. If the employer selects payment set up (step 720), then employer application 402 performs a payment set up procedure (step 722). An embodiment of the payment set up procedure is described below with reference to FIG. 13.

If the employer selects payment profile set up (step 724), then the employer application 402 performs a payment profile set up procedure (step 726). An embodiment of the payment profile set up procedure is described below with reference to FIG. 14. If the employer selects employee detail set up (step 728), then employer application 402 performs an employee detail set up procedure (step 730). An embodiment of the employee detail set up procedure is described below in reference to FIG. 15. If the employer selects add employee (step 729), then employer application 402 performs an add employee procedure (step 731). An embodiment of the add employee procedure is described below with reference to FIG. 16. If the employer selects look up FIPS code (step 732), then employer application 402 performs an FIPS code look up procedure (step 734). An embodiment of the FIPS code look up procedure is described below with reference to FIG. 17. Finally, the employer may choose to log out (step 736). It should be noted that other embodiments are possible, consistent with the present invention.

Figure 8:
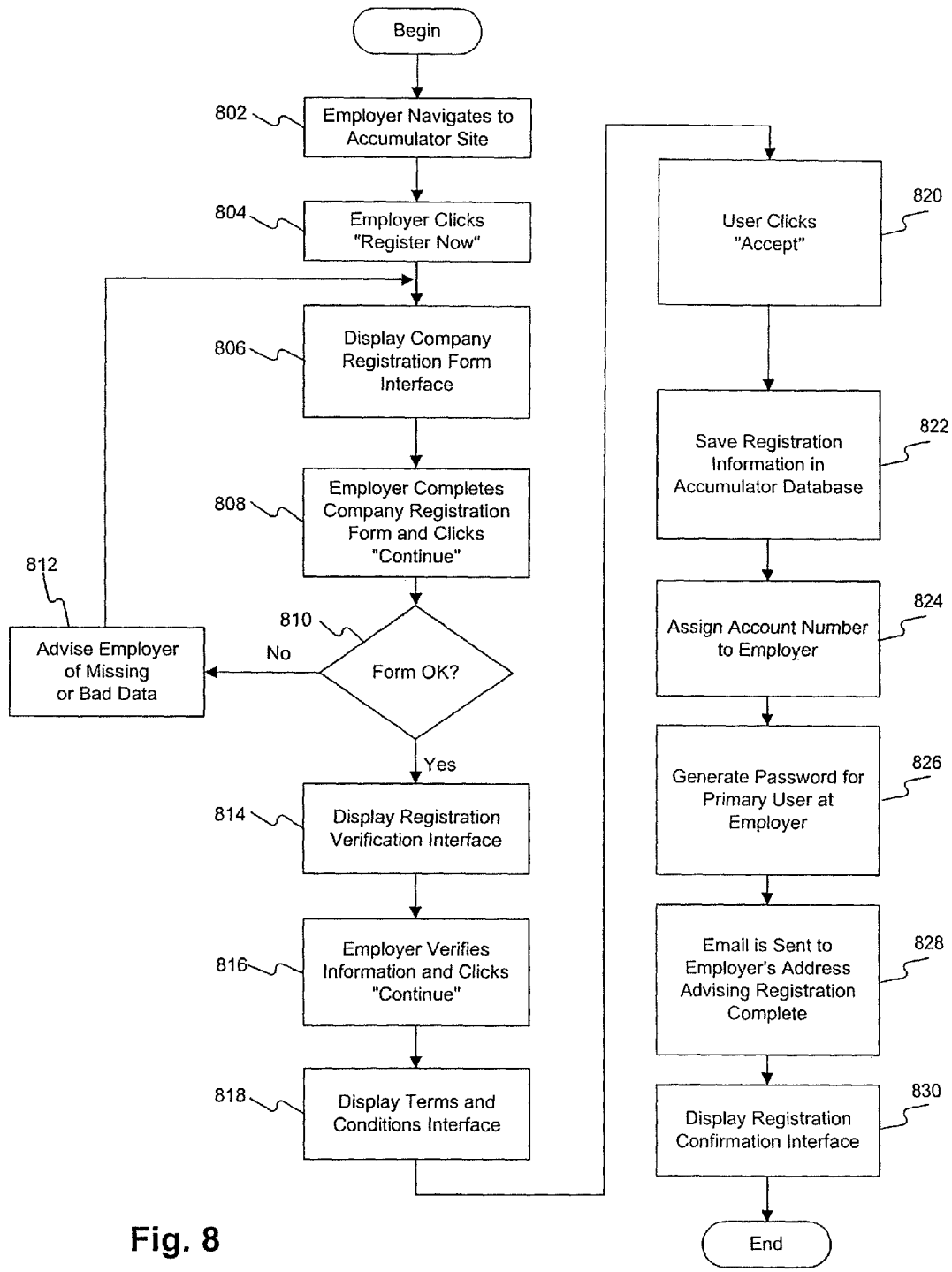
FIG. 8 is a flowchart of an embodiment of an employer registration process, consistent with one embodiment of the present invention.
Figure 18A:
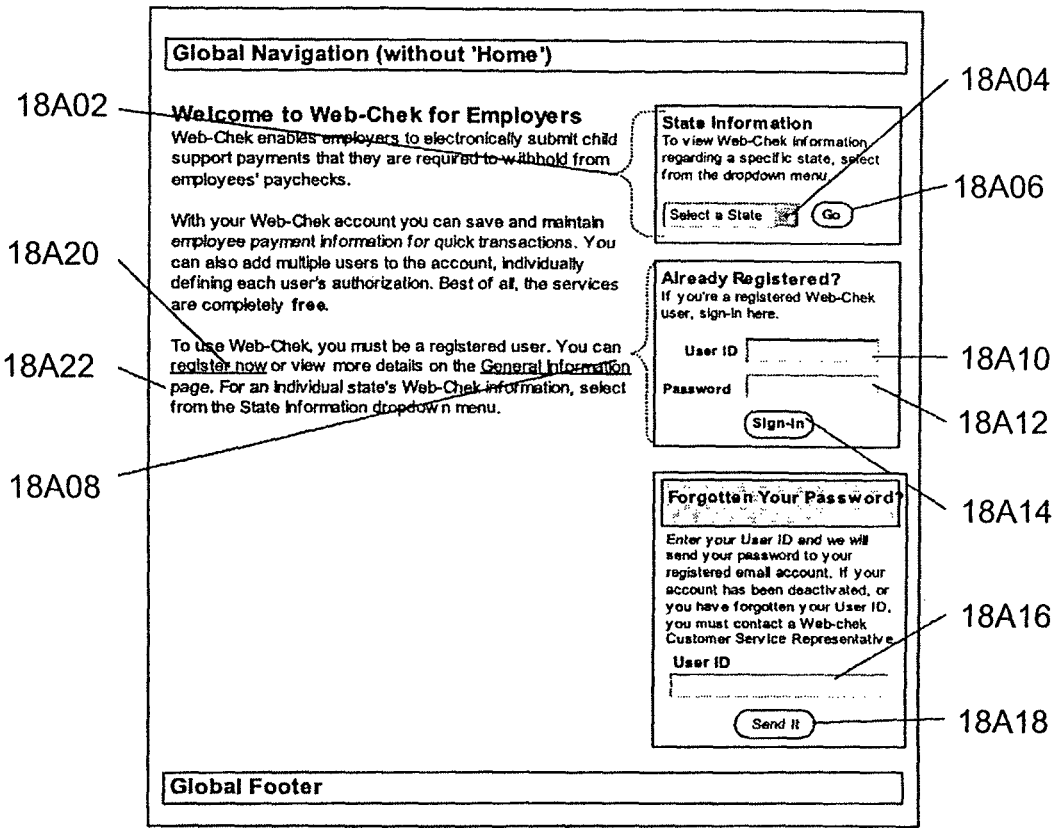
FIG. 18A is a sample welcome interface, consistent with one embodiment of the present invention.
Figure 18D:
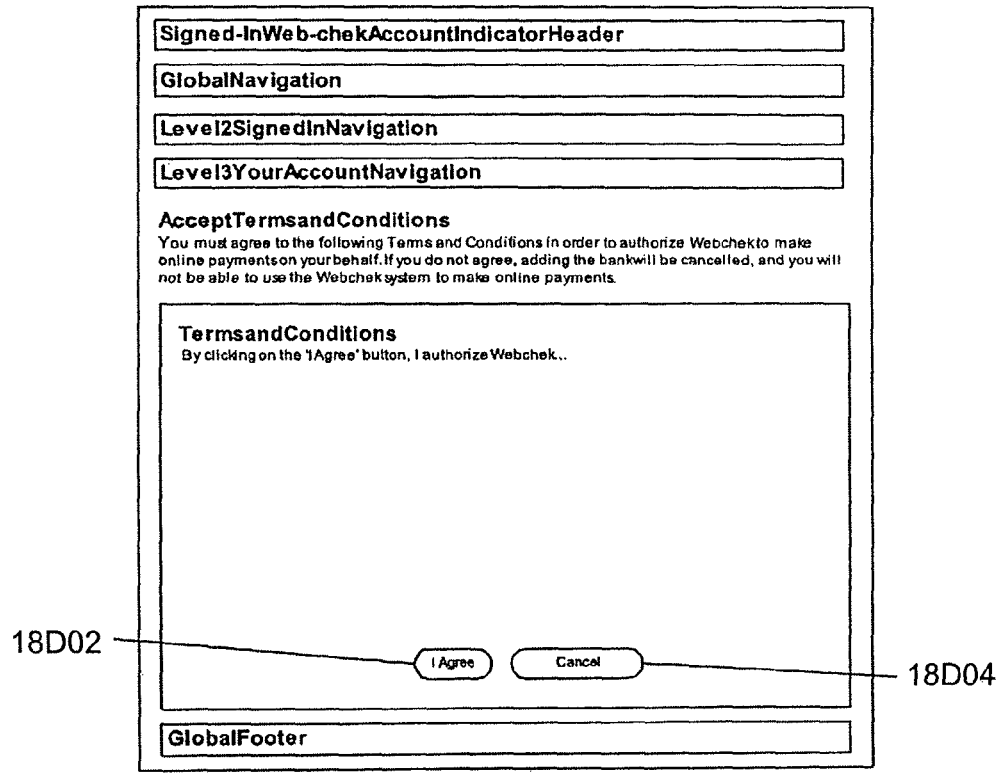
FIG. 18D is a sample terms and conditions interface, consistent with one embodiment of the present invention.
Figure 18E:
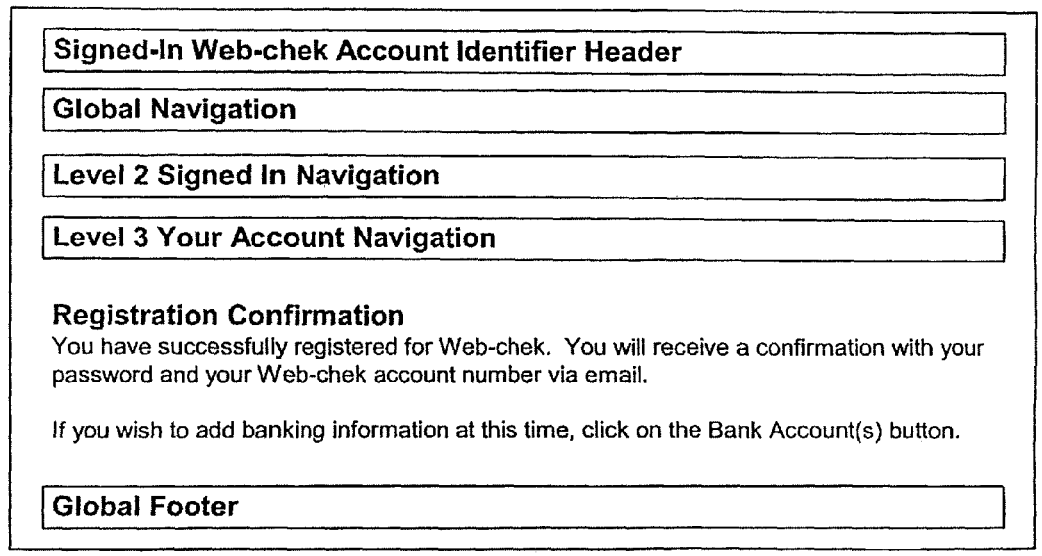
FIG. 18E is a sample registration confirmation interface, consistent with one embodiment of the present invention.

FIG. 8 is a flowchart of an embodiment of an employer registration process, consistent with one embodiment of the present invention. The process begins when the employer navigates to the accumulator website (step 802). FIG. 18A includes a sample welcome interface that may be presented to the employer. When the employer chooses to register, e.g., by selecting a "register now" button (step 804), a company registration form interface is displayed (step 806). FIG. 18B includes a sample of company registration form interface. When the employer completes the company registration form and chooses "continue" (step 808), employer application 402 checks to see if the form is completed correctly (step 810). If the form is not completed correctly, employer application 402 advises the employer of any missing or bad data (step 812). If the form is completed correctly, then a registration verification interface is displayed (step 814). FIG. 18C includes a sample registration verification interface. When the employer verifies the information on the registration verification interface and chooses "continue" (step 816), a terms and conditions interface is displayed (step 818). FIG. 18D includes a sample terms and conditions interface. When the user chooses "accept" (step 820), employer application 402 saves the registration information in the accumulator database (step 822). This information may be stored, for example, in registration database 512. Employer application 402 assigns an account number to the employer (step 824) and generates a password for a primary user at the employer (step 826). An e-mail is sent to the employer's address advising that the registration is complete (step 828) and a registration confirmation interface is displayed (step 830). FIG. 18E includes a sample registration conformation interface. In one embodiment of the present invention, the employer may complete the registration process by printing the completed registration form, signing it, and mailing it to an administrative office with a voided check to authenticate the employer's identity and/or bank account information.

After receiving a user ID and a password, the employer may log onto the web-check system. Once the employer logs onto the system, the employer may be prompted to enter a Federal Employer Identification Number (FEIN), an user ID and an initial temporary password. Subsequent access to the system by the employer may allow the employer to select a profile, change a profile, and to make payments by entering the appropriate amounts and submitting the payments to the system. It should be noted that other embodiments are possible, consistent with the present invention.

Figure 9:
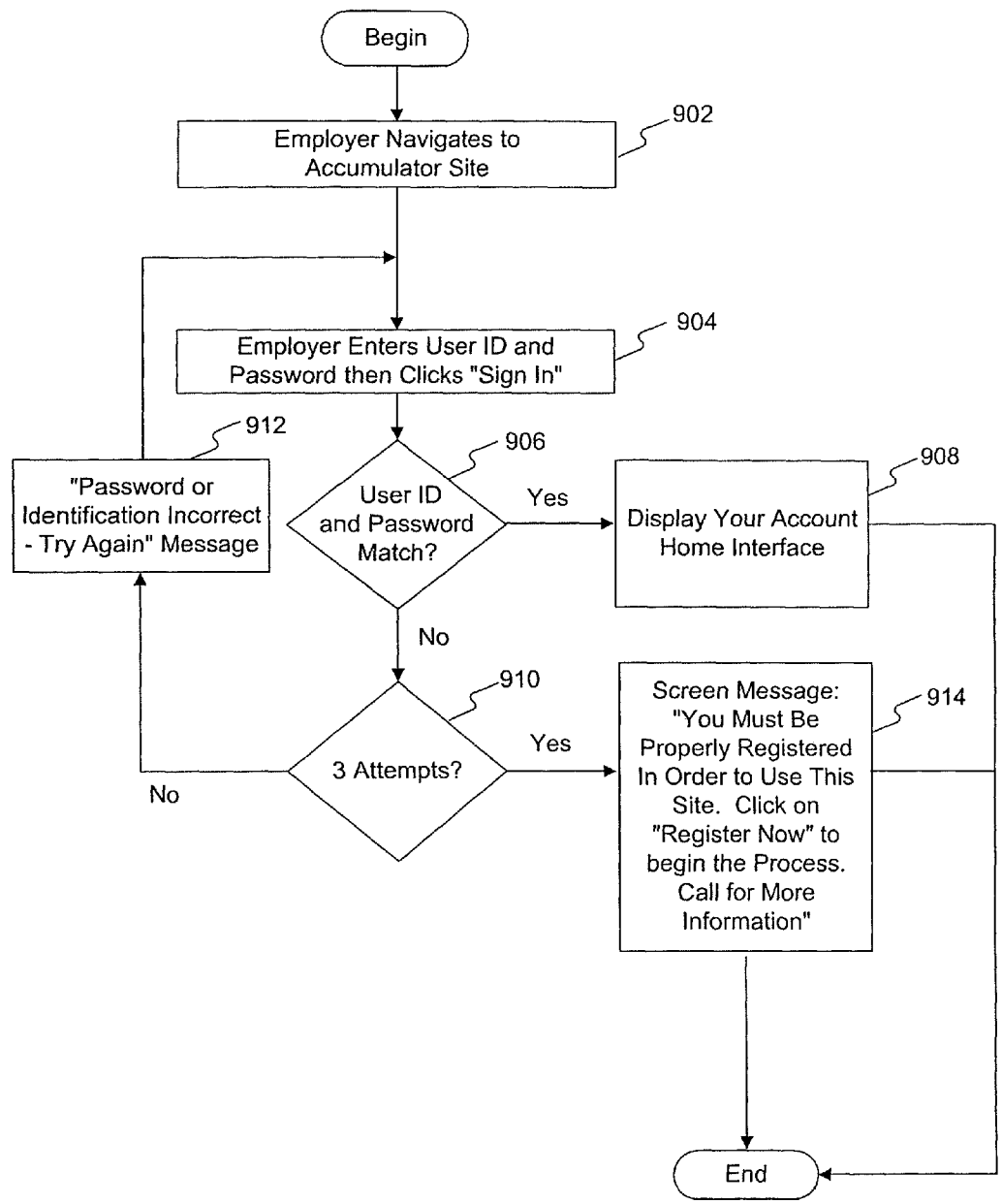
FIG. 9 is a flowchart of an embodiment of a log in process, consistent with one embodiment of the present invention.
Figure 18F:
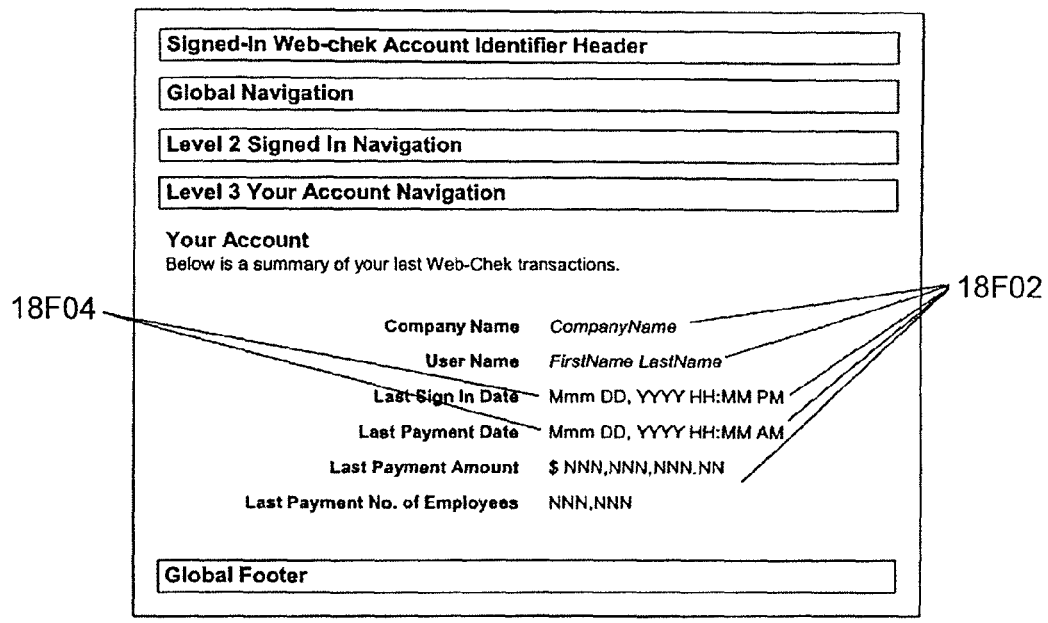
FIG. 18F is a sample account home interface, consistent with one embodiment of the present invention.

FIG. 9 is a flowchart of an embodiment of a log-in process, consistent with one embodiment of the present invention. When an employer navigates to the accumulator website (step 902), the employer may enter the user ID and password into a welcome interface to sign in, e.g., by choosing a "sign in" button (step 904). For example, the user ID and password may be entered in an "already registered" box on the welcome interface. Employer application 402 determines whether the user ID and password entered match a stored user ID and password (step 906). If the entered user ID and password match a stored user ID and password, then an account home interface is displayed (step 908). FIG. 18F includes a sample account home interface. If the entered user ID and password do not match a stored user ID and password, then employer application 402 determines whether the employer has made three attempts to log in to the accumulator website (step 910). If the employer has not made three attempts to log in, then a message is displayed informing the employer that the password or identification information is incorrect and prompting the employer to try again (step 912). The employer is then given another chance to enter the user ID and password (step 904). If the user has three unsuccessful attempts at signing in, then a message is displayed telling the user that they must be properly registered in order to use the website and instructing them to register now to begin that process. The message may provide a toll free number to call for more information (step 914). One of skilled in the art will recognize that the number of attempts before this message is displayed may be greater or fewer than three consistent with the present invention. It should be noted that other embodiments are possible, consistent with the present invention.

Figure 10:
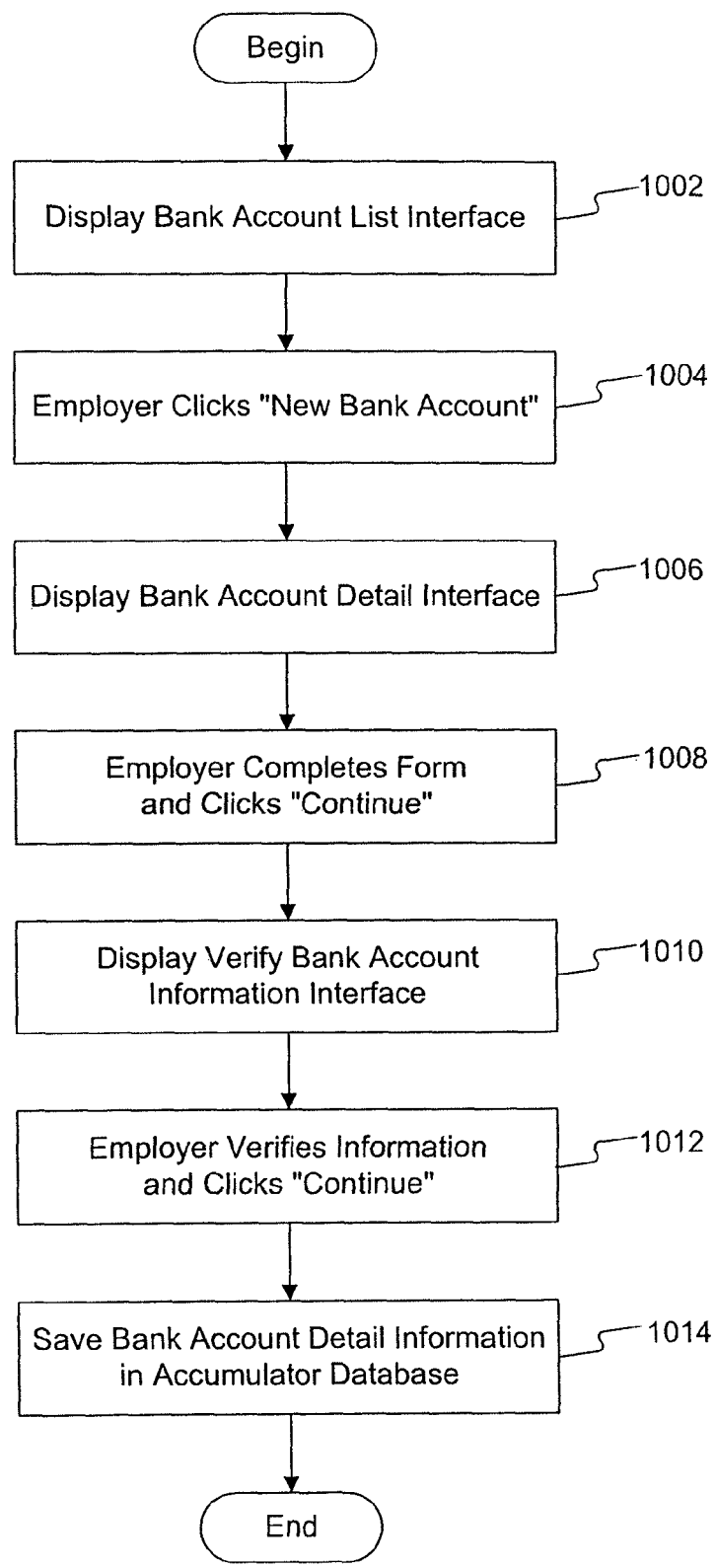
FIG. 10 is a flowchart of an embodiment of an add bank account procedure, consistent with one embodiment of the present invention.
Figure 18G:
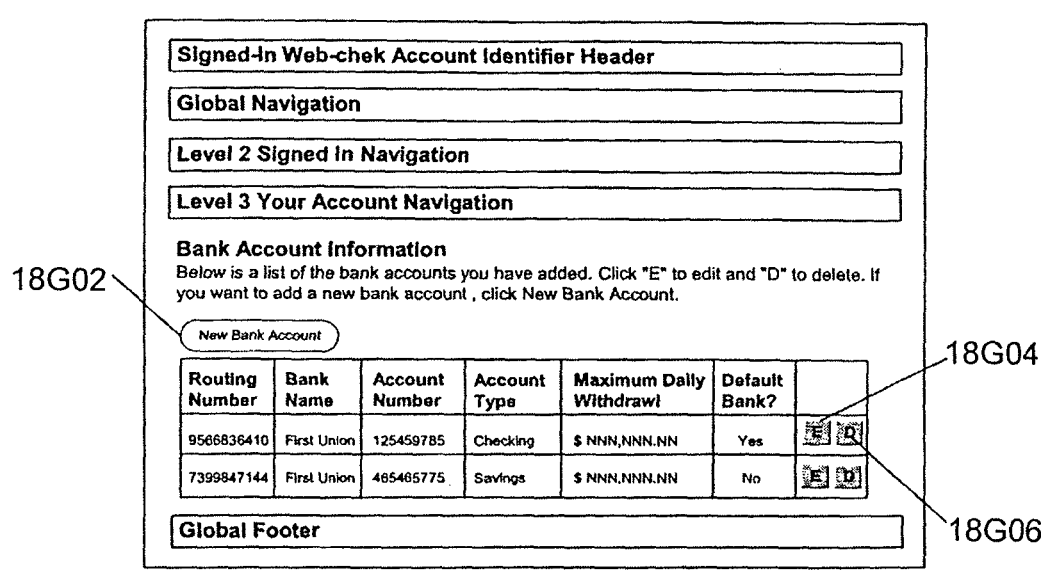

FIG. 10 is a flowchart of an embodiment of an add bank account procedure, consistent with one embodiment of the present invention. Using this process, an employer 102 may add a new bank account to its information stored at accumulator 104. FIG. 18G contains a sample add bank account list interface. When an add bank account list interface is displayed (step 1002), the employer may choose to add a new bank account, for example, by choosing a "new bank account" button (step 1004). When the employer chooses to add a new bank account, a bank account detail interface is displayed (step 1006). FIG. 18H includes a sample bank account detail interface. The employer may use the bank account detail interface to provide information about a new bank account. The employer may indicate that he is finished, for example, by choosing a "continue" button (step 1008).

Figure 18I:
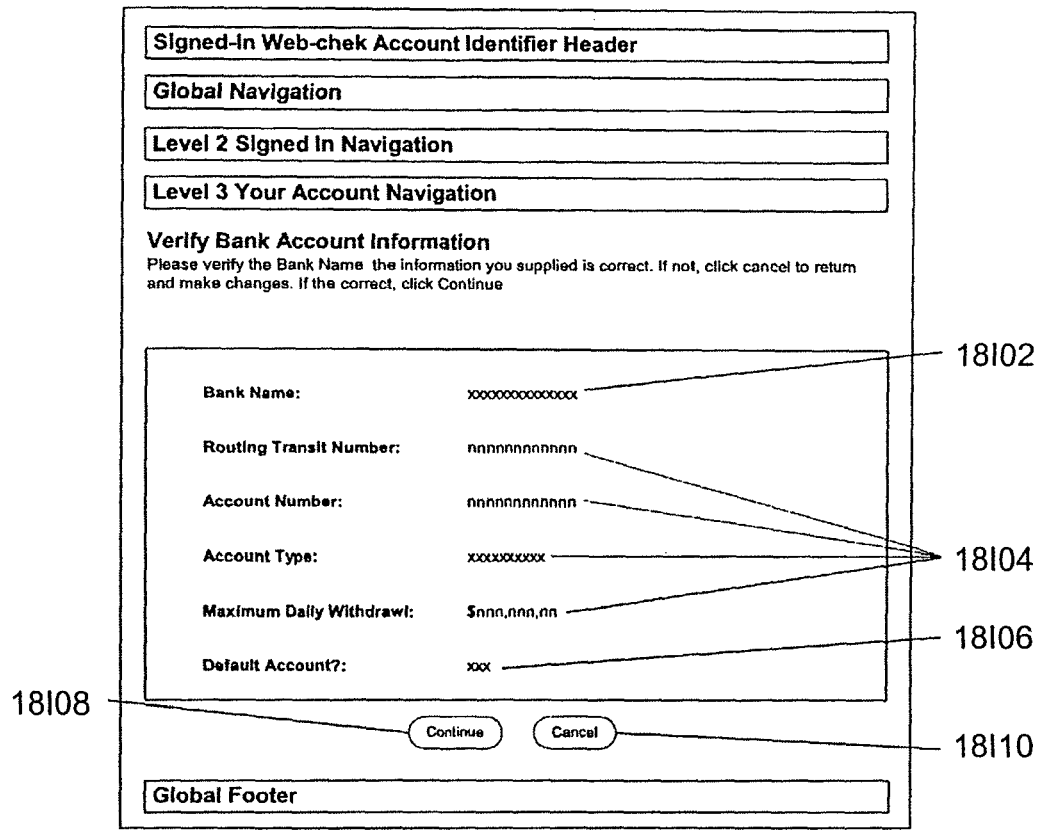
FIG. 18I is a sample verify bank account information interface, consistent with one embodiment of the present invention.

A verify bank account information interface is displayed (step 1010) to enable the employer to view the information just entered. FIG. 18I includes a sample verify bank account information interface. When an employer verifies the information and chooses to continue, e.g., by choosing a "continue" button (step 1012), then employer application 402 stores the bank account detail information in the accumulator database (step 1014). The bank account detail information may be stored, for example, in registration database 512 or payment database 504. It should be noted that other embodiments are possible, consistent with the present invention.

Figure 11:
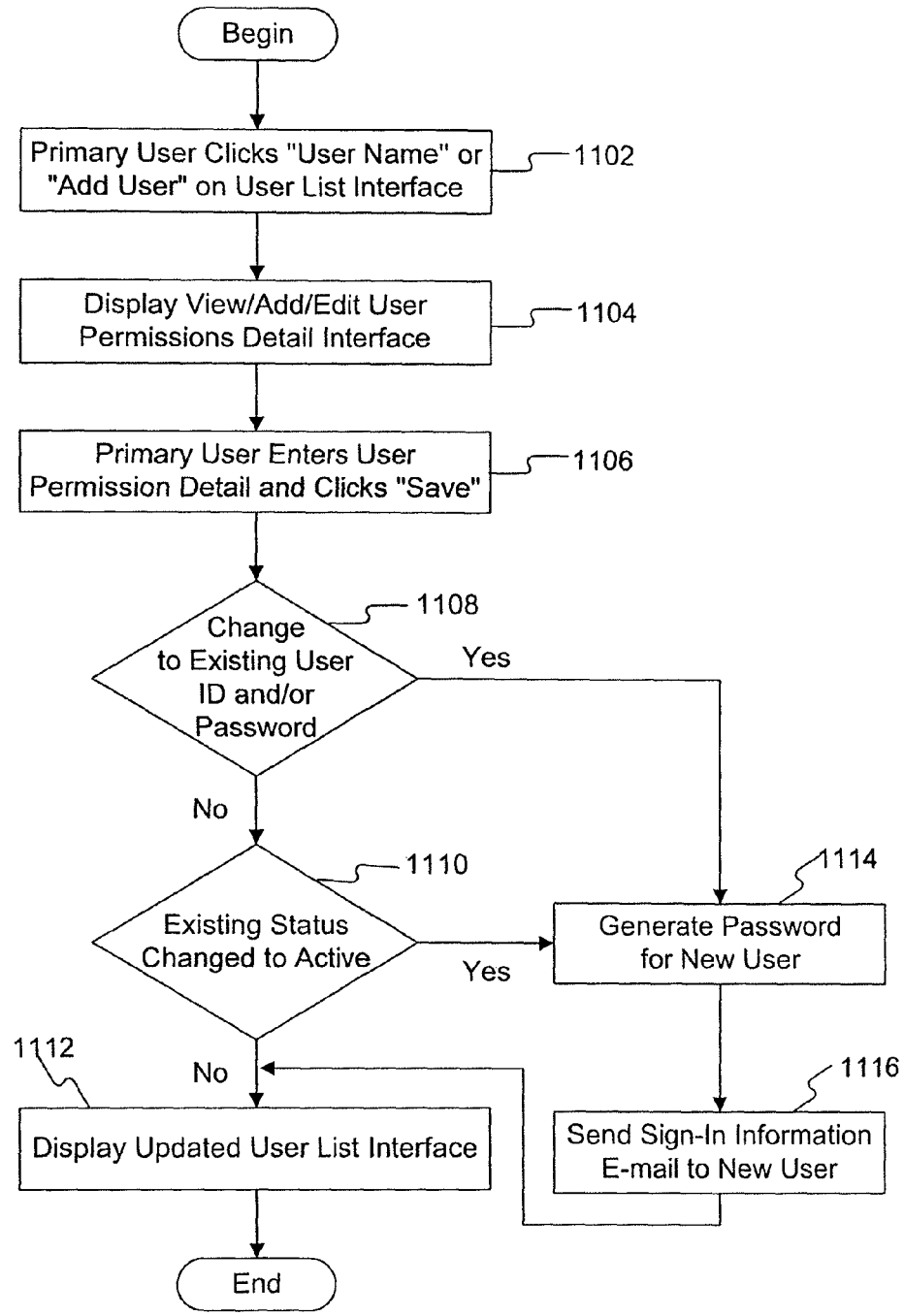
FIG. 11 is a flowchart of an embodiment of a user set up procedure, consistent with one embodiment of the present invention.
Figure 18K:
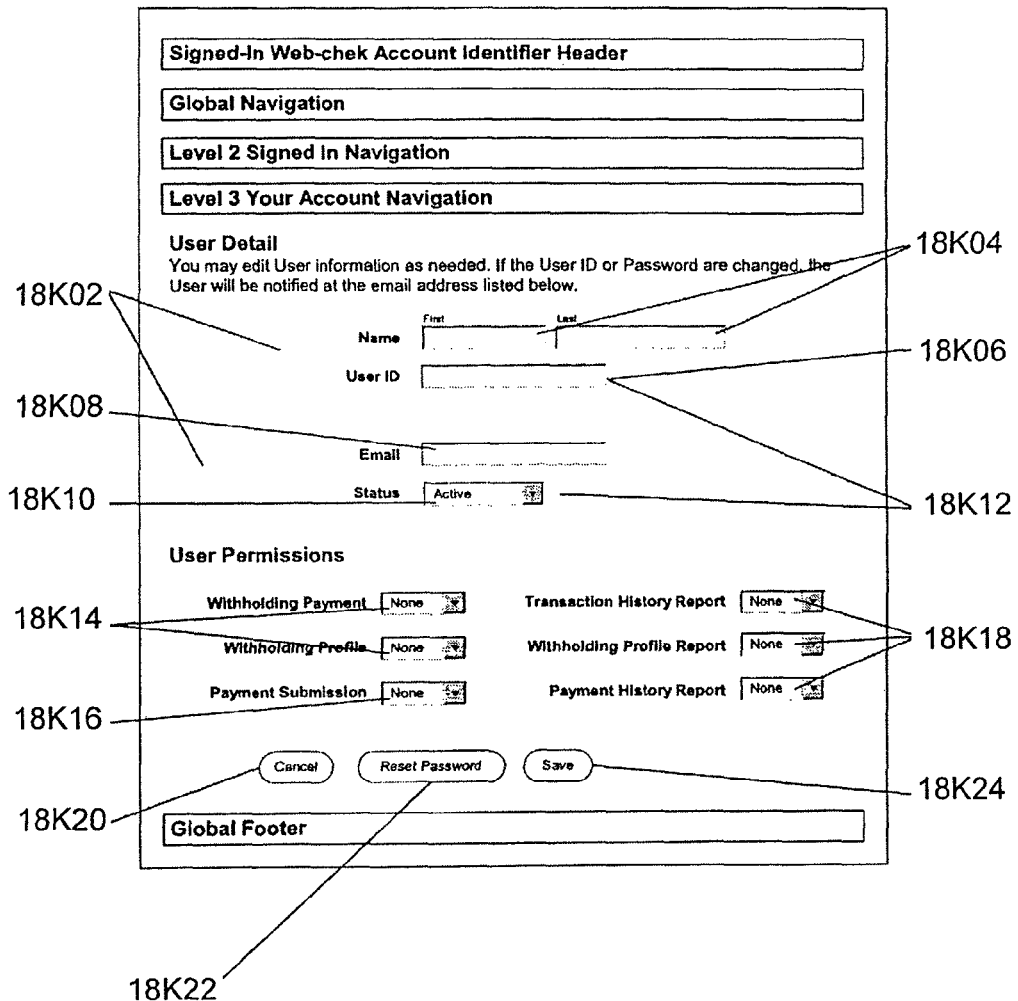
FIG. 18K is a sample of a user detail interface, consistent with one embodiment of the present invention.

FIG. 11 is a flowchart of an embodiment of a user set up procedure, consistent with one embodiment of the present invention. Using this process, an employer 102 may add or edit a user that is authorized to act on the employer's behalf. During the employer registration process described above, the employer is prompted to provide the name and other information for a primary user. This primary user may add and/or edit additional users with the assistance of a user list interface. FIG. 18J includes a sample user list interface. On the user list interface, the primary user may choose an "add user" button or select a user ID link corresponding to a specific user (step 1102). In response, a user detail interface is displayed (step 1104). FIG. 18K includes a sample user detail interface. The primary user may enter user detail information or user permission detail and choose "save" (step 1106). Employer application 402 determines whether the entered information includes a change to an existing user ID and/or password (step 1108). If the user information does not represent a change to an existing user ID and/or password, then employer application 402 determines whether an existing user has been changed to active status (step 1110). If not, then an updated user list interface is displayed (step 1112). If the user information does represent a change to an existing user ID and/or password (step 1108), then a new password is generated for the user (step 1114), and a sign in information e-mail is sent to the user (step 1116). Similarly, if an existing user is changed to active status (step 1110), then a new password is generated (step 1114) and a sign in information e-mail is sent (step 1116). It should be noted that other embodiments are possible, consistent with the present invention.

Figure 12:
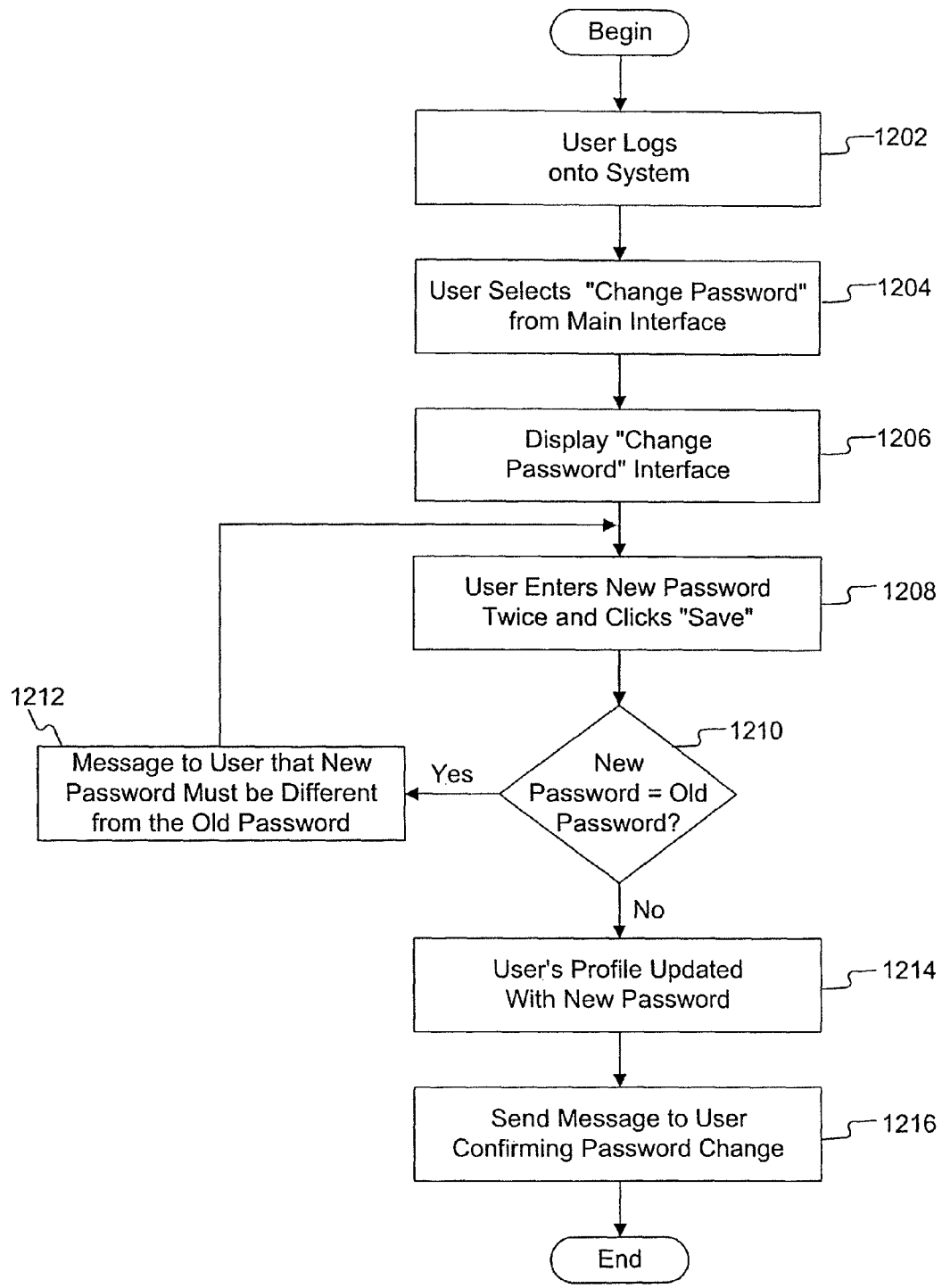
FIG. 12 is a flowchart of an embodiment of a change password procedure, consistent with one embodiment of the present invention.
Figure 18L:
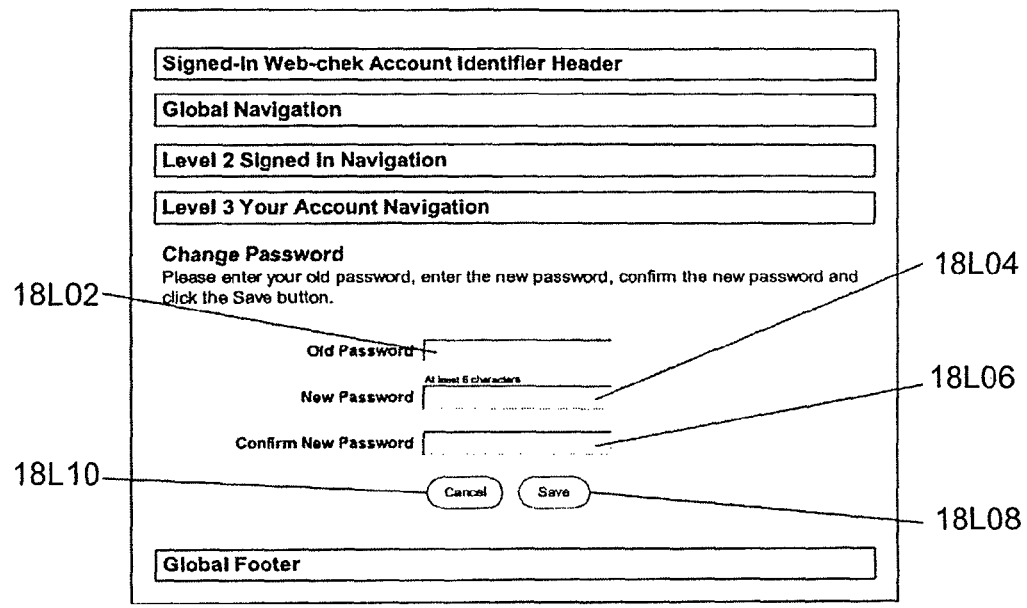
FIG. 18L is a sample change password interface, consistent with one embodiment of the present invention.

FIG. 12 is a flowchart of an embodiment of a change password procedure consistent with the present invention. Using this process, a registered user may change his or her password. When a user logs in to the website (step 1202), the user may select change password from the main account interface (step 1204). A change password interface is displayed (step 1206). FIG. 18L includes a sample change password interface. The user is prompted to enter the new password twice before choosing "save" (step 1208). Employer application 402 determines whether the new password is the same as the old password (step 1210). If they are the same, a message is sent to the user that the new password must be different from the old password (step 1212). If the new password and old password are different, the user's profile is updated with the new password (step 1214), and a message is sent to the user confirming the password change (step 1216). The updated user profile may be stored, for example, in user database 516. It should be noted that other embodiments are possible, consistent with the present invention.

Figure 13:
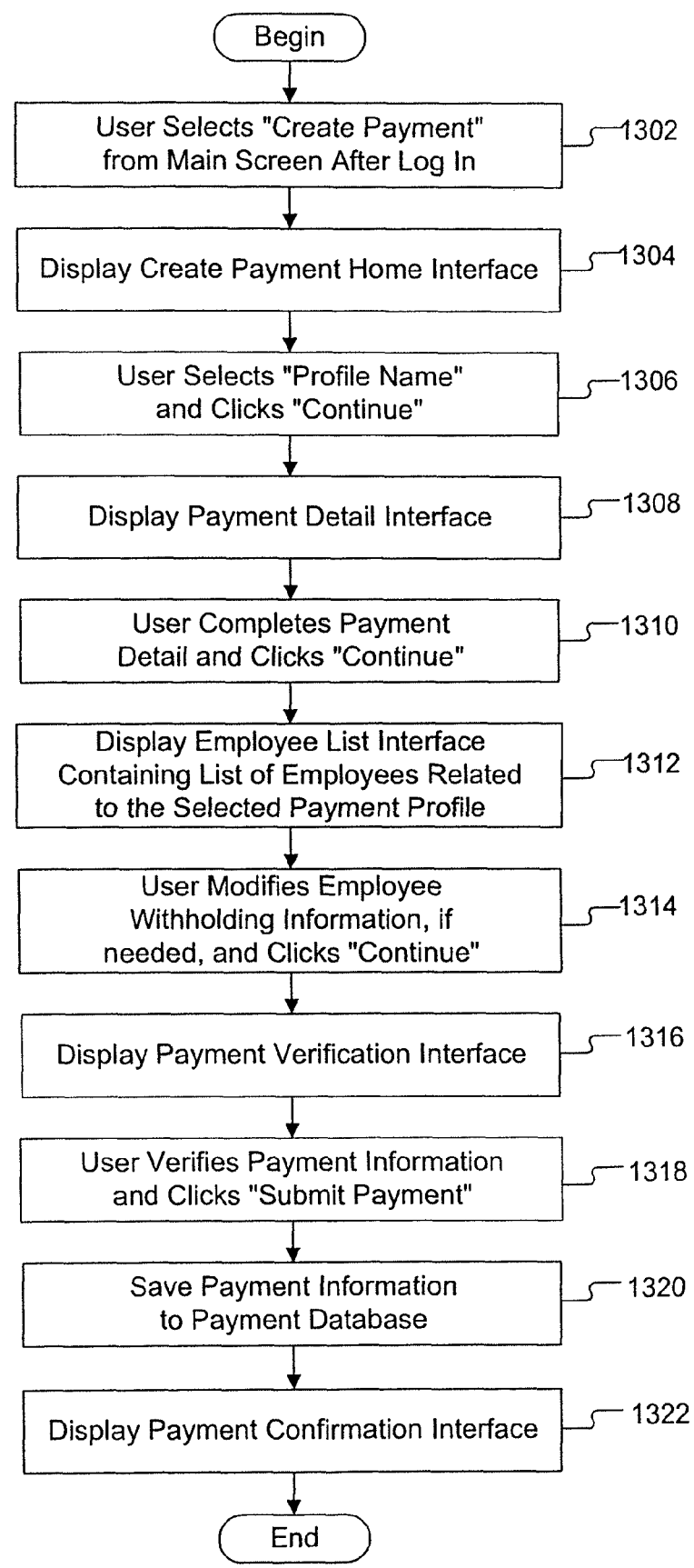
FIG. 13 is a flowchart of an embodiment of a payment set up procedure, consistent with one embodiment of the present invention.
Figure 18M:
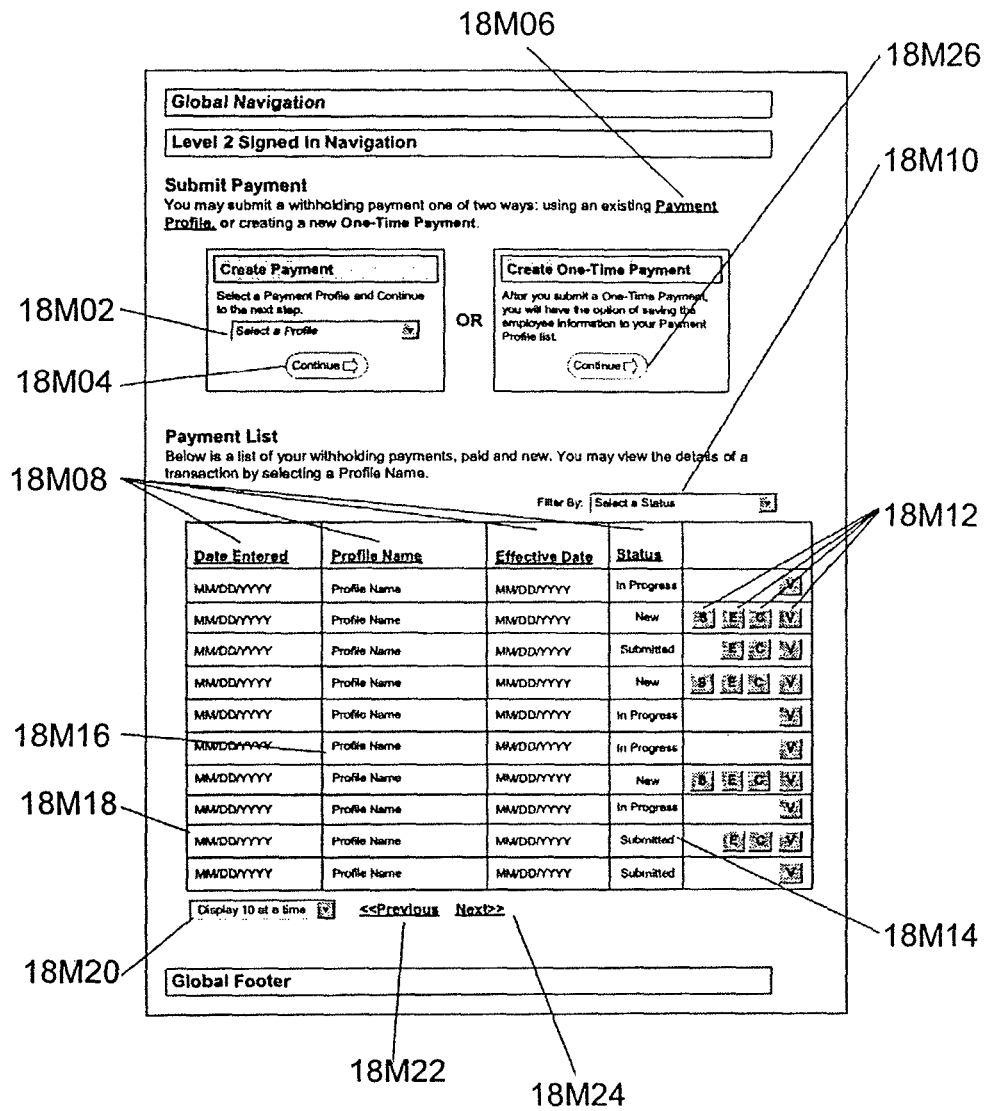
FIG. 18M is a sample create payment home interface, consistent with one embodiment of the present invention.

FIG. 13 is a flowchart of an embodiment of a payment set up procedure consistent with the present invention. Using this process, a user at employer 102 may create and submit payments using accumulator 104. When a user selects create payment from the main screen after logging in (step 1302), a create payment home interface is displayed (step 1304). FIG. 18M includes a sample create payment home interface. The user may create a one time payment or may use an existing payment profile. To submit payments for multiple employees, an employer may create a payment profile. When creating a payment profile, the employer may enter data concerning the employees, including assigning an employee to a payroll based on the employee's payroll dates, for example. As each employee is added to a profile, validation processor 410 may validate the employee's name and other information. Once a payment profile is created, an employer may create a payment or debit for the employees as a group.

Figure 18N:
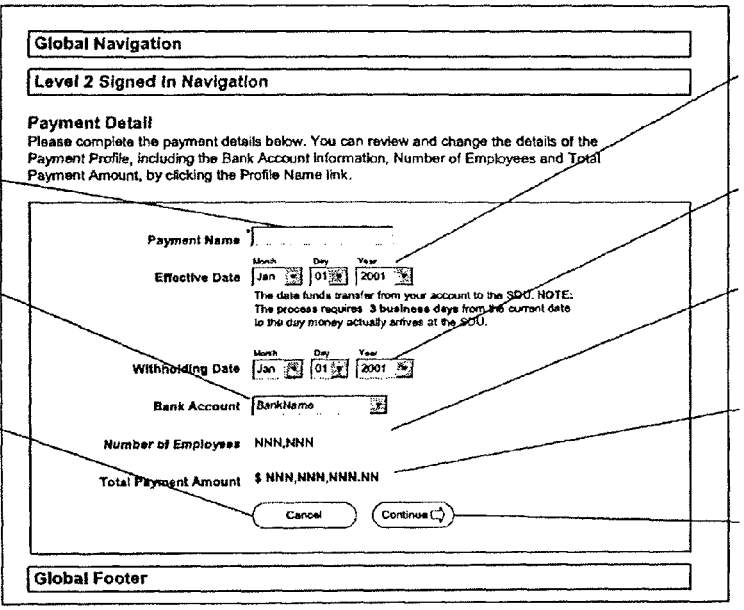
FIG. 18N is a sample payment detail interface, consistent with one embodiment of the present invention.
Figure 18O:
FIG. 18O is a sample employee list interface, consistent with one embodiment of the present invention.

To submit a payment using a payment profile, the user may select a profile name from a drop-down list containing available payment profiles and choose "continue" (step 1306). A payment detail interface corresponding to the selected profile name is displayed (step 1308). FIG. 18N includes a sample payment detail interface. The user may provide payment details, such as the date funds are withheld from the employees in the profile, and choose "continue" (step 1310). An employee list interface containing a list of employees related to the selected payment profile is then displayed (step 1312). FIG. 18O contains a sample employee list interface.

The user may modify employee withholding information if necessary using the employee list interface and choose "continue" (step 1314). A payment verification interface is then displayed to enable the user to view the payment information (step 1316). FIG. 18P includes a sample payment verification interface. When the user verifies the payment information and chooses "submit payment" (step 1318), employer application 402 stores the payment information to payment database 504 (step 1320) and a payment confirmation interface is displayed (step 1322). FIG. 18Q includes a sample payment confirmation interface. It should be noted that other embodiments are possible, consistent with the present invention.

Figure 14:
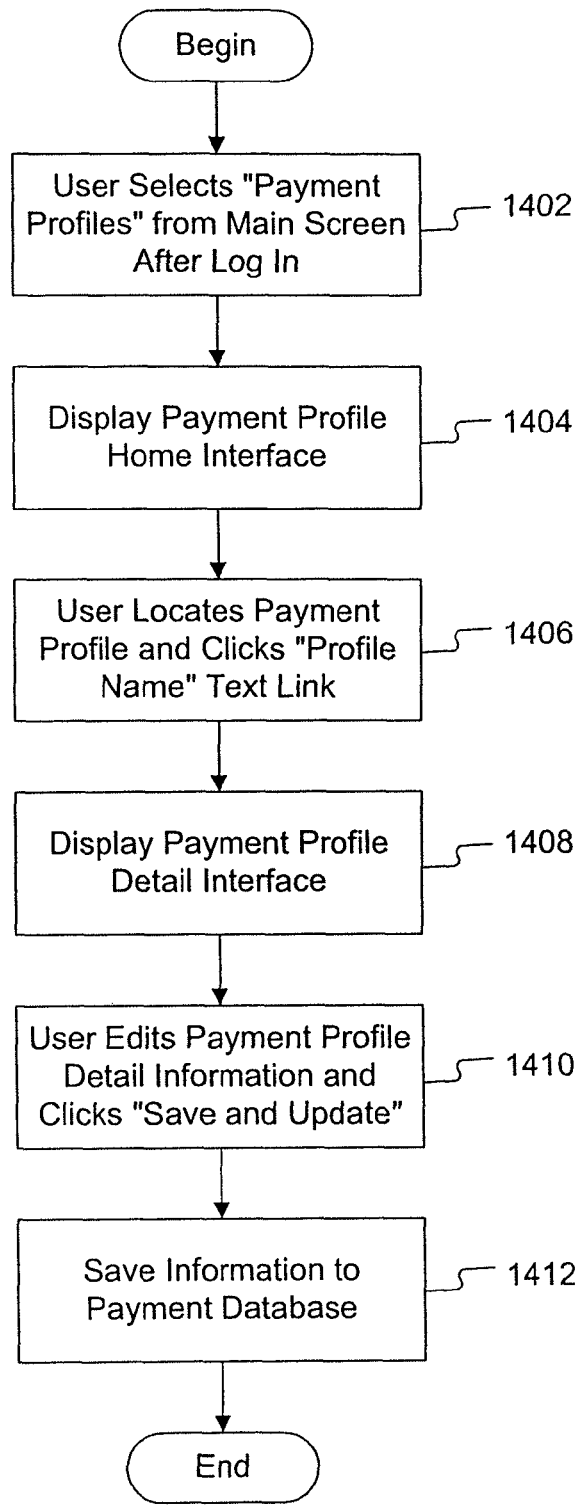
FIG. 14 is a flowchart of an embodiment of a payment profile set up procedure, consistent with one embodiment of the present invention.

FIG. 14 is a flowchart of an embodiment of a payment profile set up procedure, consistent with one embodiment of the present invention. When a user selects "payment profiles" from the main screen after logging in (step 1402), a payment profile home interface is displayed (step 1404). FIG. 18R includes a sample payment profile home interface. The user may use the payment profile home interface to locate the desired payment profile and may select it by choosing a profile name text link (step 1406). A payment profile detail interface is displayed (step 1408). FIG. 18S includes a sample payment profile detail interface. The user may enter new payment profile information or edit existing payment profile detail information on the payment profile detail interface and choose a "save and update" button when finished (step 1410). The payment profile information is stored, for example, in payment database 504 (step 1412). It should be noted that other embodiments are possible, consistent with the present invention.

Figure 15:
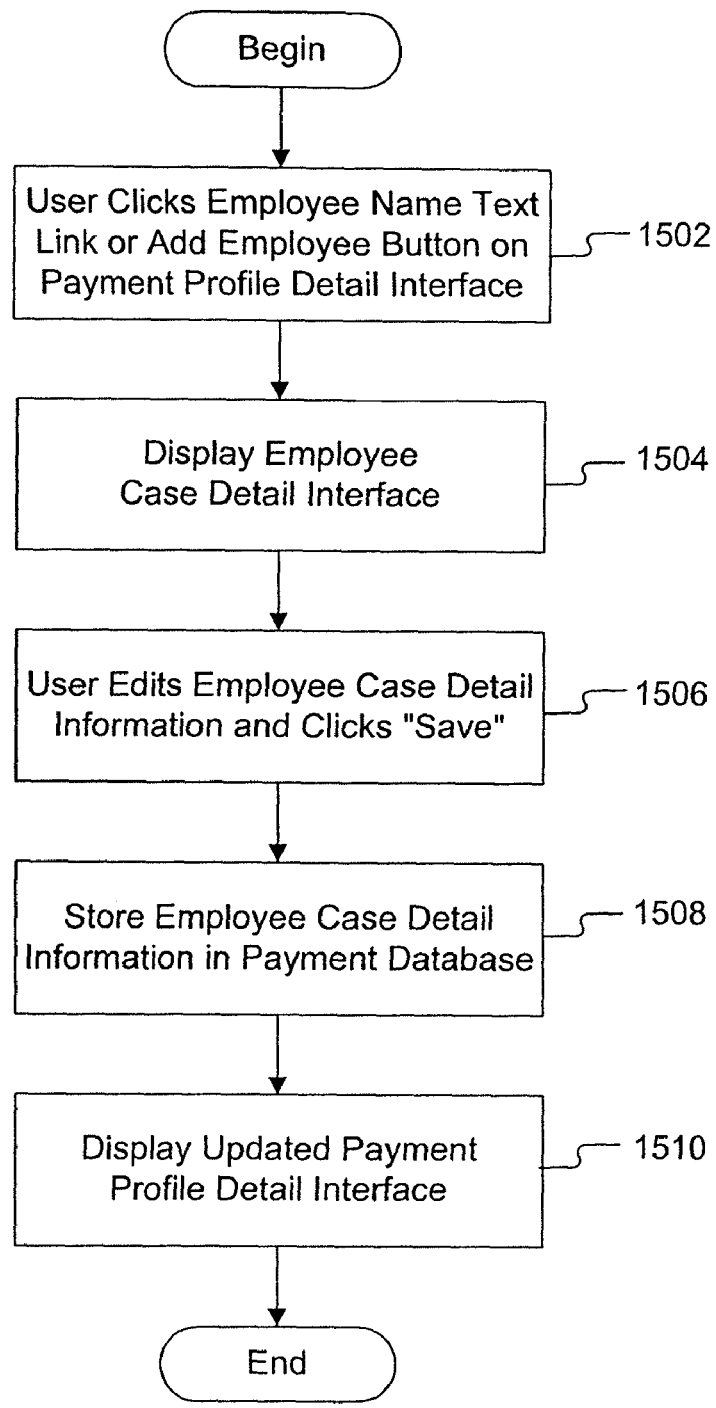
FIG. 15 is a flowchart of an embodiment of an employee detail set up procedure, consistent with one embodiment of the present invention.

FIG. 15 is a flowchart of an embodiment of an employee detail set up procedure, consistent with one embodiment of the present invention. Using this process, a user may add, edit, or delete employee information. When a user chooses an employee name text link on the payment profile detail interface (step 1502), an employee detail interface is displayed (step 1504). FIG. 18T contains a sample employee detail interface. The user may edit employee detail information, e.g., name, social security number, etc., and choose "save" (step 1506). Employer application 1402 stores the employee case detail information in, for example, payment database 504 (step 1508) and an updated payment profile detail interface is displayed (step 1510). It should be noted that other embodiments are possible, consistent with the present invention.

Figure 16:
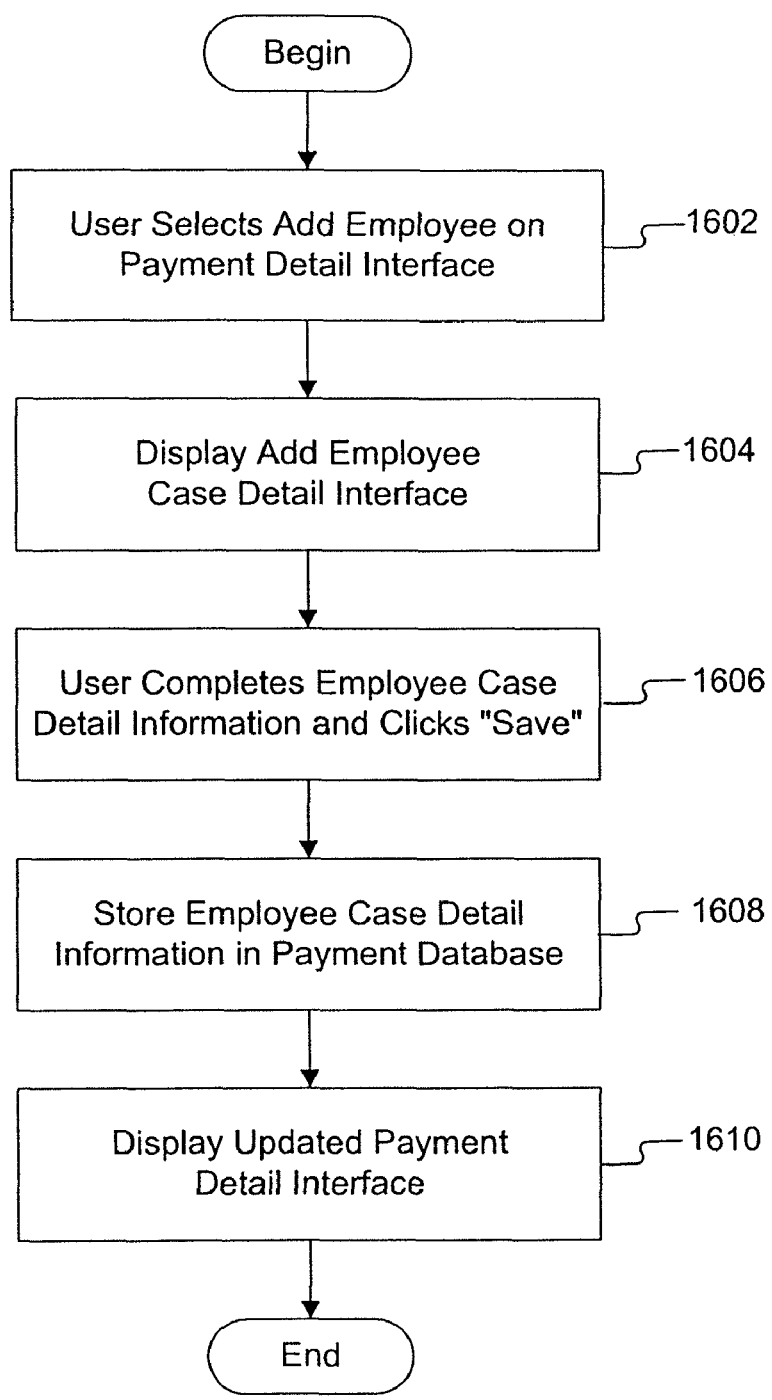
FIG. 16 is a flowchart of an embodiment of an add employee procedure, consistent with one embodiment of the present invention.

FIG. 16 is a flowchart of an embodiment of an add employee procedure, consistent with one embodiment of the present invention. Using this process, a user may add an employee using an "add employee" button on the employee list interface. When the user selects the "add employee" button (step 1602), an employee detail interface is displayed (step 1604). FIG. 18T includes a sample employee detail interface. Using the employee detail interface, the user may provide data about a new employee. When the user completes the employee information and chooses "save" (step 1606), employer application 402 stores the employee detail information, for example, in payment database 504 (step 1608). An updated payment detail interface is then displayed (step 1610). It should be noted that other embodiments are possible, consistent with the present invention.

Figure 17:
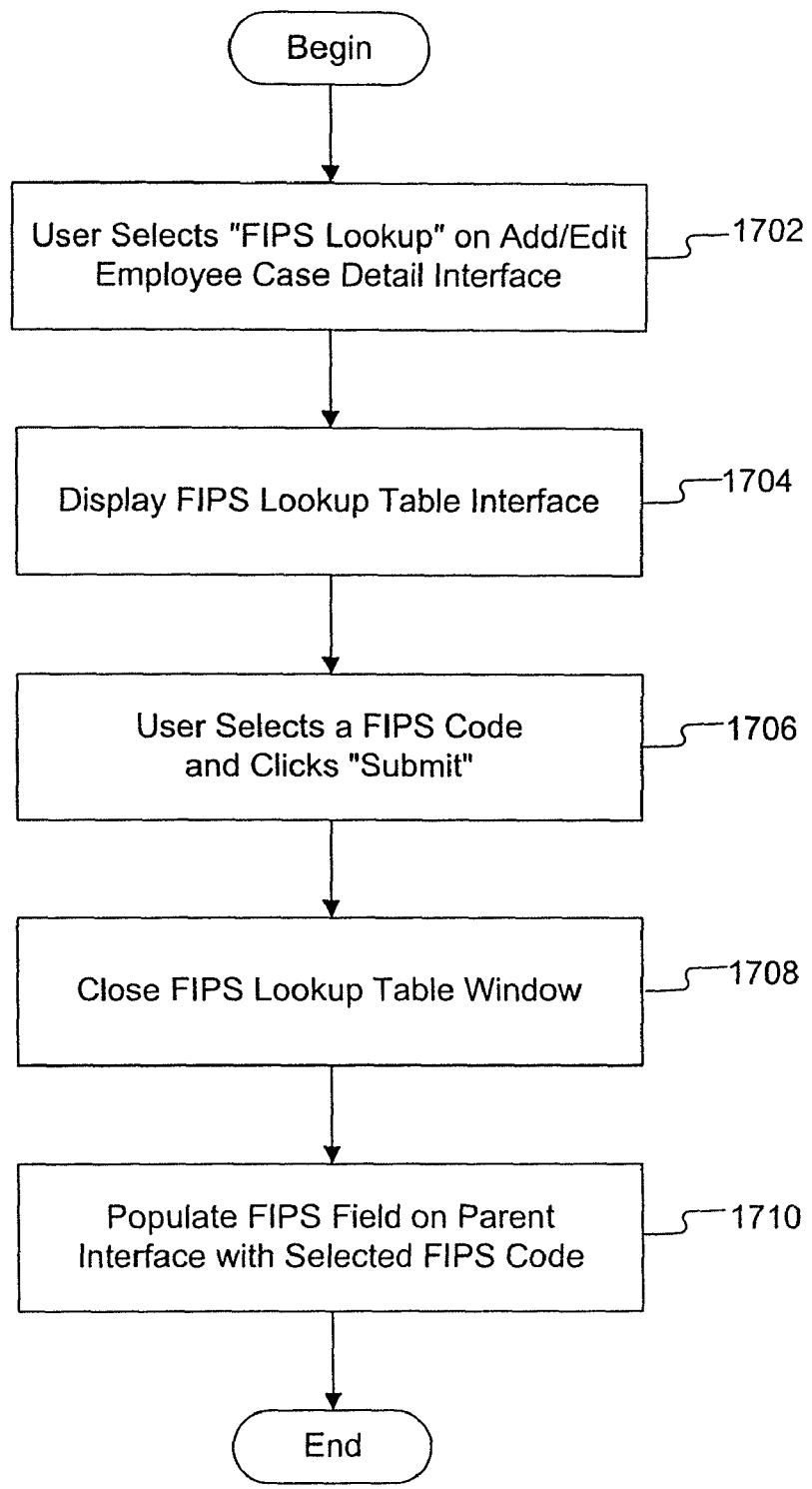
FIG. 17 is a flowchart of an embodiment of a FIPS code look up procedure, consistent with one embodiment of the present invention.
Figure 18U:
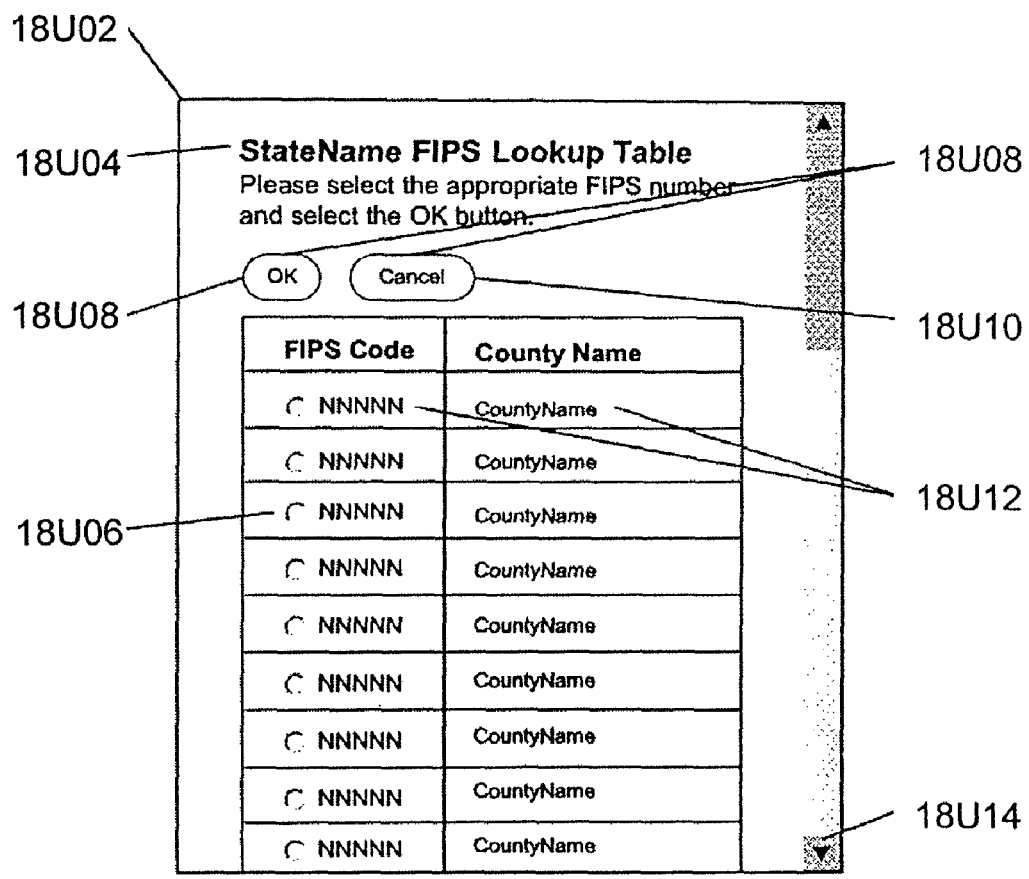
FIG. 18U is a sample FIPS lookup table interface, consistent with one embodiment of the present invention.

FIG. 17 is a flowchart of an embodiment of a FIPS code look up procedure, consistent with one embodiment of the present invention. Using this process, a user may look up the Federal Information Processing (FIPS) code corresponding to an employee. A FIPS code may be assigned, for example, to each county in a state to provide uniform information processing. When a user chooses a "FIPS look up" button on the add employee case detail interface (step 1702), an FIPS look up table is displayed (step 1704). FIG. 18U includes a sample FIPS look up table interface. Using the FIPS look up table, the user may locate the county name corresponding to the new employee. The user may select a FIPS code and select "submit" (step 1706). The FIPS look up table window may be closed (step 1708), and the FIPS field on the employee case detail interface will be populated with the selected FIPS code (step 1710). The FIPS look up table advantageously enables a user who knows a county name to determine the corresponding FIPS county code without having to memorize county codes. It should be noted that other embodiments are possible, consistent with the present invention.

FIG. 18A is a sample welcome interface, consistent with one embodiment of the present invention. The welcome interface shown in FIG. 18A may be displayed by employer application 402 when an employer navigates to a website for interacting with accumulator 104. The welcome interface may include a state information box 18A02 with a drop-down list 18A04 containing a list of the states compatible with accumulator 104 and a "Go" button 18A06 that opens a new window with the selected state's information page.

The welcome interface may include an "Already Registered" box 18A08 with a text box for a user ID 18A10 and a password 18A12. The user ID and the password may be of alphanumeric format, for example. Consistent with the present invention, the password 18A12 may be displayed as encrypted when it is entered. The "Already Registered" box may also include a "Sign In" button 18A14 that will validate the employer's user ID and password, as described above with reference to FIG. 9.

The welcome interface may also include a "Forgotten Your Password" box with a text box for a user ID 18A16 and a "Send It" button 18A18. "Send It" button 18A18 may match the entered user ID with stored user account information including an e-mail address. If a match is found, the website may e-mail the password to the employer at the stored e-mail account. The welcome page may also include a "register now" link 18A20 that enables a company to register for the website and a "general information" link to 18A22 to enable an employer to view general information. It should be noted that other embodiments are possible, consistent with the present invention.

FIG. 18B is a sample employer registration interface, consistent with one embodiment of the present invention. An employer registration interface can be used to gather information from the employer about the employer and a primary user authorized to act on the employee's behalf. The information can include, for example, a Federal Employee Identification Number (FEIN) 18B02, a company name and street address 18B04, a company city and state 18B06, a ZIP code 18B08, and a ZIP code plus 4 number 18B10. Information about the primary user may include the primary user's first name and last name 18B12, a primary user phone number 18B14, user ID 18B16, and e-mail address 18B18. The registration interface may include a "Continue" button 18B20 that enables an employer to continue with the registration process, as described in FIG. 8 above. The employer registration interface may also include an indicator of the step of the registration process 18B22, a "Cancel Registration" button 18B24, and a "Clear Form" button 18B26. "Cancel Registration" button 18B24 allows an employer to abandon the registration process and the interface. The "Clear Form" button 18B26 clears all the form fields of contents and displays the employer registration interface with blank fields. It should be noted that other embodiments are possible, consistent with the present invention.

FIG. 18C is a sample registration verification interface, consistent with one embodiment of the present invention. This interface includes company information and primary user information 18C02. Company information and primary user information 18C02 may be displayed in a read only format to allow an employer to verify the information entered into the employer registration interface. The registration verification interface may also include a "Continue" button 18C04 that enables the user to continue with the registration process once the registration information is verified. The registration verification interface may also include an indicator of the step of the registration process 18C06 as well as a "Make Changes" button 18C08. "Make Changes" button 18C08 may return the employer to the employer registration interface to enable the user to change the entered information. It should be noted that other embodiments are possible, consistent with the present invention.

FIG. 18D is a sample terms and conditions interface, consistent with one embodiment of the present invention. This interface may include the terms and conditions of using the website. The terms and conditions interface may include an "Agree" button 18D02 and a "Cancel" button 18D04. "Agree" button 18D02 saves the employer information to a database and creates the employer's account. "Agree" button 18D02 can also trigger an account information e-mail to be sent to the employer. "Cancel" button 18D04 abandons the interface, saving no registration information. It should be noted that other embodiments are possible, consistent with the present invention.

FIG. 18E is a sample registration confirmation interface, consistent with one embodiment of the present invention. This registration confirmation interface may be displayed, for example, once the employer has agreed to the terms and conditions. It should be noted that other embodiments are possible, consistent with the present invention.

FIG. 18F is a sample account home interface, consistent with one embodiment of the present invention. The account home interface may include, for example, a read only summary 18F02 of users' transactions. Read only summary 18F02 may include, for example, a company name, user name, last sign in date, last payment date, last payment amount, and last payment number of employees. The last sign in date and last payment date 18F04 may be in a month/day/year format and may include the hours, minutes, and an am/pm indicator. It should be noted that other embodiments are possible, consistent with the present invention.

FIG. 18G is a sample add bank account detail interface, consistent with one embodiment of the present invention. The add bank account detail interface may include a new bank account button 18G02 to enable a user to add a bank account as explained in FIG. 10. When a user chooses the "New Bank Account" button, a bank account detail interface is displayed, as described below with reference to FIG. 18H. The add bank account detail interface may include, for example, a routing number, a bank name, an account number, an account type, a maximum daily withdrawal amount, a default bank indicator, and an action button with an "E" or a "D", representing "edit" or "delete." "Edit" button 18G04 displays and populates the bank account detail interface for the selected bank account. "Delete" button 18G06 removes the selected bank account from the bank account list unless it is related to a payment profile. If the bank account is related to a payment profile, the user will receive a message that the bank account cannot be deleted without first editing the corresponding payment profile. It should be noted that other embodiments are possible, consistent with the present invention.

FIG. 18H is a sample bank account detail interface, consistent with one embodiment of the present invention. The bank account detail interface may include, for example, a routing transit number 18H02, an account number 18H04, an account type 18H06, a maximum daily withdrawal amount 18H08, and a default account indicator 18H10. Routing transmit number 18H02 and account number 18H04 may be, for example, numbers assigned to the account by the bank. Account type 18H06 may be, for example, a drop-down list from which a user may select either checking or savings. Maximum daily withdrawal amount 18H08 may be, for example, an amount set by the bank to limit daily withdrawals. Default account indicator 18H10 allows the user to indicate if they want to designate the bank account as a default account to be used when a specific account is not designated. The bank account detail interface may also include a "Continue" button 18H12 that may perform routing number validation and display a verify bank account information interface. The bank account detail interface may also include a "Cancel" button 18H14 that abandons the interface without saving any information. It should be noted that other embodiments are possible, consistent with the present invention.

FIG. 18I is a sample verify bank account information interface, consistent with one embodiment of the present invention. The verify bank account information interface may include a bank name 18I02 in read only format. The bank name 18I02 may be obtained, for example, by looking up the routing transit number in a table, such as a Thomson table. The verify bank account information interface may also include read only values 18I04, such as a routing transit number, account number, account type, and maximum daily withdrawal amount. Read only values 18I04 may be taken from the data entered into the bank account detail interface. The verify bank account information interface may also include a default account identifier 18I06, a "Continue" button 18I08 that saves the bank account details, and a "Cancel"

button 18I10 that abandons the interface without saving any information. It should be noted that other embodiments are possible, consistent with the present invention.

FIG. 18J is a sample user list interface, consistent with one embodiment of the present invention. The user list interface may include a list 18J02 of the users authorized to act on behalf of the employer. List 18J02 may include all users except for the primary user or list 18J02 may include the primary user also. The user list interface may include an "Add User" button 18J04 to enable a primary user to add other users. The user list interface may also include user ID text links 18J06 that link to the respective user detail interface. On user list 18J02, selecting a column header 18J08 will sort the payment list by the data in that column. User list interface may also include a "Delete Selected Users" button 18J10 to remove selected users from the user list. The primary user can indicate which users to remove using check boxes 18J12. User list interface may also include a "Reset Password" button 18J14 to enable a user to generate a new password. It should be noted that other embodiments are possible, consistent with the present invention.

FIG. 18K is a sample of a user detail interface, consistent with one embodiment of the present invention. The user detail interface includes user information 18K02, including a user name 18K04, a user ID 18K06, a user e-mail address 18K08, and a user status 18K10. If the user detail interface is used to edit an existing user, these fields will be populated with the saved user information. User status 18K10 may be, for example, active or inactive. If the user ID is changed or if the status is made active 18K12, employer application 402 will send a sign-in information e-mail to the user e-mail address when the record is saved. The user detail interface also includes user permissions for withholding payment and withholding profile 18K14, payment submission 18G16, and reports 18K18, e.g., transaction history report, withholding profile report, and payment history report. The withholding payment and withholding profile permission 18K14 may be represented by drop-down lists with the options of none, view and modify. These options indicate whether a user is allowed to view or modify payments and/or payment profiles. The payment submission permission 18K16 may include a drop-down list with the options of none or submit to indicate whether or not the user may submit payments. The report permissions 18K16 may include a drop-down list of options such as "none" and "view" to indicate whether or not the user may view reports.

The user detail interface may include a "Cancel" button 18K20 that will abandon the user permissions detail interface and a "Reset Password" button 18K22 that will generate a new password and e-mail it to the user's e-mail address 18K08. Finally, the user detail interface may include a "Save" button 18K24 that stores the user details, for example, in user database 516. It should be noted that other embodiments are possible, consistent with the present invention.

FIG. 18L is a sample change password interface, consistent with one embodiment of the present invention. The change password interface may include a text box for an old password 18L02, a text box for a new password 18L04, and a confirm new password text box 18L06. Using the change password interface, the user may be prompted to enter the new password twice. The change password interface may include a "Save" button 18L08 that will save the user's new password and e-mail the password to the user's e-mail account and a "Cancel" button 18L10 that will abandon the change password interface. It should be noted that other embodiments are possible, consistent with the present invention.

FIG. 18M is a sample create payment home interface, consistent with one embodiment of the present invention. The user is given an option to submit a payment in one of two ways: by using an existing payment profile or by creating a new one-time payment. If the user chooses to create a payment using an existing payment profile, the user may use a drop-down menu 18M02 containing the user's payment profiles to select the payment profile and then choose a "Continue" button 18M04. To view the payment profiles, the user may also select a "Payment Profile" button 18M06 that displays the payment profile home interface. The create payment home interface also includes a payment list 18M08 that can be sorted by selecting one of the column headers, such as date entered, profile name, effective date, or status.

The payment list 18M08 may be filtered by selecting a filter 18M10. The filter may include different options such as all, in progress, new, and submitted. Each entry in payment list 18M08 may be assigned to one of these options. "In progress" indicates that the payment profile is in the processing stage. Profiles that have this status cannot be edited or canceled. "New" indicates that the payment has yet to be processed, and profiles that have a new status can be submitted, edited or canceled. "Submitted" indicates that the payment has been submitted for processing. Profiles that have this status can be edited or canceled up until the debit processing cutoff time. When a status option is selected from filter drop-down list 18M10, the payment list will be refreshed to display only entries with the applicable status. If the status "all" is selected, then the payment list 18M08 will be displayed with all entries.

An action for each entry may be displayed through a number of action buttons on the create payment home interface. The buttons may include, for example, "S," "E," "C," and "V." The "S" button, for "submit," may enable a user to submit a payment prior to a debt processing cutoff time. The "E" button, for "edit", may change the payment status to new and display a payment detail interface. If the request is made after the debit processing cutoff time, the user will be prompted to accept a new effective date. The "C" button, for "cancel," will change the payment status to cancel. This feature may not be available after the debit processing cutoff time. The "V" button, for "view," may display the payment detail interface in a read-only format.

The create payment interface payment list 18M08 may include a profile name 18M16, a date entered 18M18, and display options 18M20. Selecting a profile name 18M16 displays the payment detail interface for the selected profile. Date entered 18M18 is based on when the user submitted a payment to the accumulator website. Display options 18M20 enable a user to select the number of entries in the payment list that are displayed at one time. The create payment interface may also include a "Previous" button 18M22 and a "Next" button 18M24 if the payment list contains multiple pages to enable the user to navigate between the multiple pages. It should be noted that other embodiments are possible, consistent with the present invention.

FIG. 18N is a sample payment detail interface, consistent with one embodiment of the present invention. The payment detail interface includes a payment name 18N02 that may default to the payment profile selected from the create payment interface, an effective date 18N04, a withholding date 18N06, a bank account name 18N08, a number of employees 18N10, and a total payment amount 18N12. The effective date 18N04 is the date of the funds transfer from the employer's account to the recipient. The withholding date 18N06 is the date on which the funds are withheld from the employee's payroll. The bank account name 18N08 may default to the default bank account saved in the employer's payment profile. The number of employees 18N12 indicates the total number of employees related to the profile, and the total payment amount 18N12 is the total withholding amount for all of the employees. The payment detail interface may also include a "Cancel" button 18N16 to abandon the payment detail interface and a "Continue" button 18N14 to save the payment detail information. It should be noted that other embodiments are possible, consistent with the present invention.

FIG. 18O is a sample employee list interface, consistent with one embodiment of the present invention the present invention. On the employee list interface, a user may select an "Add Employee" button 18O02 to add an employee. The employee list interface may include an employee identification number, such as a social security number 18O04 and a case number 18O06. A "Delete Selected Employees" button 18O08 enables the user to delete selected employees using check boxes 18O10. The employee list interface may also include a check box 18O12 to flag records where an employees has medical insurance. The employee list interface also includes a withholding date 18O14 and a payment amount 18O16, both of which may be drawn from a stored payment profile. The employee list interface may also include a "Previous" button 18O18 and a "Next" button 18O20 if the employee list contains multiple pages to enable the user to navigate between the multiple pages. The employee list interface may also include a "Save Changes" button 18O22 that saves any changes made to the fields in the table and a "Continue" button 18O24 that saves the employee list information and links to a payment verification interface. It should be noted that other embodiments are possible, consistent with the present invention.

FIG. 18P is a sample payment verification interface, consistent with one embodiment of the present invention. The payment verification interface includes a profile name 18P02, an effective date 18P04, which may be the date the recipient will receive funds, and a bank account name 18P06. The bank account name field may also display account information for the bank account including account type, account number, and routing transmit number. The payment verification interface may also include a number of employees 18P08 and a total payment amount 18P09. The data in the payment verification interface may be read only for a user to confirm the data entered in the payment detail interface. The payment verification interface may include a "Cancel" button 18P10 that will abandon the interface without saving any payment information and a "Make Changes" button 18P12 to enable a user to return to the payment detail interface to make changes to the data. The payment verification interface may also include a "Save Payment" button 18P14 to save the payment information and a "Submit Payment" button 18P16 to submit the payment information, display a payment confirmation interface, and send the user a payment confirmation e-mail. The payment verification interface may also include a failure field 18P18 containing employees whose records do not pass the validation process performed when the employee list is updated. It should be noted that other embodiments are possible, consistent with the present invention.

FIG. 18Q is a sample payment confirmation interface, consistent with one embodiment of the present invention. The payment confirmation interface may include a customer service link 18Q02 to enable a user to contact the web site's customer service as well as a reports link 18Q04 to enable the user to run reports. The confirmation interface may also include the date the payment was submitted 18Q06, a read only summary of the transaction 18Q08, and a "Return" button 18Q10. It should be noted that other embodiments are possible, consistent with the present invention.

FIG. 18R is a sample payment profile list interface, consistent with one embodiment of the present invention. Payment profiles are used by the employer to create and submit withholding payments on a regular basis. The payment profile list interface may include an "Add Profile" button 18R02 and a "Delete Selected Profiles" button 18R04. Selecting the "Add Profile" button 18R02 enables a user to add a payment profile using the payment profile detail interface. The "Delete Profile" button 18R04 will delete all payment profiles that are indicated by check boxes 18R08. The payment profile list interface includes a profile name 18R10, number of employees 18R12, and bank account name 18R06. A profile name link 18R10 may link to the payment profile detail interface for the selected profile. The number of employees 18R12 may indicate the total number of employees in the payment profile. The payment profile list interface may also include a display options drop-down list 18R14, a previous button 18R16, and a next button 18R18. It should be noted that other embodiments are possible, consistent with the present invention.

FIG. 18S is a sample payment profile detail interface, consistent with one embodiment of the present invention. The payment profile detail interface includes a payment profile name 18S02, a default bank account drop-down list 18S06, and a total payment amount 18S08. If an existing profile exists, the payment profile name and default bank account fields 18S10 are populated with the saved information. The payment profile detail interface may also include a "Save and Update" button 18S12 to refresh the screen with updated bank account information and a "Cancel" button 18S14 to abandon the interface. The payment profile detail interface may also include an employee list 18S16 with an employee name, social security number, state, case number, and payment amount. The employee list 18S16 may also include an "Add Employee" button 18S18 and a "Delete Selected Employees" button 18S20. The user may use check boxes 18S22 to mark an employee for deletion when "Delete Selected Employees" button 18S20 is chosen. By selecting an employee name link 18S24, the employee case detail interface for the selected employee is displayed. The payment profile detail interface may also include a display option drop-down list 18S26, a previous button 18S28, and a next button 18S30. It should be noted that other embodiments are possible, consistent with the present invention.

FIG. 18T is a sample employee detail interface, consistent with one embodiment of the present invention. Using this interface, the user may enter and edit employee information as needed. The employee detail interface includes an employee name 18T02, an employee social security number 18T04, an employee state 18T06, an employee case number 18T08, and a FIPS number 18T09. Employee detail interface may also include an FIPS lookup button 18T10 that will open an FIPS lookup table interface. The employee detail interface may also include a withholding amount 18T12, a radio button 18T14 to indicate whether the employee has medical insurance, and a check box for indicating whether the employee is no longer employed 18T15. The employee detail interface may also include a "Cancel" button 18T16 to enable the user to abandon the employee detail interface, a "Save" button 18T18 to validate the employee information, and an "Accept" button 18T20 to override the validation if it is not successful. It should be noted that other embodiments are possible, consistent with the present invention.

FIG. 18U is a sample FIPS lookup table interface, consistent with one embodiment of the present invention. This FIPS lookup table 18U02 may be specific to a state corresponding to the employee and may be used to determine the standardized county code corresponding to the employee. The state name 18U04 may be included in the heading of the FIPS lookup table. The table may include a radio button 18U06 corresponding to each FIPS code and county name. The FIPS lookup table may also include an "OK" button 18U08 and a "Cancel" button 18U10. If a state does not use individual county FIPS codes 18U12, only one code may appear and the county code field may read "all counties." Horizontal scrolling 18U14 may be used to accommodate more counties than can be displayed on a single interface. It should be noted that other embodiments are possible, consistent with the present invention.

Figure 18V:
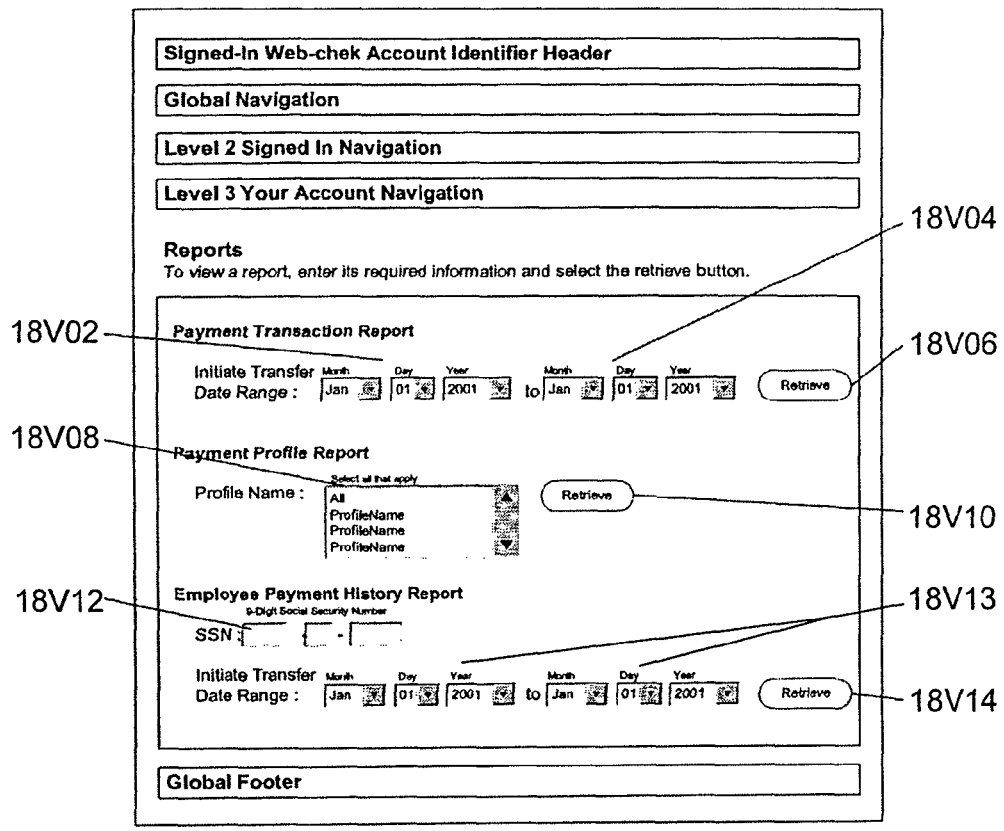
FIG. 18V is a sample reports interface, consistent with one embodiment of the present invention.

FIG. 18V is a sample reports interface, consistent with one embodiment of the present invention. This interface enables a user to create and view reports. For a payment transaction report, the user may choose a beginning date range 18V02 and an ending date range 18V04 and then select a "Retrieve" button 18V06 to open a window with a payment transaction report. To display a payment profile report, a user may select a profile name from a drop-down list 18V08 or select to view all payment profiles. When a user selects a "Retrieve" button 18V10, a payment profile report is displayed. To display an employee payment history report, the user is prompted to enter a social security number 18V12 and a date range 18V13. By selecting a "Retrieve" button 18V14, the user is presented with a payment history report for that employee. It should be noted that other embodiments are possible, consistent with the present invention.

FIG. 18W is a sample payment transaction report, consistent with one embodiment of the present invention. The report will display all submitted payment profiles 18W04 within the specified date range 18W02.

FIG. 18X is a sample payment profile report, consistent with one embodiment of the present invention. This report displays all payment profiles selected by the user 18X02. It should be noted that other embodiments are possible, consistent with the present invention.

FIG. 18Y is a sample employee payment history report, consistent with one embodiment of the present invention. This report indicates the employees selected by the user 18Y02 as well as the date range selected by the user 18Y04 and shows all payments for the employee during that time. It should be noted that other embodiments are possible, consistent with the present invention.

Figure 19:
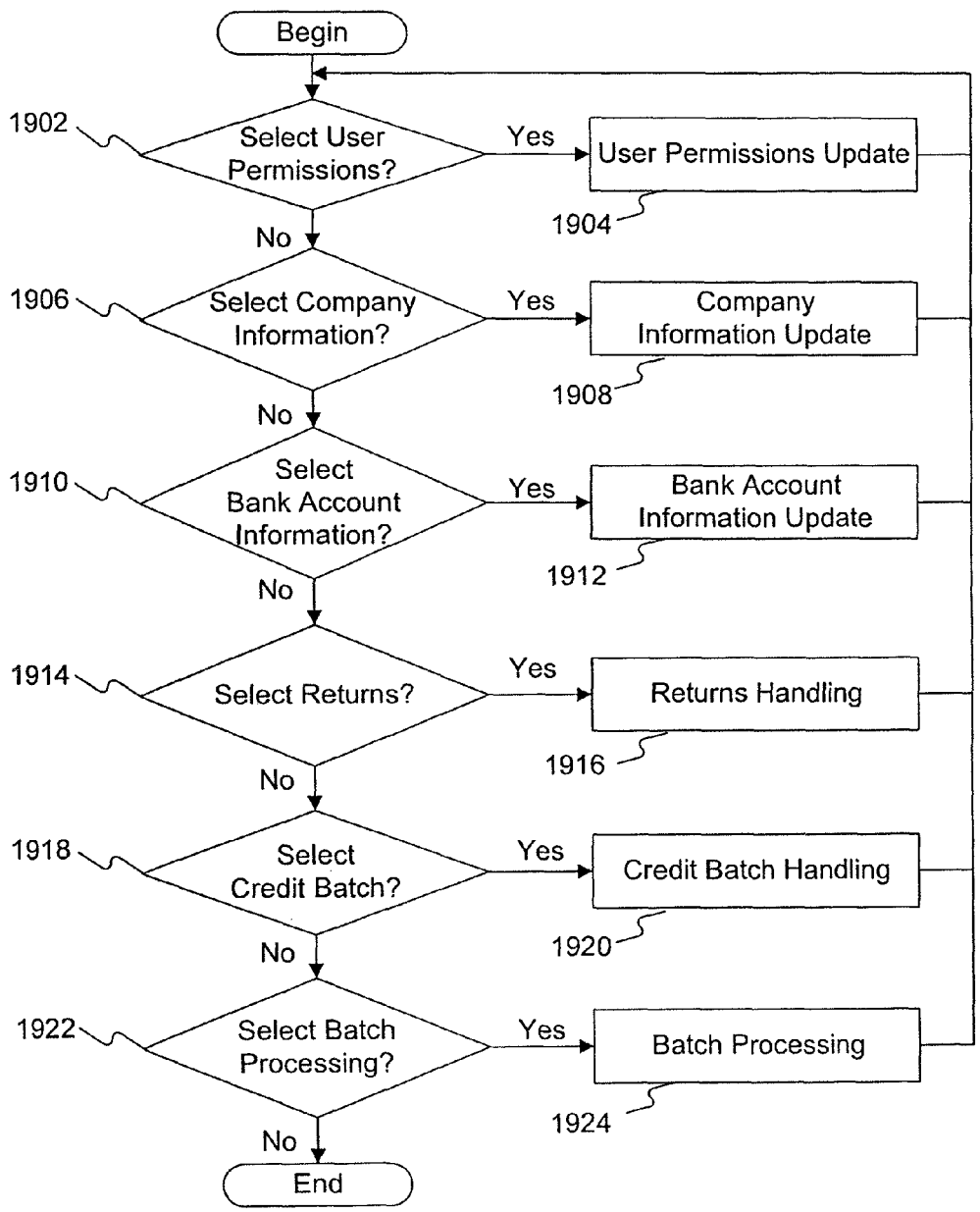
FIG. 19 is a flow chart of processing performed by an administrator application, consistent with one embodiment of the present invention.

FIG. 19 is a flow chart of processing performed by administrator application 404 consistent with one embodiment of the present invention. An administrator at accumulator 104 may use administrator application 404 to assist an employer accessing accumulator 104 via employer application 402 to submit electronic payments consistent with the present invention. As shown in FIG. 19, the administrator may select from several options using administrator application 404. These options may be presented, for example, as buttons on a graphical user interface.

If the administrator selects user permissions (step 1902), then administrator application 404 implements a user permissions update procedure (step 1904). The user permissions update procedure is explained below with reference to FIG. 20. If the administrator selects company information update (step 1906), then administrator application 404 implements a company information update procedure (step 1908). The company information update procedure is explained below with reference to FIG. 21. If the administrator selects bank account information update (step 1910), then administrator application 404 implements a bank account information update procedure (step 1912). The bank account information update procedure is explained below with reference to FIG. 22. If the user selects returns handling (step 1914), then administrator application 404 implements a returns handling procedure (step 1916). The returns handling procedure is explained below with reference to FIGS. 23A and 23B. If the user selects credit batch handling (step 1918), then administrator application 404 implements a credit batch handling procedure (step 1920). The credit batch handling procedure is described below with reference to FIG. 24. Finally, if the administrator selects batch processing (step 1922), then administrator application 404 implements a batch processing procedure (step 1924). The batch processing procedure is described below with reference to FIG. 25. It should be noted that other embodiments are possible, consistent with the present invention.

Figure 20:
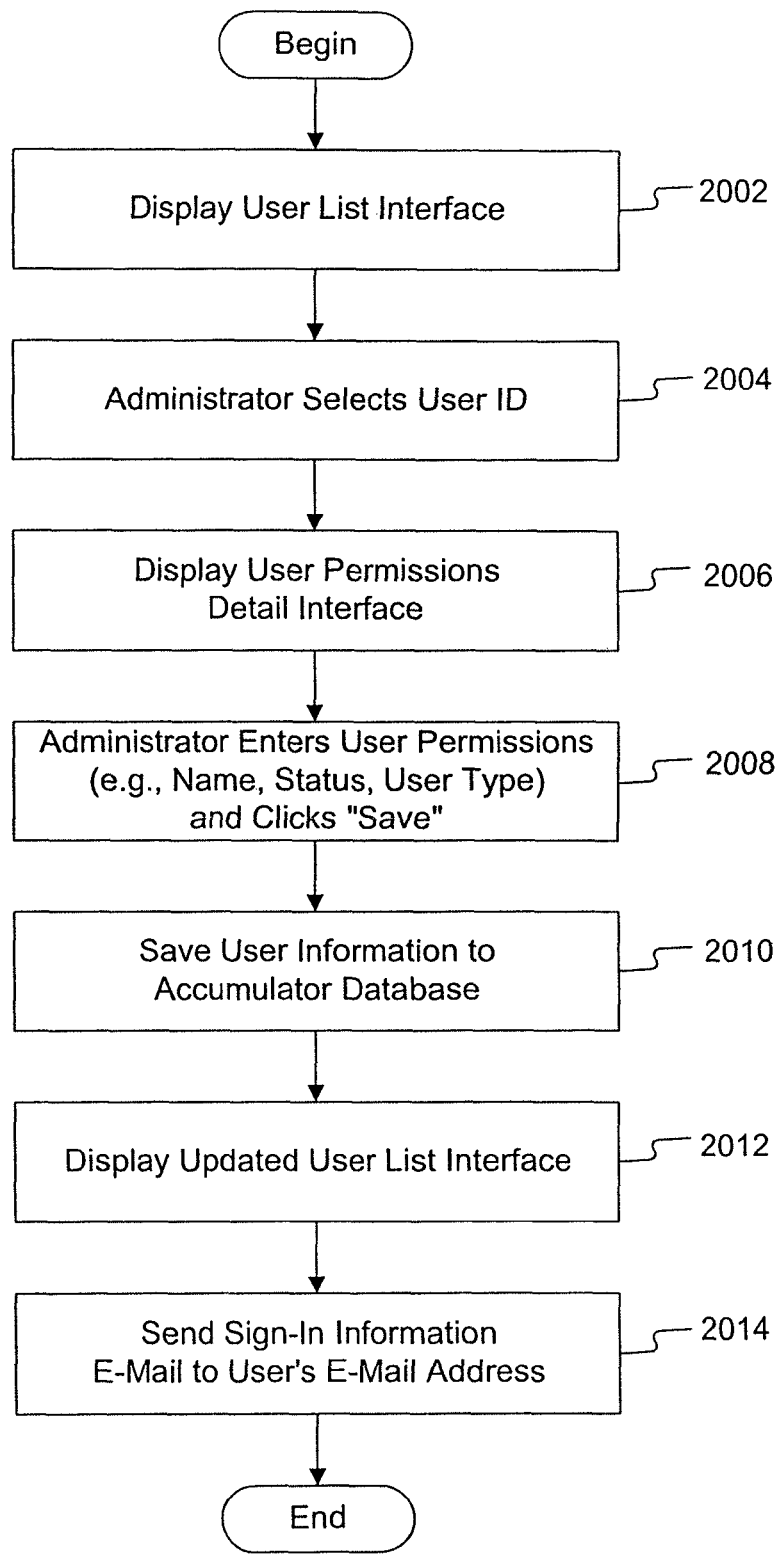
FIG. 20 is a flow chart of an embodiment of a user permissions update procedure, consistent with one embodiment of the present invention.

FIG. 20 is a flow chart of an embodiment of a user permissions update procedure, consistent with one embodiment of the present invention. Using this process, administrator application 404 enables an administrator to edit the permissions of one or more users. Administrator application 404 displays a user list interface (step 2002), and the administrator selects a user ID (step 2004). As described above, FIG. 18J includes a sample user list interface consistent with the present invention. The user list may include, for example, a user ID, user name, and status for one or more users authorized to access accumulator 104 on behalf of employer 102. When the administrator selects a user ID (step 2004), a user detail interface is displayed (step 2006). As discussed above, FIG. 18K includes a sample user detail interface. The administrator may enter or edit user permissions, for example, user name, status, user type, e-mail, and user ID and select save (step 2008). Administrator application 404 then saves the user information to, for example, user database 516 (step 2010). An updated user list interface is displayed (step 2012) and a sign in information e-mail is sent to the user's e-mail address (step 2014). It should be noted that other embodiments are possible, consistent with the present invention.

Figure 21:
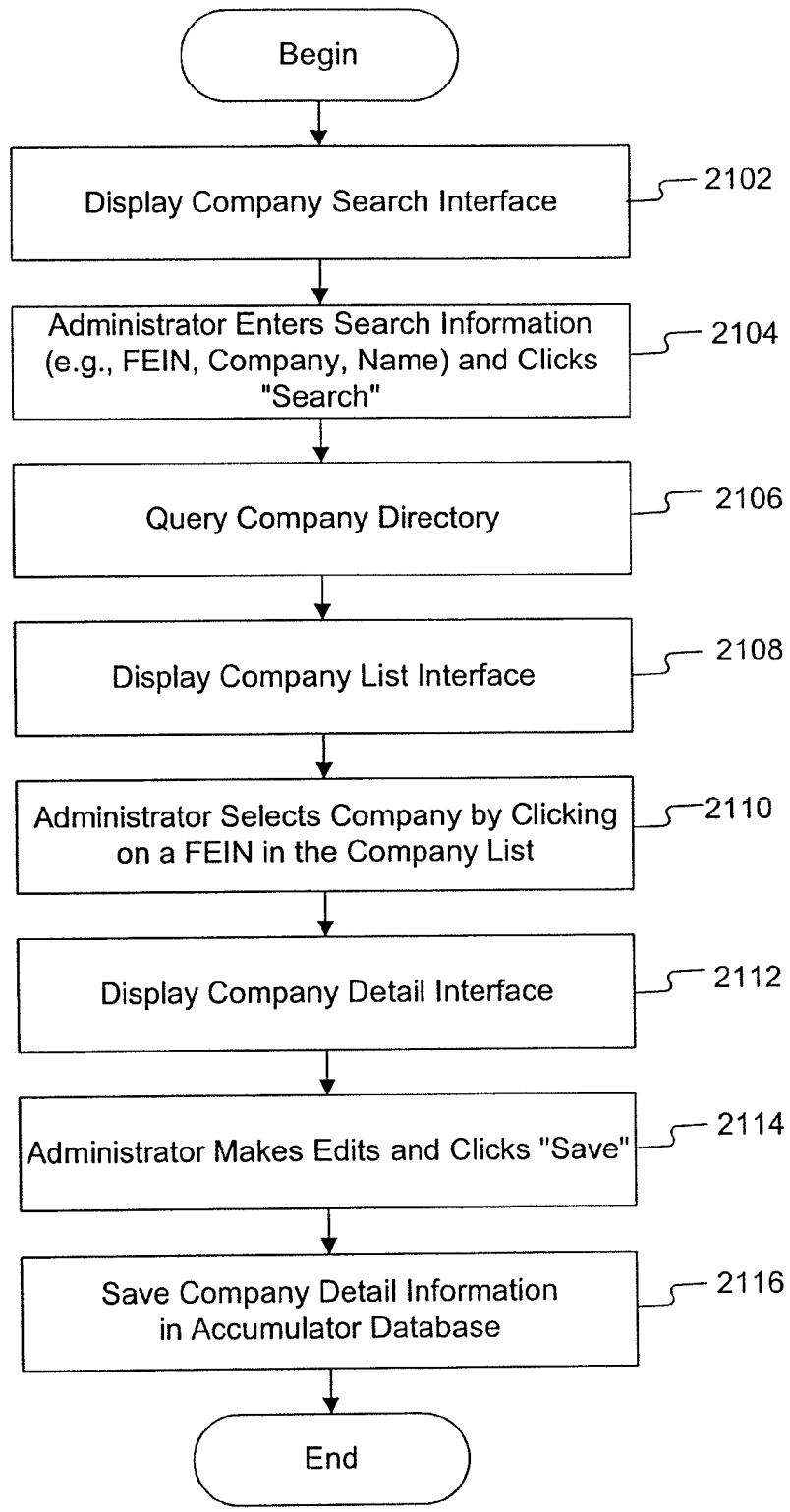
FIG. 21 is a flow chart of an embodiment of a company information update procedure, consistent with one embodiment of the present invention.
Figure 26B:
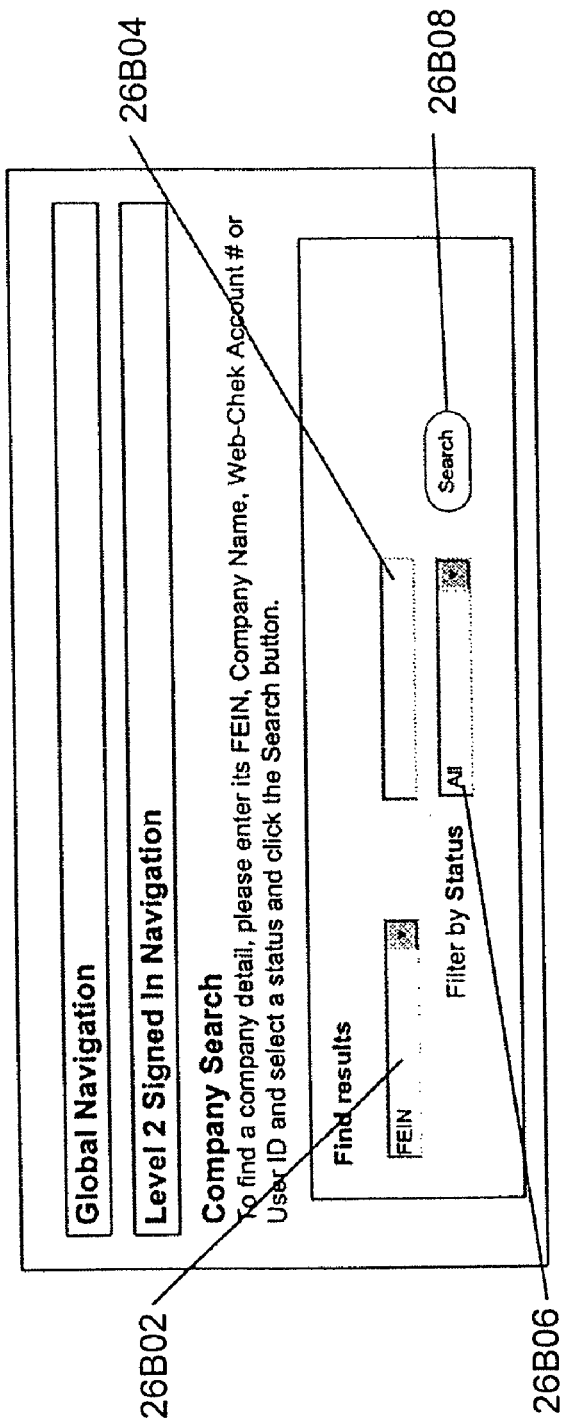
FIG. 26B is a sample company search interface, consistent with one embodiment of the present invention.
Figure 26C:
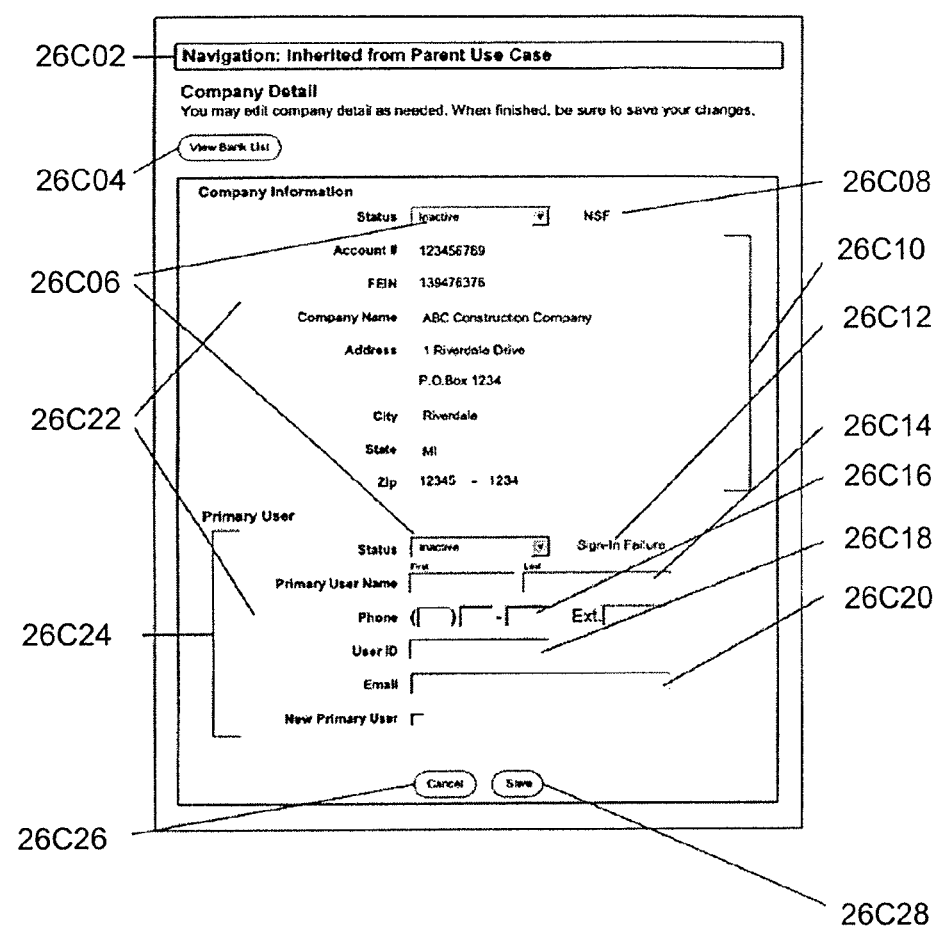

FIG. 21 is a flow chart of an embodiment of a company information update procedure, consistent one embodiment of with the present invention. Using this process, administrator application 404 enables an administrator to update company information. First, a company search interface may be displayed (step 2102). FIG. 26B contains a sample company search interface. When the administrator enters search information, such as a FEIN number or company name, the administrator chooses search to locate the appropriate company (step 2104). Administrator application 404 queries the company directory, stored for example, in registration database 512 (step 2106) and displays a company list interface corresponding to the company queried (step 2108). FIG. 26A includes a sample company list interface. From the company list interface, the administrator may select the appropriate company by choosing a FEIN number text link (step 2110). Administrator application 404 displays a company detail interface for the selected company (step 2112). FIG. 26C contains a sample company detail interface. The administrator may make edits to the company information using the company detail interface and choose save (step 2114). Administrator application 404 then saves the company detail information in, for example, registration database 512 (step 2116). It should be noted that other embodiments are possible, consistent with the present invention.

Figure 22:
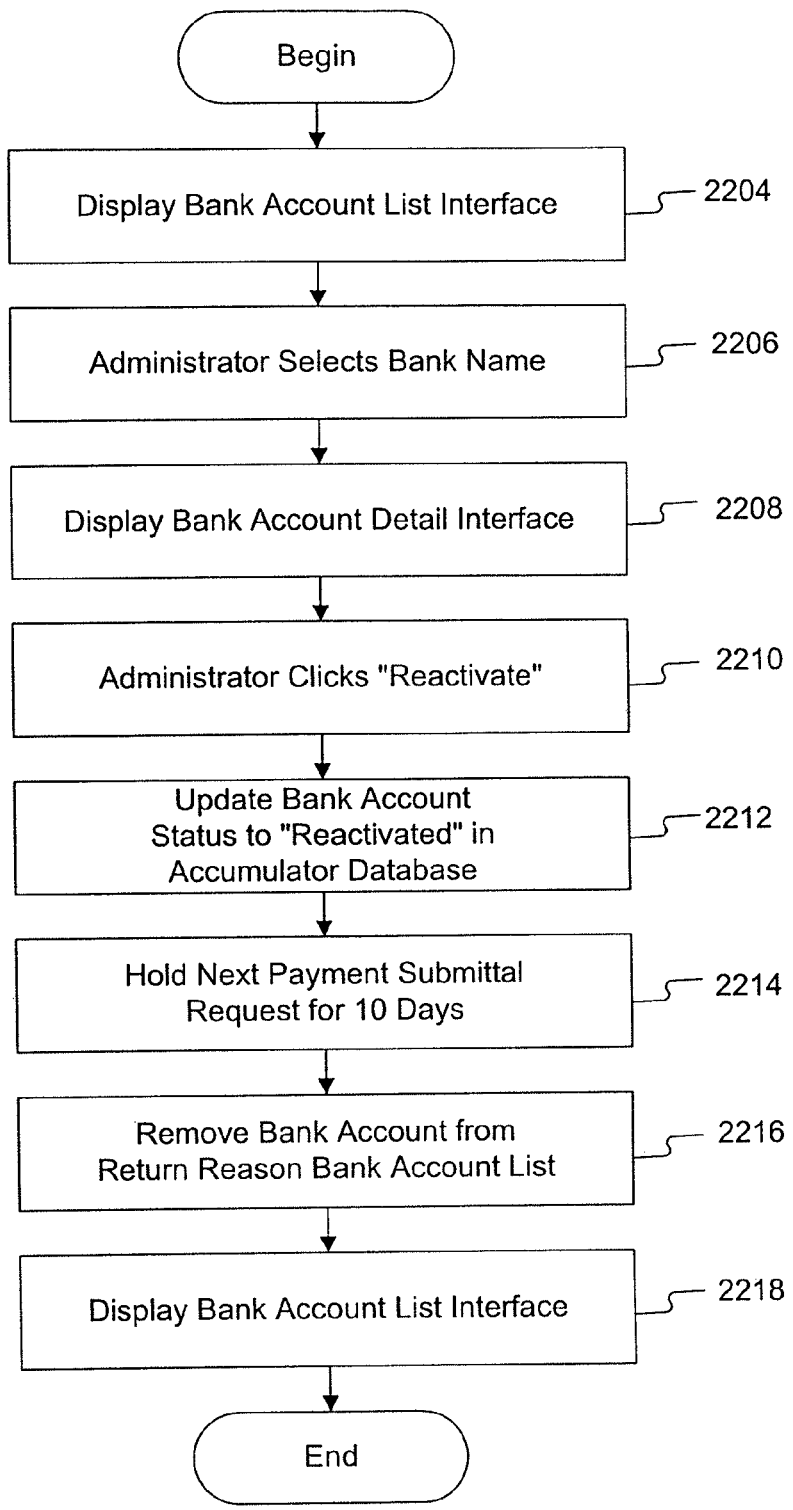
FIG. 22 is a flow chart of an embodiment of a bank account information update procedure, consistent with one embodiment of the present invention.
Figure 26D:
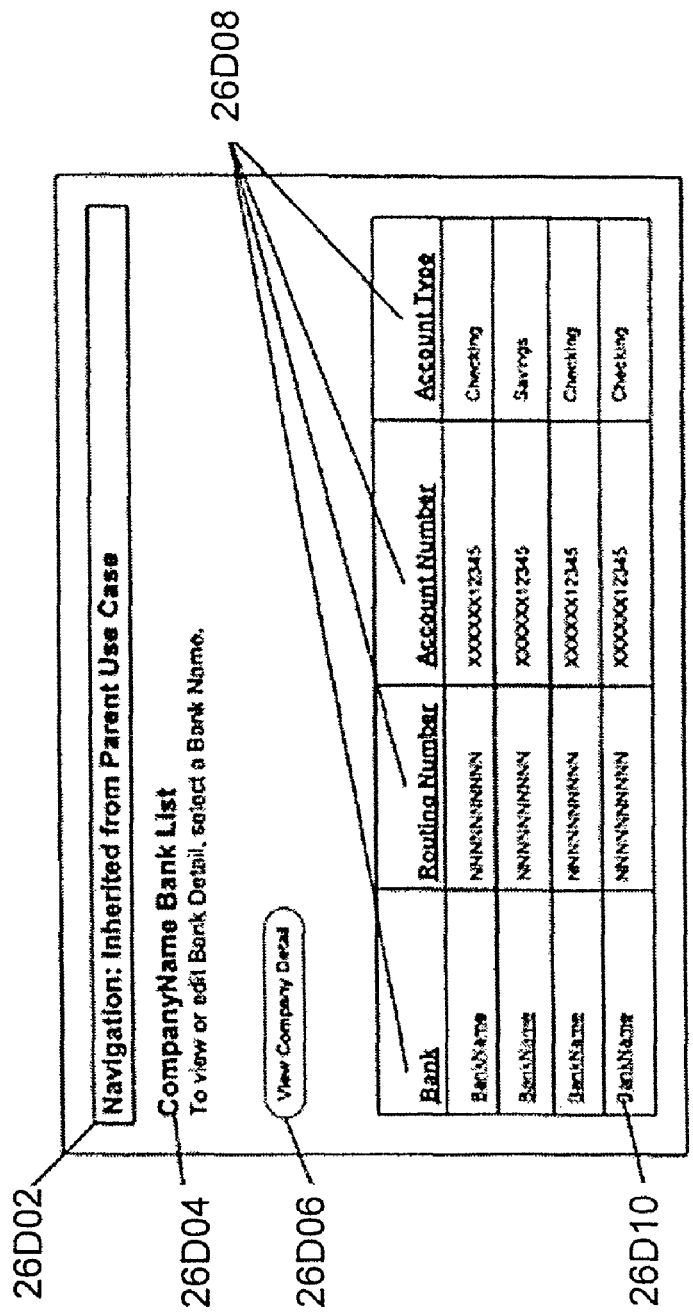
FIG. 26D is a sample bank account list interface, consistent with one embodiment of the present invention.
Figure 26E:
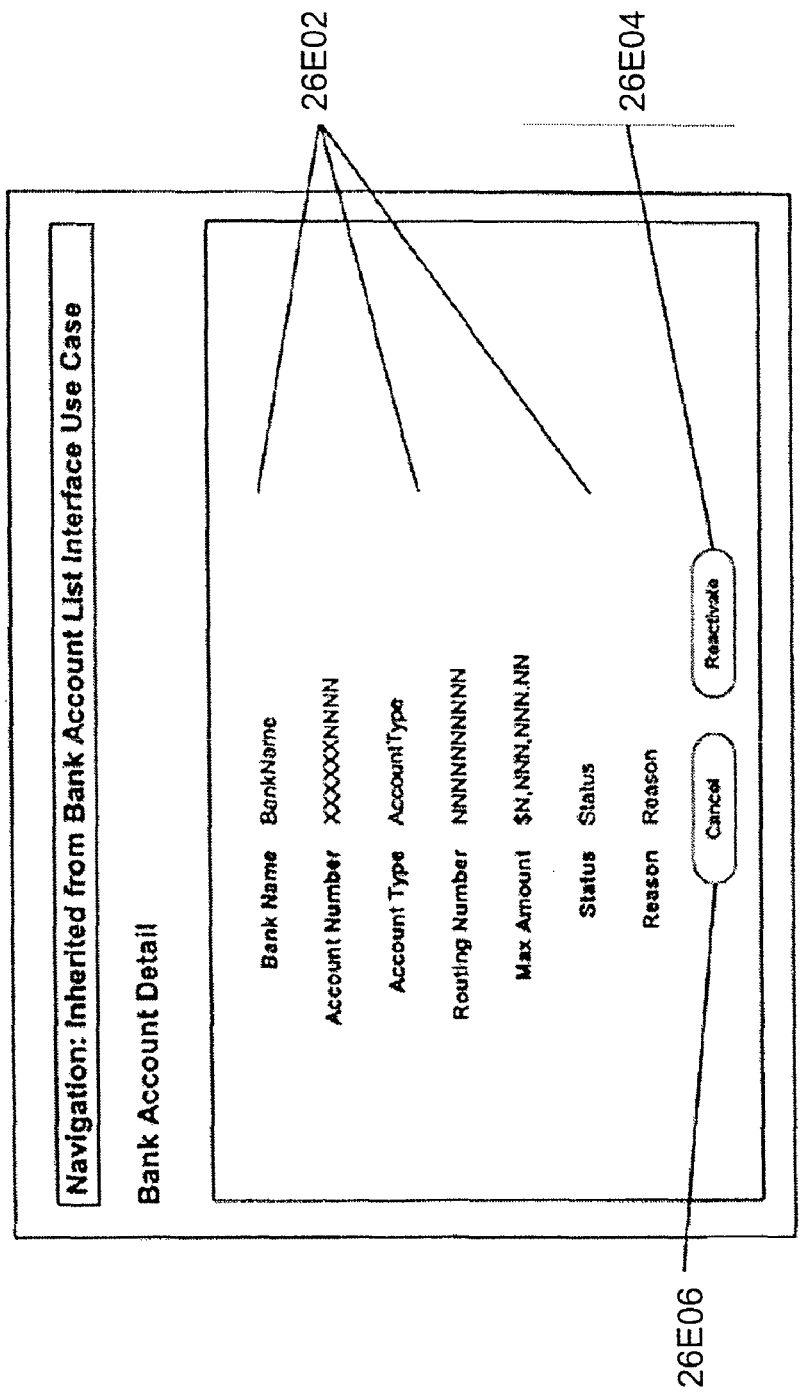
FIG. 26E is a sample bank account detail interface, consistent with one embodiment of the present invention.

FIG. 22 is a flow chart of an embodiment of a bank account information update procedure, consistent with one embodiment of the present invention. Using this process, administrator application 404 enables an administrator to edit bank account information. First, a bank account list interface is displayed (step 2204). FIG. 26D includes a sample bank account list interface. The administrator may select a bank name (step 2206), and the bank account detail interface for the selected bank is displayed (step 2208). FIG. 26E includes a sample bank account detail interface. On the bank account detail interface, the administrator may select reactivate (step 2210) to instruct the administrator application 404 to update the bank account status to "reactivated" in the database where the bank account detail information is stored (step 2212). The information may be stored, for example, in registration database 512 or payment database 504. When a bank account is reactivated in this way, the administrator application 404 will hold the next payment for that bank account for ten days (step 2214) and then remove the bank account from the return reason bank account list (step 2216). In this way, an administrator may allow an employer to begin using a bank account after the account has been rendered inactive due to, for example, a payment returned by the bank for insufficient funds. The administrator application 404 then displays an updated bank account list interface (step 2218). It should be noted that other embodiments are possible, consistent with the present invention.

Figure 23A:
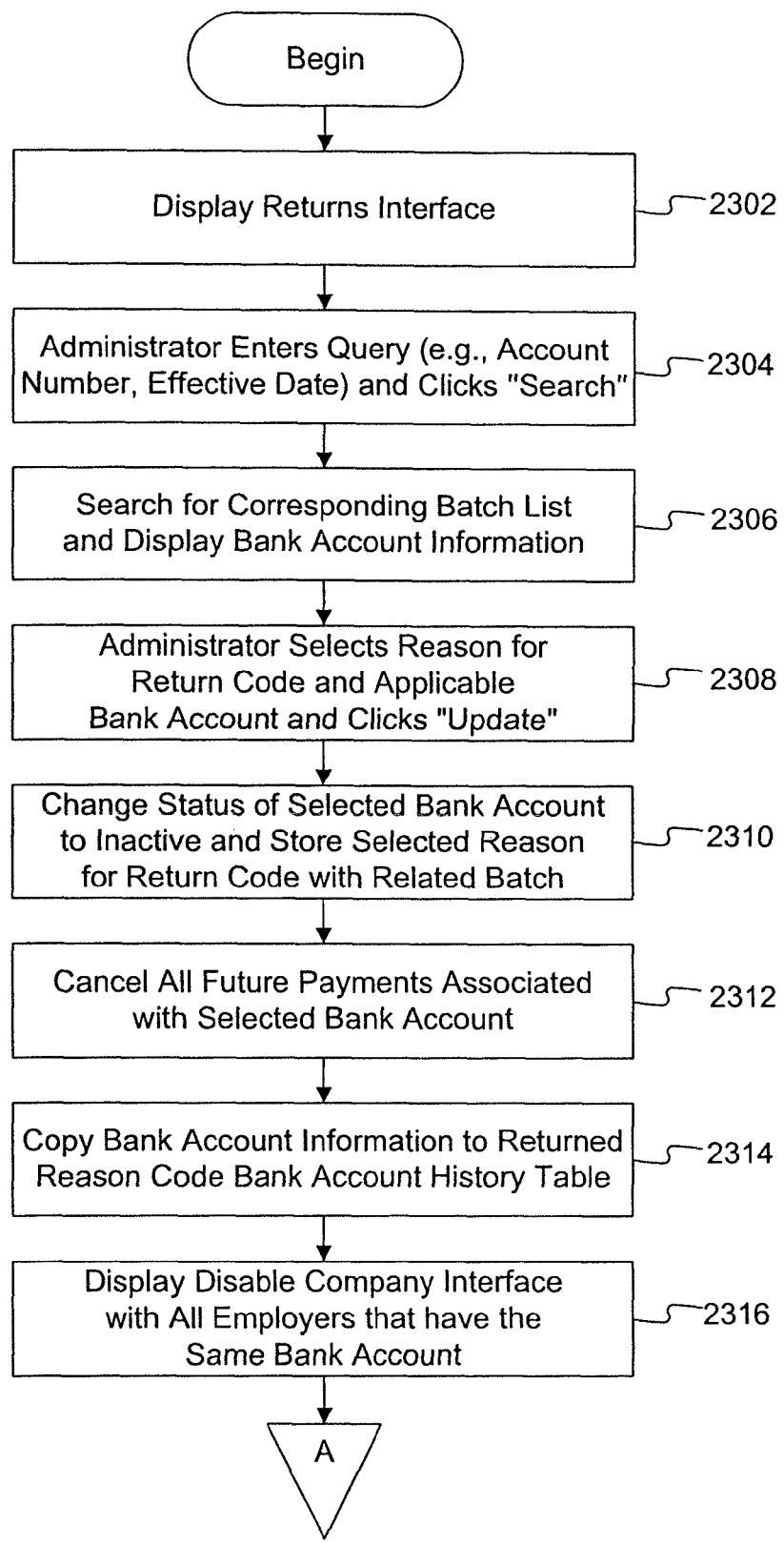
FIGS. 23A and 23B are flow charts of an embodiment of a returns handling procedure, consistent with one embodiment of the present invention.
Figure 23B:
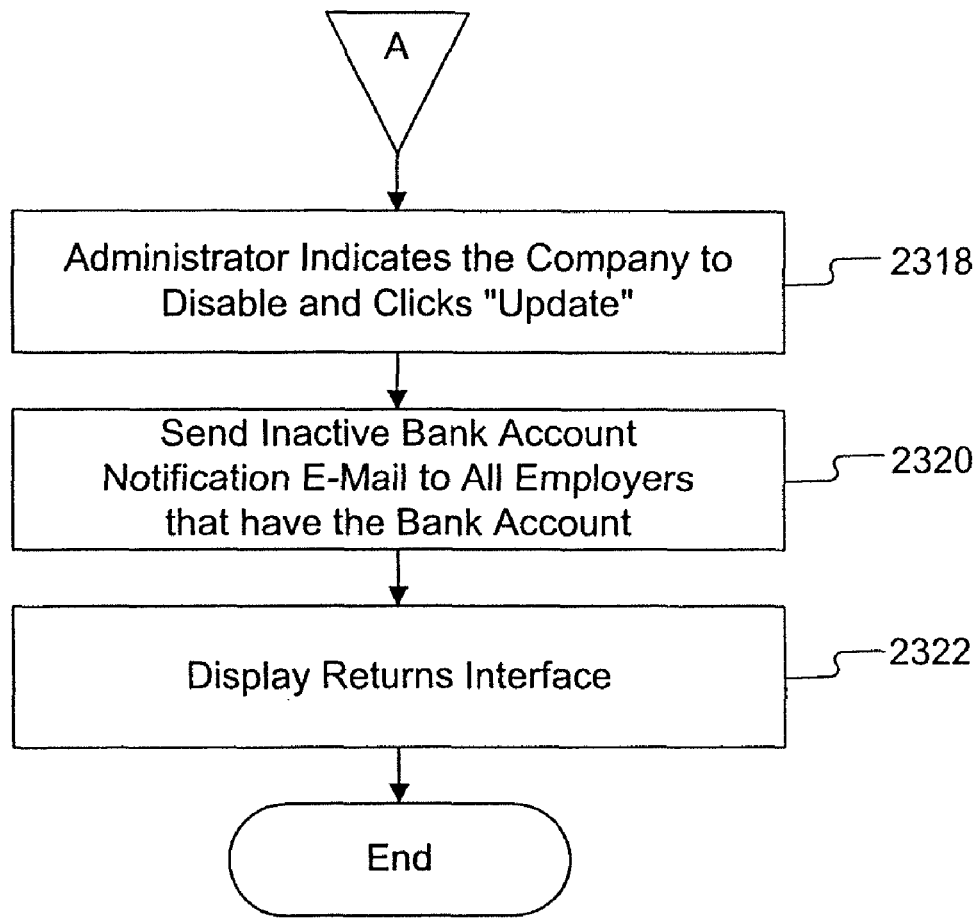
Figure 26F:
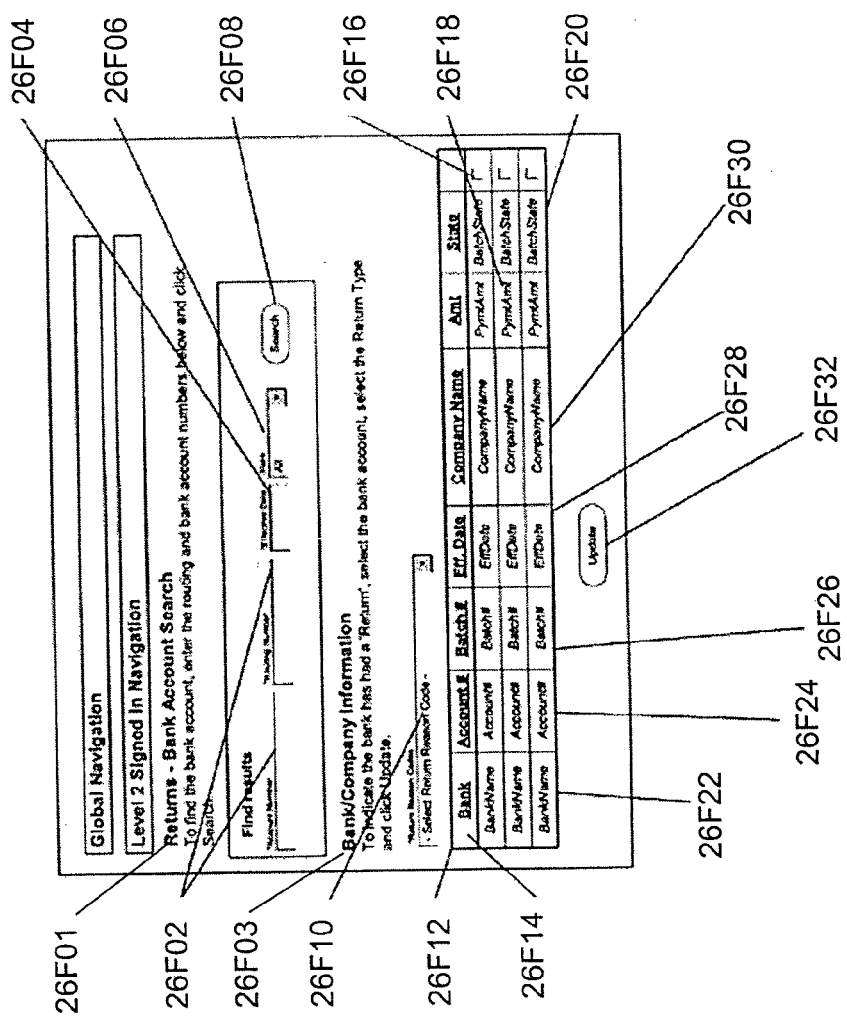
FIG. 26F is a sample returns interface, consistent with one embodiment of the present invention.
Figure 26G:
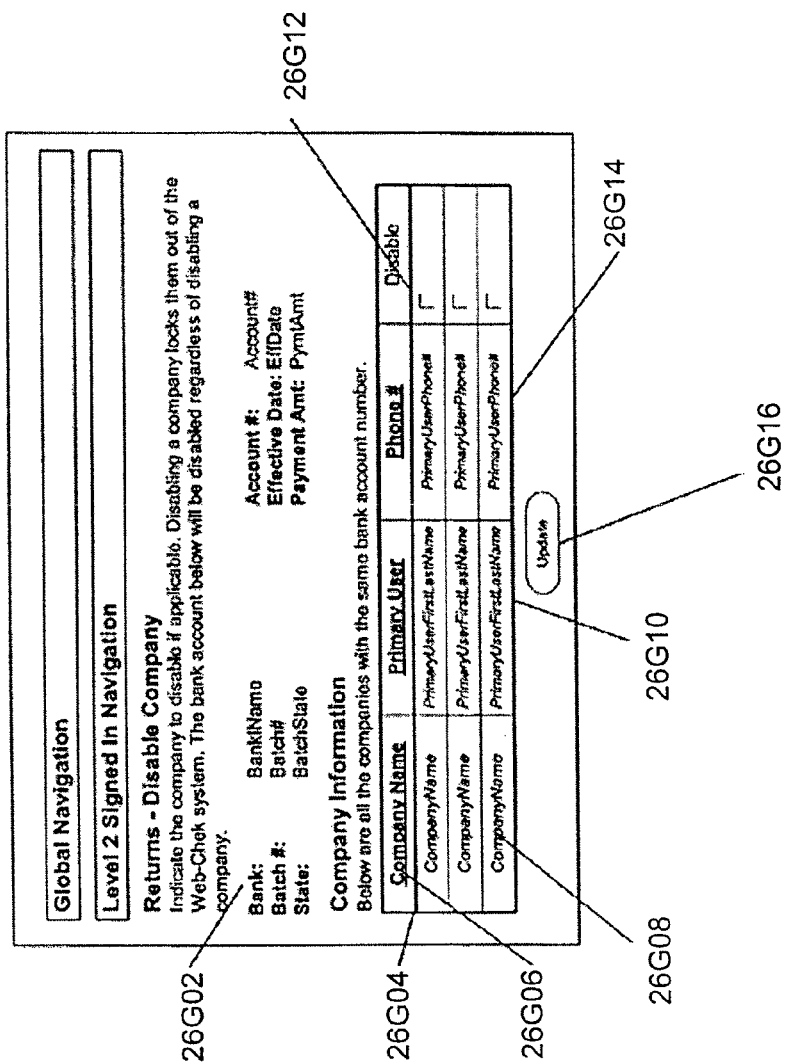
FIG. 26G is a sample disable company interface, consistent with one embodiment of the present invention.

FIGS. 23A and 23B are flow charts of an embodiment of a returns handling procedure, consistent with one embodiment of the present invention. Using this process, administrator application 404 enables an administrator at accumulator 104 to handle returned payments. A returned payment may occur, for example, when an employer submits a payment from an account that does not have a sufficient balance to process the debit or from an account that has been closed. The bank may return the payment unprocessed and marked, for example, return for insufficient funds. To process such a return, administrator application 404 displays a returns interface (step 2302). FIG. 26F includes a sample returns interface. When the administrator at accumulator 104 enters a query, such as an account number or an effective date, and chooses search (step 2304), administrator application 404 searches for a corresponding batch list and displays a bank account information on the returns interface (step 2306). The administrator is prompted to select a reason for return using, for example, a reason for return code, select the applicable bank account, and choose update (step 2308). Administrator application 404 will change the status of the selected bank account to "inactive" and store the selected reason for return code with the related batch (step 2310). This will cancel all future payments associated with the selected bank account (step 2312). The bank account information may be copied by administrator application 404 to a returned reason code bank account history table (step 2314). A disable company interface will be displayed containing all employers that have the same bank account (step 2316). FIG. 26G includes a sample disable company interface. The administrator at accumulator 104 may indicate a company to disable and choose update (step 2318). An inactive bank account notification e-mail will be sent to all employers using that bank account (step 2320), and the returns interface will be displayed (step 2322). It should be noted that other embodiments are possible, consistent with the present invention.

Figure 24:
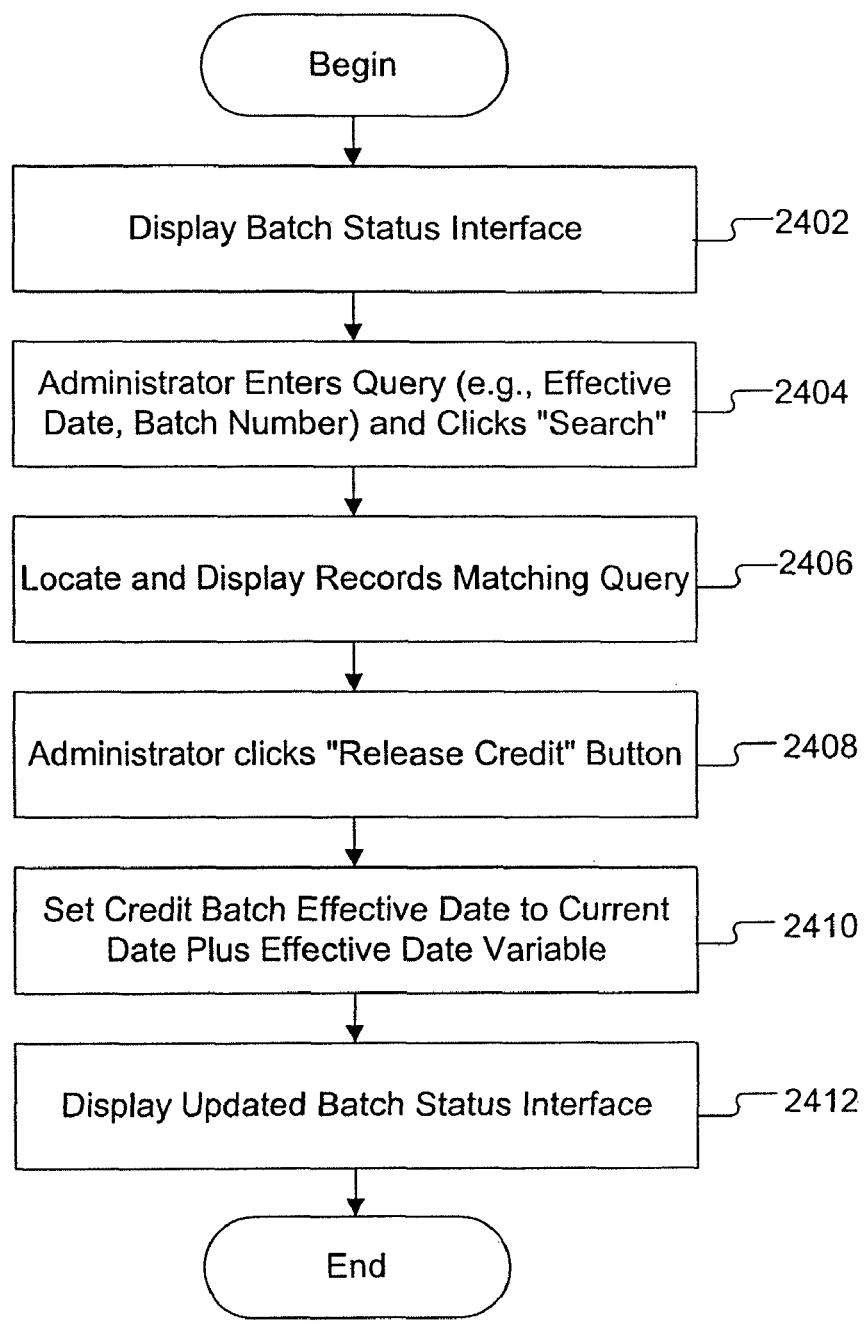
FIG. 24 is a flowchart of an embodiment of a credit batch handling procedure, consistent with one embodiment of the present invention.
Figure 26H:
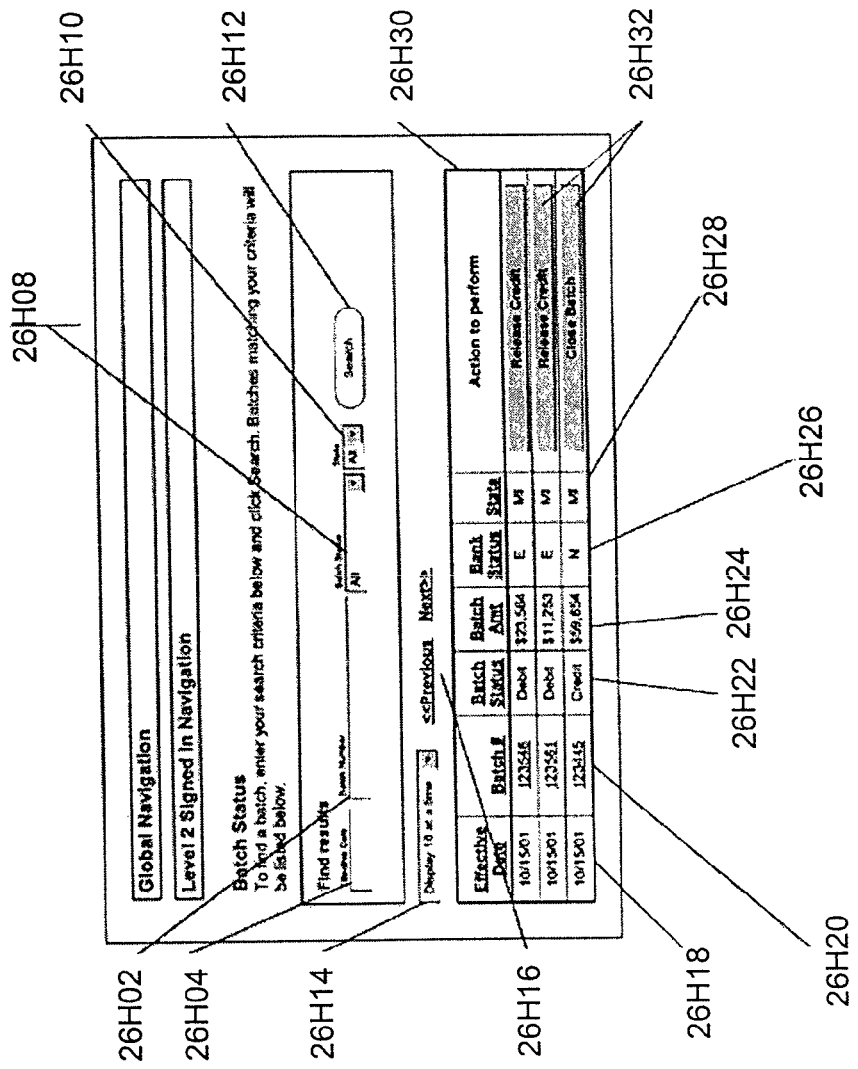
FIG. 26H is a sample batch status interface, consistent with one embodiment of the present invention.

FIG. 24 is a flowchart of an embodiment of a credit batch handling procedure, consistent with one embodiment of the present invention. Using this process, administrator application 404 enables an administrator to perform credit batch handling. A credit batch may be, for example, a collection of credits to be submitted in one batch. First, a batch status interface is displayed (step 2402). FIG. 26H includes a sample batch status interface. An administrator may enter a query, such as an effective date or a batch number, and choose search (step 2404). Administrator application 404 then locates and displays records matching the query (step 2406). These records may be located by searching, for example, payment database 504. When an administrator chooses "Release Credit" (step 2408), administrator application 404 sets a credit batch effective date to the current date plus an effective date variable (step 2410). The effective date variable may be, for example, three days, to allow for any returns from the employer's bank to be received before any corresponding credits are released to the recipient. Next, an updated batch status interface is displayed (step 2412). Batches of debits may also be handled in this way. It should be noted that other embodiments are possible, consistent with the present invention.

Figure 25:
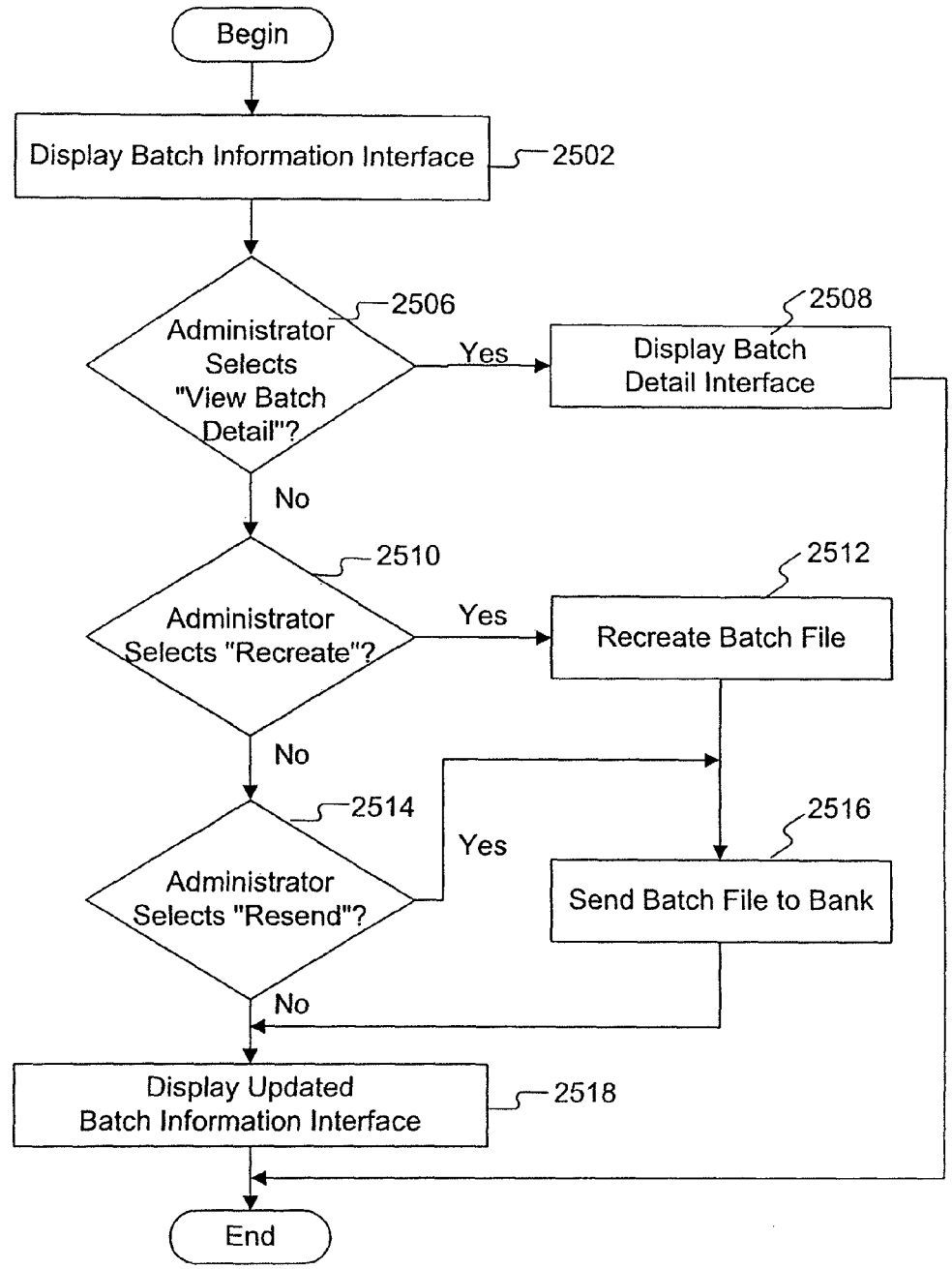
FIG. 25 is a flowchart of an embodiment of a batch processing procedure, consistent with one embodiment of the present invention.
Figure 26I:
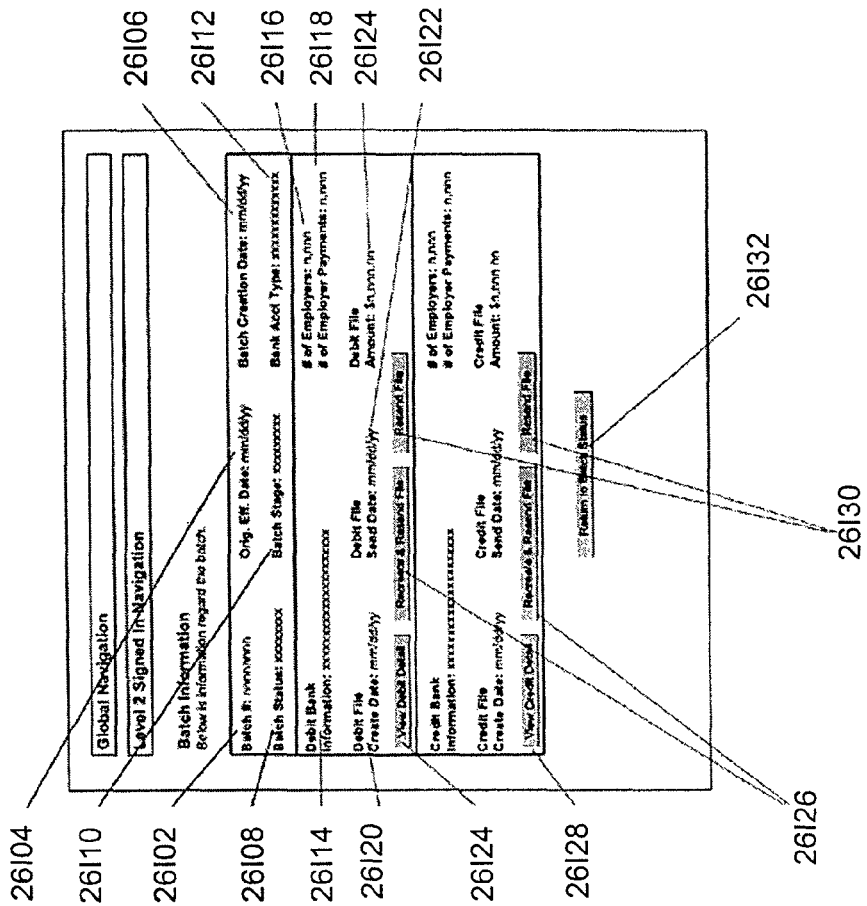
FIG. 26I is a sample batch information interface, consistent with one embodiment of the present invention.

FIG. 25 is a flowchart of an embodiment of a batch processing procedure, consistent with one embodiment of the present invention. Using this process, administrator application 404 enables an administrator at accumulator 104 to process either debits or credits in a batch. A batch information interface is displayed (step 2502) and the administrator may select one of several options. FIG. 26I includes a sample batch information interface. If the user selects "View Batch Detail" (step 2506), then a batch detail interface is displayed (step 2508). If the administrator selects "Recreate" (step 2510), then administrator application 404 recreates the batch file (step 2512), sends the batch file to the appropriate bank (step 2516), and displays an updated batch information interface. If the administrator selects "Resend" (step 2514), then administrator application 404 sends the batch file to the appropriate bank (step 2516) and displays an updated batch information interface (step 2518). It should be noted that other embodiments are possible, consistent with the present invention.

FIG. 26A is a sample company list interface, consistent with one embodiment of the present invention. This interface enables an administrator using administrator application 404 to view a list of companies registered to access accumulator 104. The company list 26A02 may contain all companies matching a user's search criteria. For each company in the list, the interface may include an account number, FEIN number, a company name, and a company status 26A04. The company list interface may also include a "Delete Selected Companies" button 26A06 that will delete all company details for a company selected by the administrator. The company list interface may include a checkbox 26A08 for each company listed that may be checked to indicate that the administrator wishes the company to be deleted. The company list interface may also include a display option drop-down list 26A10 that enables the administrator to choose the number of companies displayed on the list at any one time. The company list interface may also include a "Previous" button 26A12 and a "Next" button 26A14 if the company list contains multiple pages to enable the administrator to navigate between the several pages. It should be noted that other embodiments are possible, consistent with the present invention.

FIG. 26B is a sample company search interface, consistent with one embodiment of the present invention. This interface enables an administrator using administrator application 404 to search for one or more companies meeting designated criteria. To find company detail, the administrator is prompted to enter search criteria, such as a FEIN number, a company name, an account number, or a user ID. The company search interface may include a drop-down box 26B02 to show the administrator the options of search criteria. Once the user selects one of these options from drop-down box 26B02, the user may enter the appropriate data in a text box 26B04.

The format of text box 26B04 may be dictated by the selection of drop-down list 26B02. The company search interface may also include a filter by status drop-down list 26B06 of options such as all, active, inactive over 180 days, new, or insufficient funds. Finally, the company search interface may include a search button 26B08 to activate the administrator application's search for the company matching the query information. It should be noted that other embodiments are possible, consistent with the present invention.

FIG. 26C is a sample company detail interface, consistent with one embodiment of the present invention. This interface enables an administrator using administrator application 404 to edit company details as necessary and save any changes made. The company detail interface includes instructions to the administrator 26C02 and a "View Bank List" button 26C04 to display a bank account list interface. The company detail interface may also include a status of the company and/or a primary user 26C06. These status fields may be depicted as drop-down boxes with options such as active and inactive. If the status is inactive, a read-only inactive reason 26C08 may be displayed for the company, for example, NSF for insufficient funds. Other read-only information may be included in company detail interface 26C10 including, for example, account number, FEIN, company name, company address, and zip code. If the primary user's status is inactive, a read-only inactive reason may be displayed 26C12, such as sign-in failure. The primary user portion of the company detail interface may also include a primary user name 26C14, primary user phone number 26C16, user ID 26C18, and e-mail address 26C20. It should be noted that other embodiments are possible, consistent with the present invention.

All of the fields 26C22 may be prepopulated with information stored, for example, in registration database 512 or user database 516. The primary user field 26C24 may be editable by the administrator. The company detail interface may also include a "Cancel" button 26C26 to abandon the interface and a "Save" button 26C28 to save the company detail information. If the company status has been changed to inactive, a reason of "inactivated by administrator" will be stored in company status inactive reason 26C08. If the user status has been changed to inactive, the user status inactive reason 26C12 will be set to "inactivated by administrator." If the primary user's status is changed to active, the system will generate a new password for the primary user and send an account information e-mail to a primary user. It should be noted that other embodiments are possible, consistent with the present invention.

FIG. 26D is a sample bank account list interface, consistent with one embodiment of the present invention. The bank account list 26D02 may indicate the company name 26D04 corresponding to the bank list being viewed. This interface enables an administrator to view or edit bank detail by selecting one of the accounts on the bank account list 26D08. The bank account list interface may include a "View Company Detail" button 26D06 that displays the respective company detail interface for the company selected. The bank account list 26D08 may include a bank name, routing transit number, account number, and account type. In the bank account list interface, selecting one of the column headers may sort the bank list by the data in that column. The bank name text links 26D10 may display a bank account detail interface for the selected bank account. It should be noted that other embodiments are possible, consistent with the present invention.

FIG. 26E is a sample bank account detail interface, consistent with one embodiment of the present invention. The bank account detail interface includes data about a selected bank account 26E02, such as bank name, account number, account type, routing transit number, maximum withdrawal amount, status, and reason. The bank account detail interface may also include a reactivate button 26E04 to update the status of the bank account to reactivate it and place the next payment request on the 10-day hold process as described above in reference to FIG. 22. The bank account detail interface may also include a "Cancel" button 26E06 to return the user to the bank account list interface of FIG. 26D. It should be noted that other embodiments are possible, consistent with the present invention.

FIG. 26F is a sample returns interface, consistent with one embodiment of the present invention. The returns interface includes a bank account search portion 26F01 and a bank/company information portion 26F03. Bank account search portion 26F01 of the returns handling interface enables an administrator to find a bank account using a routing number and/or other bank account numbers. Bank account search portion 26F01 includes a set of fields such as account number and routing number 26E02, effective date 26F04, and state 26F06. The effective date may be, for example, the date that the return happened at the reporting bank. The bank account search portion may also include a drop-down list 26F06 of all of the states and a "Search" button 26F08 that will match the entered routing number, bank account number, and effective date to the batch list for the selected state.

Bank/company information portion 26F03 of the returns interface may include a drop-down list 26F10 containing all of the return reason codes with their descriptions. For example, return code 01 may indicate insufficient funds. The bank/company information portion may also include a table 26F12 that depicts search results based on the search criteria entered in bank account search portion 26F01 of the returns interface. The search results may include a bank name 26F14 and a checkbox 26F16 to indicate what bank account will be updated with a selected return reason code from drop-down list 26F10. The bank/company information search results may also include an amount field 26F18 to display the payment amount for the related batch and a state field 26F20 that displays the state where the batch was sent. The search results may also include a bank name 26F22, an account number 26F24, a batch number 26F26, and an effective date 26F28. A company name field 26F30 may display the company name that is associated with the bank account from the search results. The company name may be provided as a link that will display the company details interface for the selected company. The bank/company information portion may also include an "Update" button 26F32 that will change the bank account status to "inactive" and store the selected return reason code, canceling any related payments and displaying a disable company interface. It should be noted that other embodiments are possible, consistent with the present invention.

FIG. 26G is a sample disable company interface, consistent with one embodiment of the present invention. The disable company interface may indicate a company to be disabled due to, for example, a predetermined number of returned payments. Disabling a company will lock it out of the accumulator. The disable company interface includes bank account information 26G02 selected from the returns interface. The bank account information may include, for example, a bank name, batch number, state, account number, effective date, and payment amount. The disable company interface also includes a company information list 26G04 all of the companies with the same bank account number. Company information list 26G04 may include a company name 26G08, a primary user 26G10, a phone number for the primary user 26G14, and a checkbox 26G12 where the administrator may indicate that the company selected is to be disabled. The company information list may include column headings 26G06 that can be used to sort the list by the data in that column. The disable company interface may also include an "Update" button 26G16. Choosing the "Update" button will post a notice of inactive bank account for all companies listed and send an inactive bank account notification to a primary user for each of the companies listed. It should be noted that other embodiments are possible, consistent with the present invention.

FIG. 26H is a sample batch status interface, consistent with one embodiment of the present invention. To locate a batch, the administrator may enter search criteria and choose "search." Batches matching the search criteria will be listed on the batch status interface. The search criteria may be entered in a find results portion of the batch status interface, including a batch number 26H02, an effective date 26H04, a batch type 26H08, and a state 26H10. The batch type 26H08 may include a drop-down list for the administrator to indicate whether the batch is a debit batch or a credit batch. The state field 26H10 may include a drop-down list containing all states. The batch status interface may also include a display option 26H14 to enable the administrator to determine how many batches are listed in the batch list portion of the batch status interface. The batch status interface may also include a "Previous" button and a "Next" button 26H16 if the list contains multiple pages to enable the administrator to navigate among the multiple pages.

The batch list portion 26H30 of the batch status interface includes an effective date 26H18 of the payments in the batch, a batch number 26H20, a batch status indicator 26H22, a batch amount 26H24, a bank status 26H26, and a state 26H28. Batch number 26H20 may be a unique number for the batch. The batch number 26H20 may be a text link to the batch information interface for the selected batch. The batch status 26H22 may indicate what type of batch it is, for example, a debit batch or a credit batch. The batch amount 26H24 is the total amount of dollars in the batch. The bank status 26H26 indicates whether the batch contains new bank accounts or established bank accounts. The state 26H28 indicates what recipient the batch is for. The batch status interface may also include action buttons 26H32 to indicate the next appropriate action for the batch. For example, the buttons may include a "Release Credit" button 26H32 or a "Close Batch" button 26H32. Choosing the "Release Credit" button initiates credit batch processing. This may only be available when the debit processing has been completed. Choosing "Close Batch" closes the batch. This may only be available after the credit processing has been completed. It should be noted that other embodiments are possible, consistent with the present invention.

FIG. 26I is a sample batch information interface, consistent with one embodiment of the present invention. The batch information interface may include a batch number 26I02, an effective date 26I04, a batch creation date 26I06, a batch status 26I08, a batch stage 26I10, and a bank account type 26I12. The batch number 26I02 may be a unique number for the batch. The effective date 26I04 may be the effective date (i.e., the date of delivery to the recipient) of the payments in the batch. The batch creation date 26I06 may be the date the batch was created. The batch status 26I08 indicates if the batch is active or not. The batch stage 26I10 indicates where the batch is in its lifecycle (e.g., debit processing, credit processing, etc.). The bank account type 26I12 indicates whether the bank account corresponding to the batch is new or established. The batch information interface may also include information about a debit and a credit corresponding to the batch.

The debit information may include a debit bank 26I14 indicating the bank the file was sent to for debit processing, a number of employers 26I16 in the batch, and a number of employer payments 26I18. The debit information may also include a debit file creation date 26I20 indicating the date the file was created, a debit file send date 26I22, indicating the date the debit was sent to the bank for debit processing, and a debit file amount 26I24 including the sum of the employer payments in the batch file. The debit portion may also include a button for "View Debit Detail" 26I24 that displays the debit batch detail interface corresponding to this batch, a "Recreate and Resend File" button 26I26 enabling a system administrator to recreate and resend the debit batch, and a "Resend File" button 26I30 that enables the system administrator to resend the debit batch to the bank.

The credit information may include information similar to the debit information, including a credit bank, number of employers, number of employer payments, credit file create date, credit file send date, and credit file amount. The credit information may also include a "View Credit Detail" button 26I28 to display the credit batch detail interface for the corresponding credit batch as well as a "Recreate and Resend File" button and a "Resend File" button. The batch information interface may also include a "Return to Batch Status" button 26I32 that enables the administrator to return to the batch status interface of FIG. 26H. It should be noted that other embodiments are possible, consistent with the present invention.

Figure 26J:
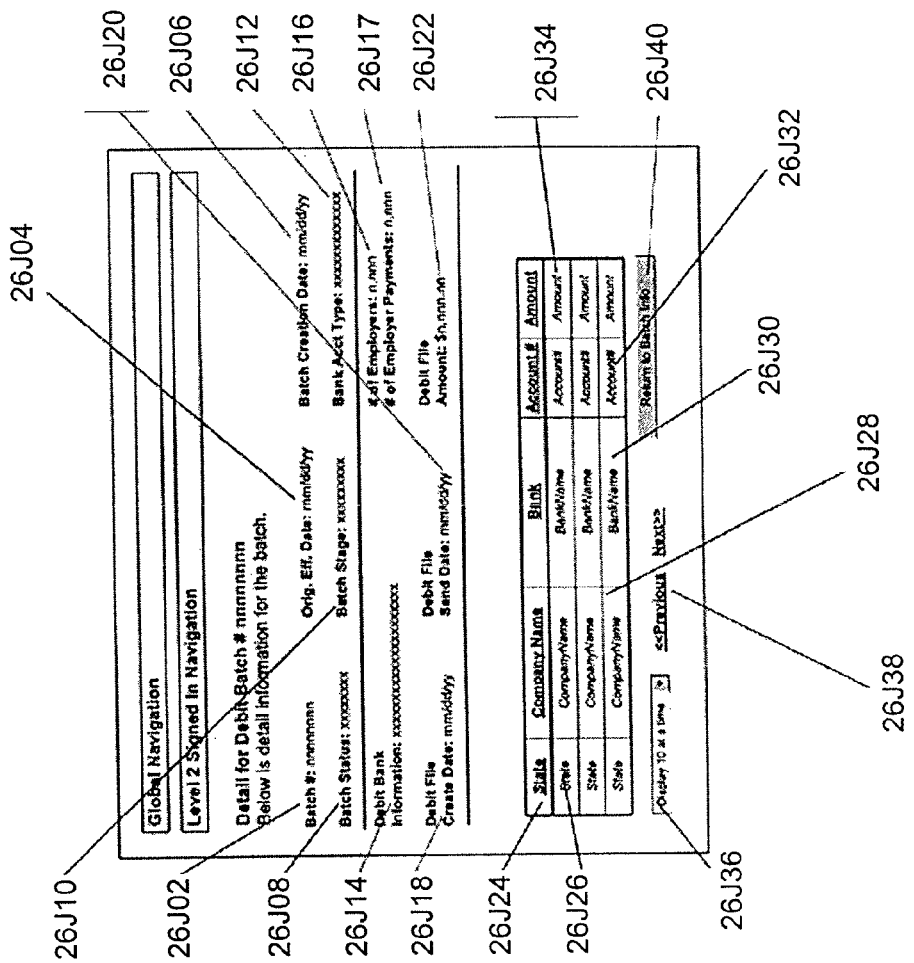
FIG. 26J is a sample debit batch information interface, consistent with one embodiment of the present invention.

FIG. 26J is a sample debit batch information interface, consistent with one embodiment of the present invention. The debit batch information interface may include a batch number 26J02 that may be a unique number corresponding to the batch, an original effective date 26J04 listing the effective date of the payments in the batch, and a batch creation date 26J06 containing the date the batch job was created. The debit batch detail interface may also include a batch status field 26J08 to indicate whether the batch is active, a batch stage field 26J10 to indicate where the batch is in its lifecycle, and a bank account type 26J12 to indicate whether the bank account is new or established. The debit batch detail interface may also include debit bank information 26J14, a number of employers 26J16, and a number of employer payments 26J17. The debit batch detail interface may include a debit file creation date 26J18, a debit file send date 26J20, and a debit file amount 26J22.

The debit batch detail interface may also include a list 26J24 of the debits in this batch. The list 26J24 of debits may include a state 26J26 indicating where the payment was sent, a company name 26J28 displaying the company name associated with the payment, a bank name 26J30 displaying the bank name for the payment, an account number 26J32, and an amount field 26J34. In addition, the debit batch detail interface may include a display option drop-down list 26J36 to enable an administrator to determine how many debits are displayed at one time. The debit batch detail interface may also include a "Previous" button 26J38 and a "Next" button to enable an administrator to navigate between multiple pages of the debit batch list. It should be noted that other embodiments are possible, consistent with the present invention.

Figure 26K:
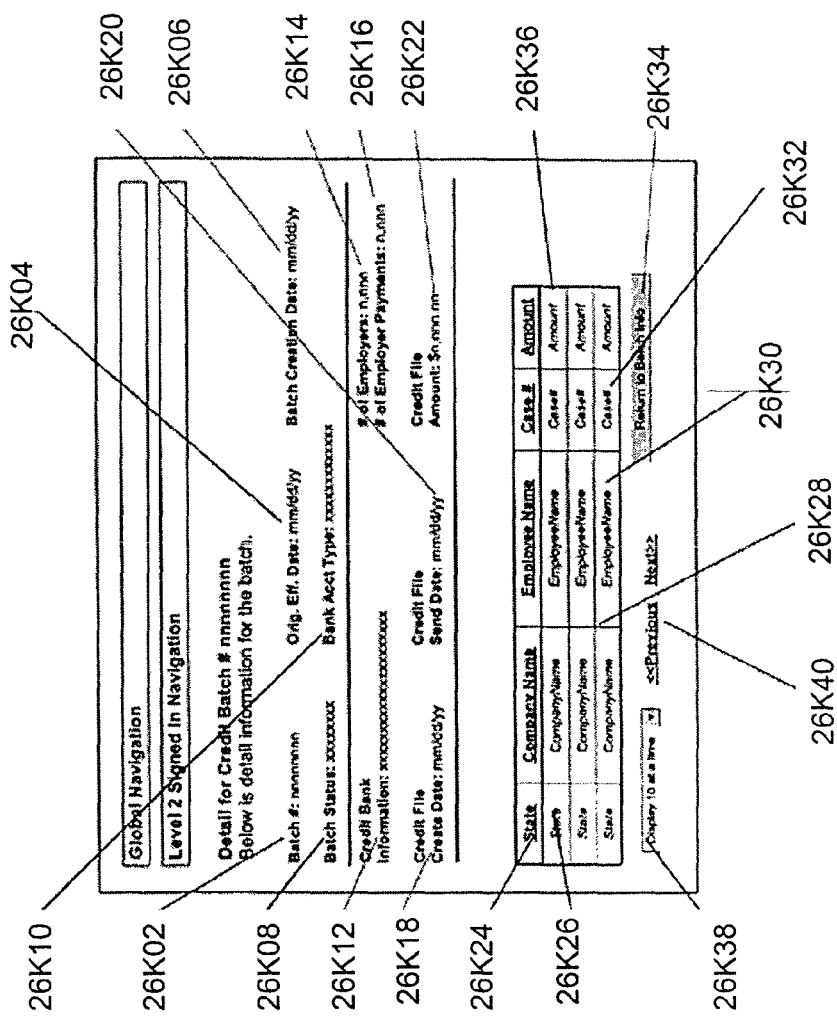
FIG. 26K is a sample credit batch detail interface, consistent with one embodiment of the present invention.

FIG. 26K is a sample credit batch detail interface, consistent with one embodiment of the present invention. The credit batch detail interface may include a batch number 26K02, an effective date 26K04, a batch creation date 26K06, batch status 26K08, and bank account type 26K10. For the credit batch, the credit batch detail interface may also include credit bank information 26K12, a number of employers 26K14, a number of employer payments 26K16, a credit file creation date 26K18, a credit file send date 26K20, and a credit file amount 26K22. The credit batch detail interface may also include a list 26K24 of the credits in the selected credit batch. The credit batch list may include the state where the credit file was sent 26K26, the company name 26K28, an employee name for the payment being made 26K30, a case number corresponding to the payment of the employee 26K32, and an amount of the associated payment 26K36. The credit batch detail interface may also include a button 26K34 to enable the administrator to return to the batch information interface. The interface may also include a display option drop-down list 26K38 to enable an administrator to determine how many credits are displayed at one time, a "Previous" button 26K40, and a "Next" button. It should be noted that other embodiments are possible, consistent with the present invention.

Figure 26L:
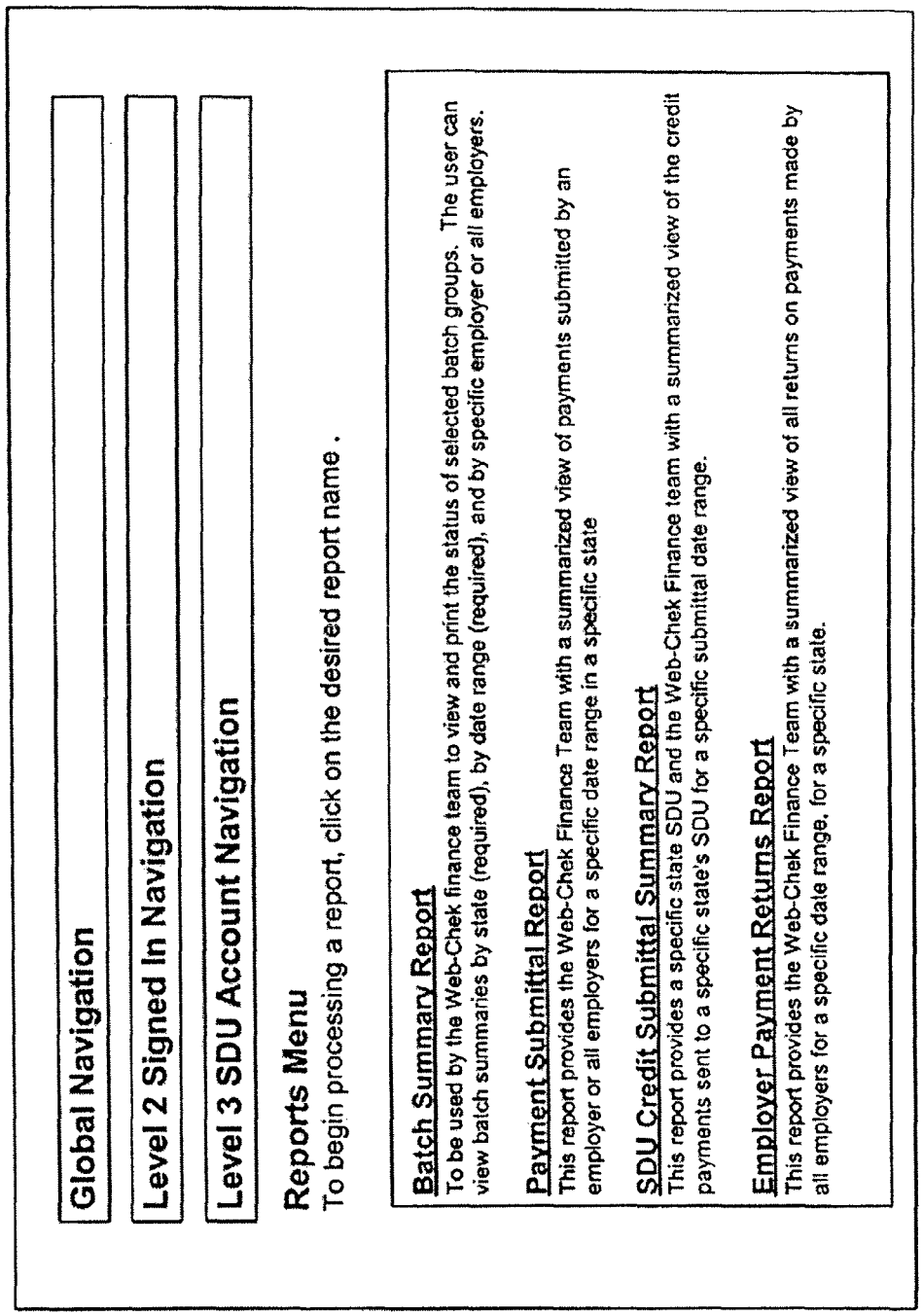
FIG. 26L is a sample reports menu, consistent with one embodiment of the present invention.

FIG. 26L is a sample reports menu, consistent with one embodiment of the present invention. This menu may be presented to an administrator at the accumulator 104 via administrator application 404. The reports menu may enable an administrator to run a number of reports, including a batch summary report, a payment submittal report, an SDU credit summary report, and an employer payment returns report. It should be noted that other embodiments are possible, consistent with the present invention.

Figure 26M:
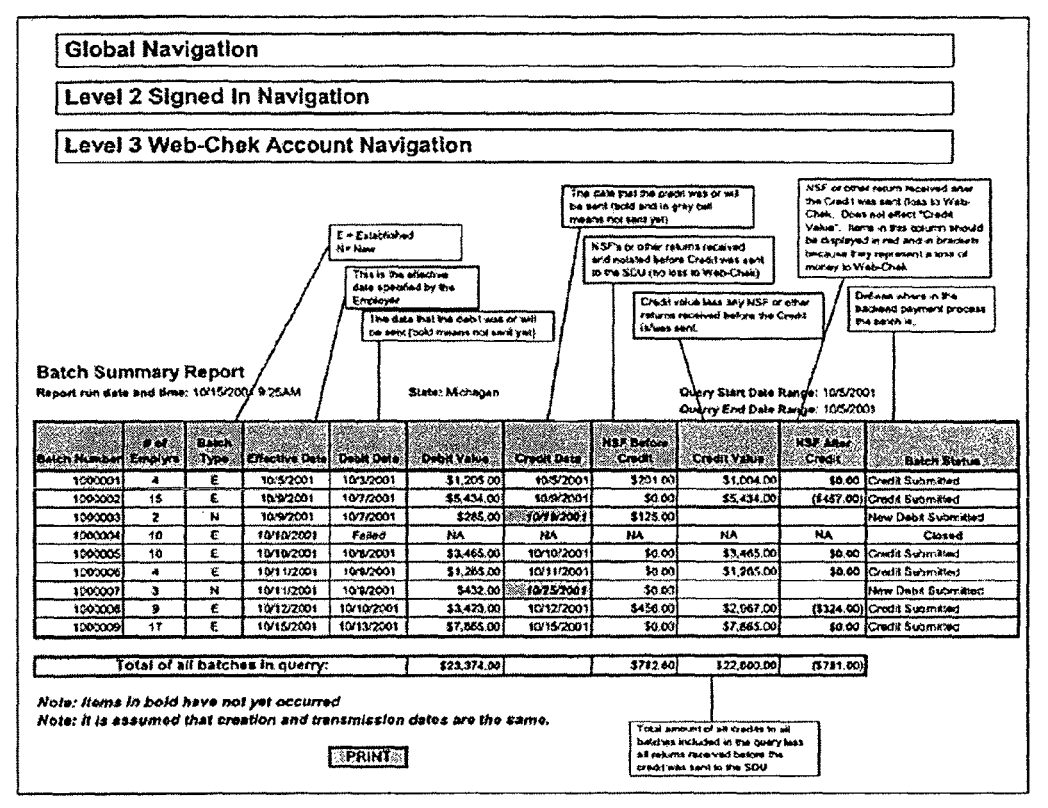

FIG. 26M is a sample batch summary report, consistent with one embodiment of the present invention. A batch summary report may be used to view and print the status of selected batch groups. An administrator can view batch summaries by state, by date range, by specific employer, or by all employers. The batch summary report may include the date and time on which it is run, the state for which it is run, the query start date, and a query end date. The batch summary report may include a batch number, a number of employers, a batch type, an effective date, a debit date, a debit value, a credit date, the returns before the credit, the credit value, returns after the credit is processed, and a batch status. The batch summary report may also include a totals column to total the debit value, credit value, and returns before and/or after the credit is issued. The batch summary report may include a print button to enable the administrator to print the batch summary report. It should be noted that other embodiments are possible, consistent with the present invention.

FIG. 26N is a sample payment submittal summary report, consistent with one embodiment of the present invention. This report provides a summarized view of payments submitted by an employer or by all employers for a specific date range in a specific state. The submittal summary report includes the state, the start date, the end date, and the employer. The report contains values for the employer submittal date, requested effective date, actual effective date, employer name, bank account status, number of employee records, total amount of employer payment, and batch status. It should be noted that other embodiments are possible, consistent with the present invention.

FIG. 26O is a sample SDU credit submittal summary report, consistent with one embodiment of the present invention. This report presents a summarized view of credit payments sent to a specific state's SDU within a specific submittal date range. The SDU credit submittal summary report includes a date the credit was submitted to the SDU, a state, a report date, a starting submittal date, and an ending submittal date. The data shown on the SDU credit submittal summary report may include, for example, a date the payment was submitted to the SDU, a number of employer records, the number of employee records, and a credit value. The SDU credit submittal summary report may also include a print button to enable the administrator to print the SDU credit submittal summary report. It should be noted that other embodiments are possible, consistent with the present invention.

FIG. 26P is a sample employer payment returns report, consistent with one embodiment of the present invention. This report presents a summarized view of returns on payments made by employers for a specific date range for a specific state. The employer payment returns report may include the name of an employer, the report run date and time, the state, and the return date range. The data in the employer payment returns report may include, for example, an employer name, the employer ID or account number, the batch number, the return date, the amount of the returns pre-credit, the amount of the returns post-credit, the return reason, the contact name, the phone number, and an extension of the employer's primary contact. The employer payment returns report may also include a print button to enable the administrator to print the employer payment returns report. It should be noted that other embodiments are possible, consistent with the present invention.

Figure 27:
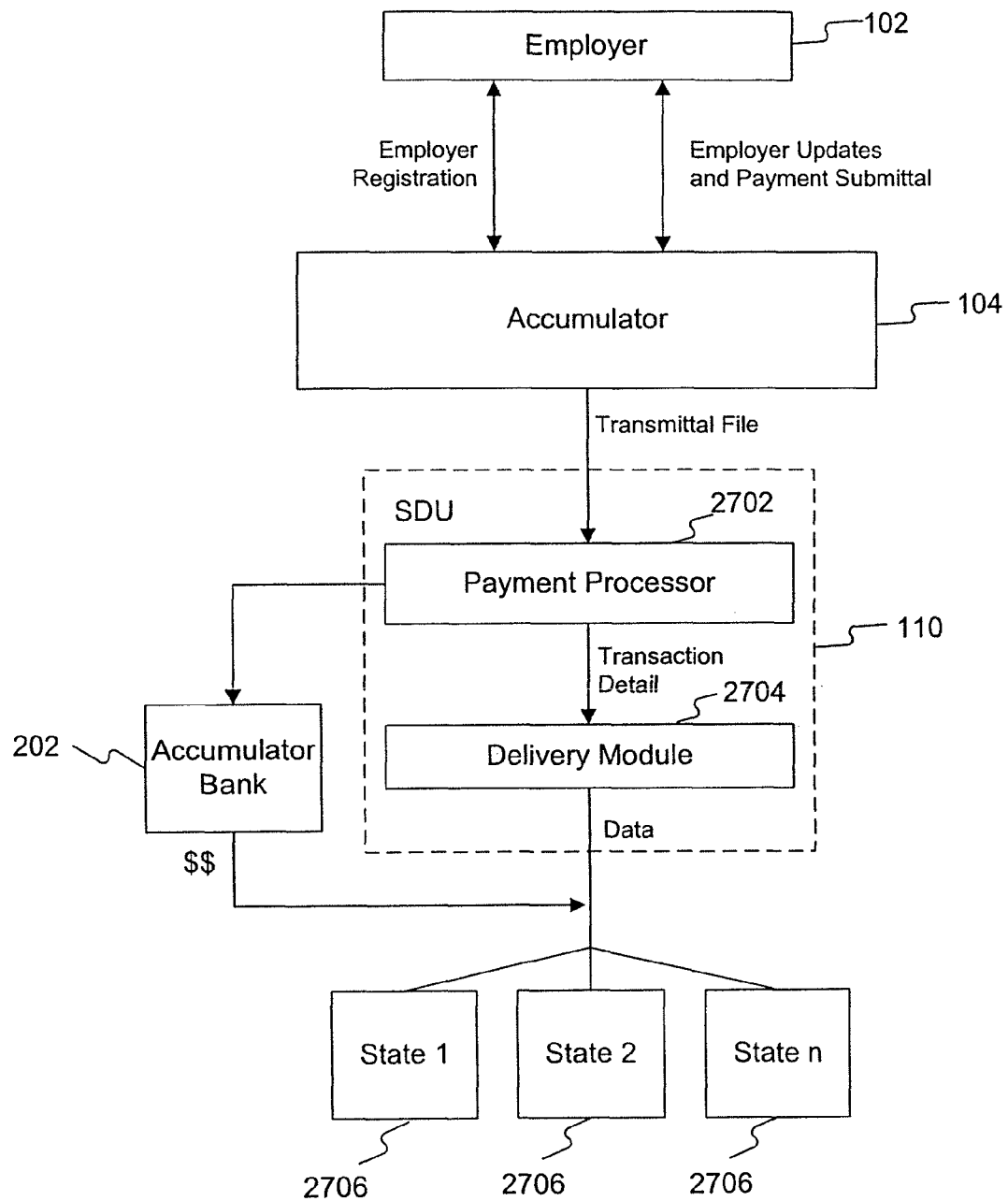
FIG. 27 is a block diagram of a system for processing payments for multiple states, consistent with one embodiment of the present invention.

FIG. 27 is a block diagram of an alternative embodiment of a system for processing payments to multiple states, consistent with the present invention. As shown in FIG. 27, an employer 102 communicates with accumulator 104 to register and to submit payments. The accumulator agency submits files to SDU 110 where a payment processor 2702 and a delivery module 2704 are used to process payments to a plurality of states 2706. In another alternative embodiment, payment processor 2702 and delivery module 2704 may be part of accumulator 104. It should be noted that other embodiments are possible, consistent with the present invention.

Figure 28:
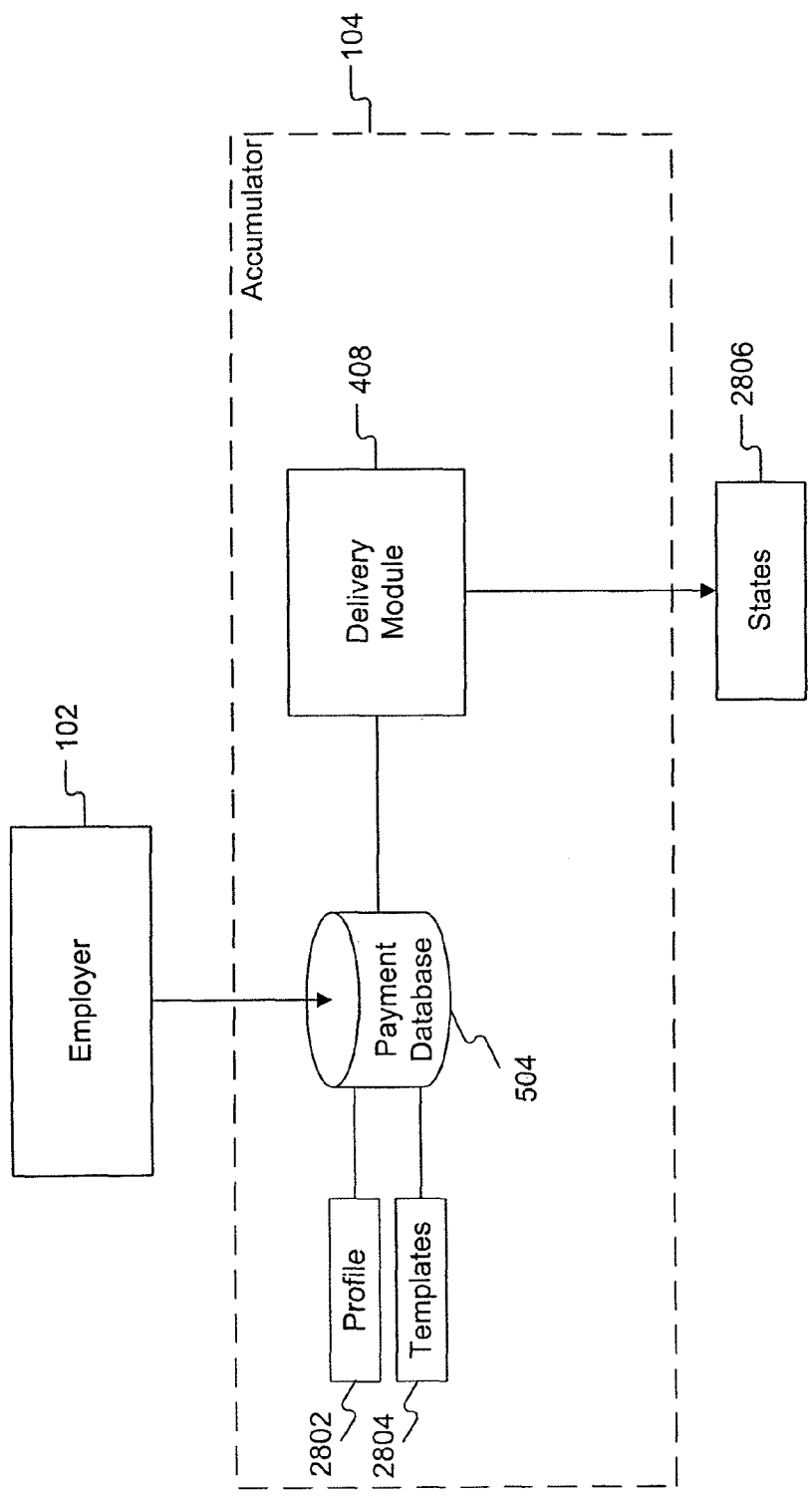
FIG. 28 is another block diagram of a system for processing payments to multiple states, consistent with one embodiment of the present invention.

FIG. 28 is a block diagram of another embodiment of a system for processing payments to multiple states, consistent with the present invention. Employer 102 submits payments to a payment database 504 at accumulator 104. Payment database 504 has access to payment profiles 2802 which may be stored, for example, in profile database 510 (not shown). Payment database 504 also has access to templates 2804. These templates may be different for each of the plurality of states 2806. Delivery module 408 accesses payment database 504 and templates 2804 to create payments and deliver them to for a plurality of states 2806.

For example, in FIG. 28, two states, Michigan and Illinois, may receive payments from Employer 102. A national employer 102 with employees in these two states and one weekly payroll may have one payment profile that includes both Michigan and Illinois employees, as opposed to having two weekly profiles, one for Michigan and one for Illinois. Employer 102 may access accumulator 104 to create a single payment profile for all of its weekly employees and to enter data for each employee such as the employee name and Federal Information Processing Service (FIPS) code. Payment database 504 may retrieve the appropriate template associated with a particular state, e.g., Michigan, to filter the data from the payment profile to match Michigan's specification. Payment database 504 may use another template, e.g., for Illinois, to filter the data to match Illinois's specifications. Accumulator 104 may generate a single debit for the employer but send multiple credits, e.g., one for Michigan and one for Illinois. Likewise, the employer may provide one set of data while accumulator 104 may filter and/or format the data differently before sending it to each state. It should be noted that other embodiments are possible, consistent with the present invention.

Figure 29:
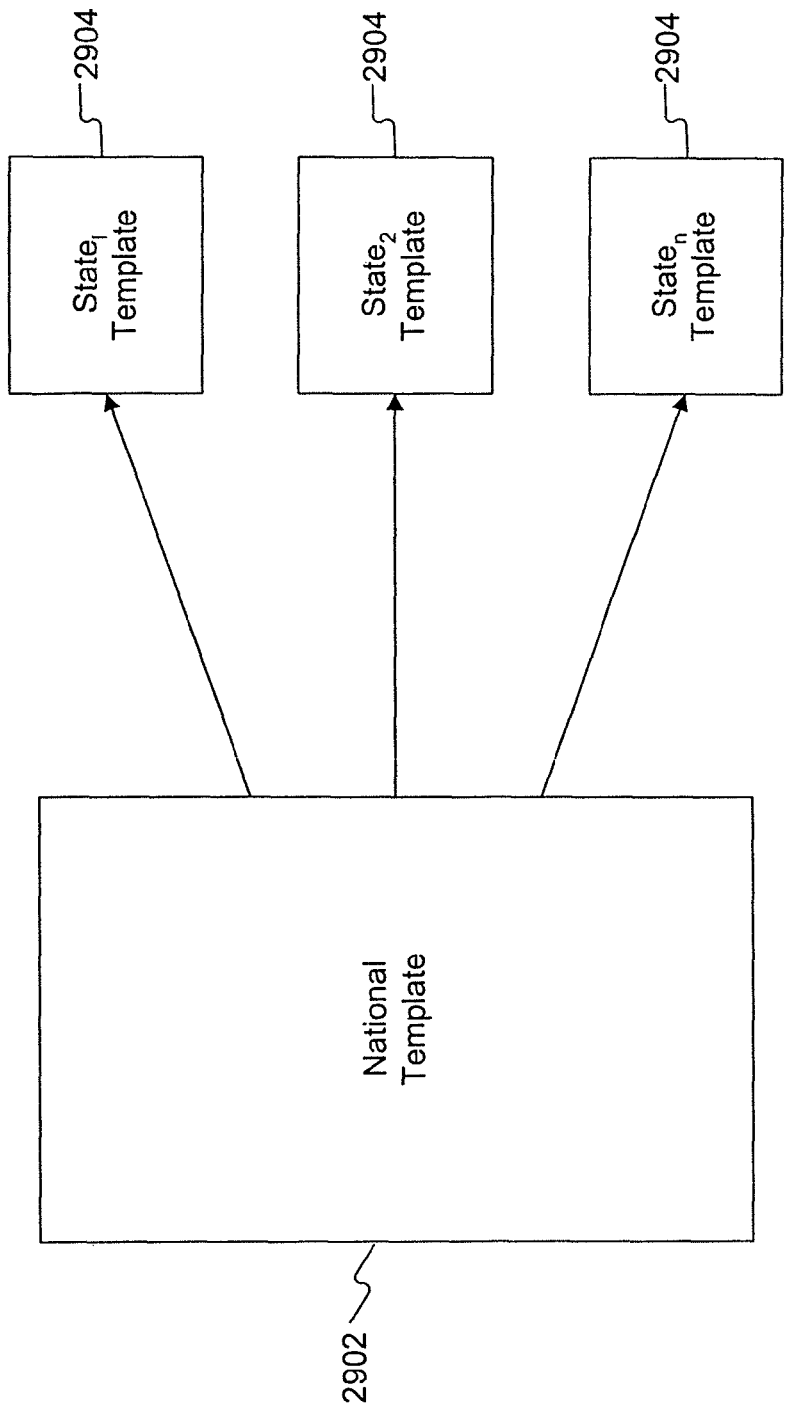
FIG. 29 depicts a series of templates consistent with one embodiment of the present invention.

FIG. 29 depicts a series of templates, consistent with one embodiment of the present invention. A national template 2902 may be used to gather information from an employer. In this way, an employer completes only one template of information regardless of the number of states to which the employers' payments will ultimately be routed. Accumulator 104 may maintain a series of state templates 2904 corresponding to each state that receives payments from accumulator 104. After an employer completes the information required by national template 2902, accumulator agency 104 may filter the information from the national template to create data and a payment for each state based on state templates 2904. In this way, the employer enters only one set of information which is then used to create the state specific information required by individual states (e.g., individual SDUs). It should be noted that other embodiments are possible, consistent with the present invention.

Figure 30:
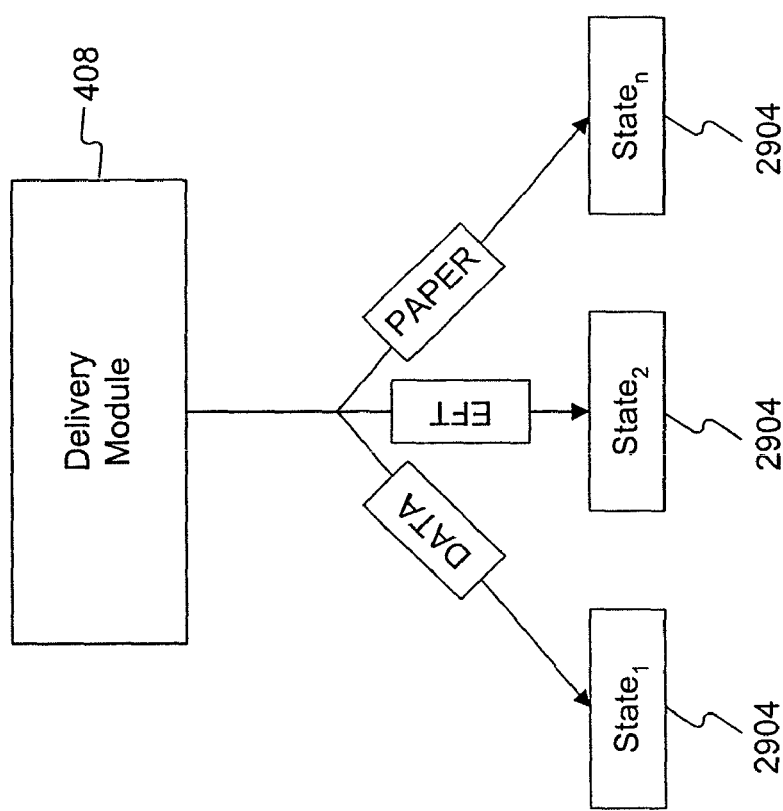
FIG. 30 shows a plurality of delivery methods, consistent with one embodiment of the present invention.

FIG. 30 shows a plurality of delivery methods at an accumulator, consistent with one embodiment of the present invention. As shown in FIG. 30, a plurality of states 2904 may receive data and payments from delivery module 408 in a plurality of different ways. For example, $State_1$ may receive electronic data, $State_2$ may receive electronic funds transfer, and $State_n$ may receive paper. In this way, an employer may submit payment information to accumulator 104 for a plurality of states 2904 without knowing the specific delivery requirements of each individual state. The delivery requirements for a state may be stored, for example, in its state template 2904. It should be noted that other embodiments are possible, consistent with the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for processing a payment and a disbursement at an accumulator over a network, comprising:
  receiving employee information corresponding to an employee from an employer via the network, wherein the employee information comprises payment information and disbursement information;
  verifying the employee information using verification information received from an intermediary that is distinct from the employer;
  processing, via electronic funds transfer, a payment based on the payment information via the network by:
    generating a debit based on the employee information, and
    sending the debit to a financial clearinghouse via the network; and
  processing, via addendum-based electronic data interchange, a disbursement based on the disbursement information via the network by:
    sending a credit from the financial clearinghouse to a financial institution associated with the intermediary; and
    applying the credit to an account of the intermediary at the financial institution.

2. The method of claim 1, further including:
  processing the payment based on the payment information, when the employee information is verified.

3. The method of claim 1, further including:
  processing the disbursement based on the disbursement information, when the employee information is verified.

4. The method of claim 1, wherein the employee information relates to a child support payment.

5. The method of claim 1, wherein the network is the Internet.

6. The method of claim 1, wherein the network is an intranet.

7. The method of claim 1, wherein the network is a wireless network.

8. The method of claim 1, wherein the network is a wired network.

9. The method of claim 1, wherein the network is a virtual private network.

10. The method of claim 1, further including:
  sending the employee information from the employer to the accumulator via the network.

11. The method of claim 1, wherein the payment processing further includes:
  sending the debit from the financial clearinghouse to a financial institution associated with the employer via the network; and
  applying the debit to an account of the employer at the financial institution.

12. The method of claim 11, wherein the debit is applied to the account of the employer using electronic funds transfer.

13. The method of claim 1, wherein the credit is applied to the account of the intermediary using addendum-based electronic data interchange.

14. The method of claim 1, further including:
  notifying the intermediary when the credit is applied to the account of the intermediary.

15. The method of claim 1, further including:
  generating a report at the accumulator based on the employee information.

16. A system for processing a payment and a disbursement at an accumulator over a network, comprising:
  a first receiving component configured to receive employee information corresponding to an employee from an employer via the network, wherein the employee information comprises payment information and disbursement information;
  a verifying component configured to verify the employee information using verification information received from an intermediary that is distinct from the employer;
  a first processing component configured to process, via electronic funds transfer, a payment based on the payment information via the network, including:
    a generating component configured to generate a debit based on the employee information, and
    a first sending component configured to send the debit to a financial clearinghouse via the network; and
  a second processing component configured to process, via addendum-based electronic data interchange, a disbursement based on the disbursement information via the network, including:
    a second sending component configured to send a credit from the financial clearinghouse to a financial institution associated with the intermediary, and
    a first applying component configured to apply the credit to an account of the intermediary at the financial institution.

17. The system of claim 16, further including:
  a third processing component configured to process the payment based on the payment information, when the employee information is verified.

18. The system of claim 16, further including:
a fourth processing component configured to process the disbursement based on the disbursement information, when the employee information is verified.

19. The system of claim 16, wherein the employee information relates to a child support payment.

20. The system of claim 16, wherein the network is the Internet.

21. The system of claim 16, wherein the network is an intranet.

22. The system of claim 16, wherein the network is a wireless network.

23. The system of claim 16, wherein the network is a wired network.

24. The system of claim 16, wherein the network is a virtual private network.

25. The system of claim 16, further including:
a third sending component configured to send the employer information from the employer to the accumulator via the network.

26. The system of claim 16, wherein the first processing component further includes:
a fourth sending component configured to send the debit from the financial clearinghouse to a financial institution associated with the employer via the network; and
a second applying component configured to apply the debit to an account of the employer at the financial institution.

27. The system of claim 26, wherein the debit is applied to the account of the employer using electronic funds transfer.

28. The system of claim 16, wherein the credit is applied to the account of the intermediary using addendum-based electronic data interchange.

29. The system of claim 16, further including:
a notifying component configured to notify the intermediary when the credit is applied to the account of the intermediary.

30. The system of claim 16, further including:
a generating component configured to generate a report at the accumulator based on the employee information.

31. A computer readable medium having computer readable code embodied therein for processing a payment and a disbursement at an accumulator over a network, the computer readable code comprising:
a receiving module configured to receive employee information corresponding to an employee from an employer via the network, wherein the employee information comprises payment information and disbursement information;
a verifying module configured to verify the employee information using verification information received from an intermediary that is distinct from the employer;
a first processing module configured to process, via electronic funds transfer, a payment based on the payment information via the network, including:
a generating module configured to generate a debit based on the employee information, and
a first sending module configured to send the debit to a financial clearinghouse via the network; and
a second processing module configured to process, via addendum-based electronic data interchange, a disbursement based on the disbursement information via the network, including:
a second sending module configured to send a credit from the financial clearinghouse to a financial institution associated with the intermediary, and
a first applying module configured to apply the credit to an account of the intermediary at the financial institution.

32. A system for processing a payment and a disbursement at an accumulator over a network, comprising:
means for receiving employee information corresponding to an employee from an employer via the network, wherein the employee information comprises payment information and disbursement information;
means for verifying the employee information using verification information received from an intermediary that is distinct from the employer;
means for processing a payment, via electronic funds transfer, based on the payment information via the network, including:
a generating means configured to generate a debit based on the employee information, and
a first sending means configured to send the debit to a financial clearinghouse via the network; and
means for processing a disbursement, via addendum-based electronic data interchange, based on the disbursement information via the network, including:
a second sending means configured to send a credit from the financial clearinghouse to a financial institution associated with the intermediary, and
a first applying means configured to apply the credit to an account of the intermediary at the financial institution.

* * * * *